(12) United States Patent
Tsuda

(10) Patent No.: US 7,613,697 B2
(45) Date of Patent: Nov. 3, 2009

(54) DATA ANALYZING DEVICE AND METHOD, AND PROGRAM FOR MAKING COMPUTER EXECUTE THE DATA ANALYZING METHOD

(75) Inventor: Hidetaka Tsuda, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 283 days.

(21) Appl. No.: 11/808,243

(22) Filed: Jun. 7, 2007

(65) Prior Publication Data

US 2008/0005110 A1    Jan. 3, 2008

(30) Foreign Application Priority Data

| Jun. 7, 2006 | (JP) | ............................ 2006-159015 |
| Dec. 27, 2006 | (JP) | ............................ 2006-352936 |

(51) Int. Cl.
*G06F 17/30* (2006.01)

(52) U.S. Cl. ............................ 707/7; 702/179; 707/100

(58) Field of Classification Search ....................... None
See application file for complete search history.

(56) References Cited

FOREIGN PATENT DOCUMENTS

| JP | 2001-206999 | 11/2001 |
| JP | 2004-186374 | 7/2004 |

*Primary Examiner*—Charles Rones
*Assistant Examiner*—Belix M Ortiz
(74) *Attorney, Agent, or Firm*—Staas & Halsey LLP

(57) ABSTRACT

To provide a data analyzing device and method and a program for making a computer execute the data analyzing method for efficiently extracting data distribution information. A grade of unity represented by the following expression is derived for each of (the number of small sets Gj−1) combinations Ak.

Grade of Unity=[{$S0-(S1+S2)$}/$S0$]×100

In the above expression, for example, S0 is the sum of deviation squares of the object variable (temperature T1) of m records Ri, S1 is the sum of deviation squares of the temperature T1 of the records Ri belonging to the large set G'1k, and S2 is the sum of deviation squares of the temperature T1 of the records Ri belonging to the large set G'2k.

15 Claims, 57 Drawing Sheets

| RECORD No. Ri | TIME D | TEMPERATURE T1 (°C) | SMALL SET Gj | |
|---|---|---|---|---|
| RECORD R1 | MARCH 1st | 10.7 | G1 | |
| RECORD R2 | MARCH 2nd | 7.3 | G1 | |
| RECORD R3 | MARCH 3rd | 9.9 | G1 | G1 |
| RECORD R4 | MARCH 4th | 6 | G1 | |
| RECORD R5 | MARCH 5th | 11.7 | G1 | |
| RECORD R6 | MARCH 6th | 19.3 | G2 | |
| RECORD R7 | MARCH 7th | 20 | G2 | |
| RECORD R8 | MARCH 8th | 22.8 | G2 | G2 |
| RECORD R9 | MARCH 9th | 21.4 | G2 | |
| RECORD R10 | MARCH 10th | 25 | G2 | |
| RECORD R11 | MARCH 11th | 20.8 | G3 | |
| RECORD R12 | MARCH 12th | 20 | G3 | |
| RECORD R13 | MARCH 13th | 18.3 | G3 | G3 |
| RECORD R14 | MARCH 14th | 21 | G3 | |
| RECORD R15 | MARCH 15th | 17.5 | G3 | |
| RECORD R16 | MARCH 16th | 11.8 | G4 | |
| RECORD R17 | MARCH 17th | 13.8 | G4 | |
| RECORD R18 | MARCH 18th | 12.4 | G4 | G4 |
| RECORD R19 | MARCH 19th | 10.4 | G4 | |
| RECORD R20 | MARCH 20th | 13.2 | G4 | |
| RECORD R21 | MARCH 21st | 7.7 | G5 | |
| RECORD R22 | MARCH 22nd | 9.4 | G5 | |
| RECORD R23 | MARCH 23rd | 3.2 | G5 | G5 |
| RECORD R24 | MARCH 24th | 8.5 | G5 | |
| RECORD R25 | MARCH 25th | 5.3 | G5 | |

FIG.1

| RECORD No. Ri | TIME D | TEMPERATURE T1 (°C) | SMALL SET Gj |
|---|---|---|---|
| RECORD R1 | MARCH 1st | 10.7 | G1 |
| RECORD R2 | MARCH 2nd | 7.3 | G1 |
| RECORD R3 | MARCH 3rd | 9.9 | G1 } G1 |
| RECORD R4 | MARCH 4th | 6 | G1 |
| RECORD R5 | MARCH 5th | 11.7 | G1 |
| RECORD R6 | MARCH 6th | 19.3 | G2 |
| RECORD R7 | MARCH 7th | 20 | G2 |
| RECORD R8 | MARCH 8th | 22.8 | G2 } G2 |
| RECORD R9 | MARCH 9th | 21.4 | G2 |
| RECORD R10 | MARCH 10th | 25 | G2 |
| RECORD R11 | MARCH 11th | 20.8 | G3 |
| RECORD R12 | MARCH 12th | 20 | G3 |
| RECORD R13 | MARCH 13th | 18.3 | G3 } G3 |
| RECORD R14 | MARCH 14th | 21 | G3 |
| RECORD R15 | MARCH 15th | 17.5 | G3 |
| RECORD R16 | MARCH 16th | 11.8 | G4 |
| RECORD R17 | MARCH 17th | 13.8 | G4 |
| RECORD R18 | MARCH 18th | 12.4 | G4 } G4 |
| RECORD R19 | MARCH 19th | 10.4 | G4 |
| RECORD R20 | MARCH 20th | 13.2 | G4 |
| RECORD R21 | MARCH 21st | 7.7 | G5 |
| RECORD R22 | MARCH 22nd | 9.4 | G5 |
| RECORD R23 | MARCH 23rd | 3.2 | G5 } G5 |
| RECORD R24 | MARCH 24th | 8.5 | G5 |
| RECORD R25 | MARCH 25th | 5.3 | G5 |

FIG.4

TEMPERATURE T1

| RANK | COMBINATION Ak | GRADE OF UNITY | LARGE SET G'1k (RECORD NUMBER) | LARGE SET G'2k (RECORD NUMBER) | LARGE SET G'1k AREA | LARGE SET G'2k AREA |
|---|---|---|---|---|---|---|
| 1 | A2 | 81.19 | G2, G3(10) | G1, G4, G5(15) | 3/6-3/15 | 3/1-3/5, 3/16-3/25 |
| 2 | A3 | 63.25 | G2, G3, G4(15) | G1, G5(10) | 3/6-3/20 | 3/1-3/5, 3/21-3/25 |
| 3 | A1 | 41.13 | G2(5) | G1, G3, G4, G5(20) | 3/6-3/10 | 3/1-3/5, 3/11-3/25 |
| 4 | A4 | 33.82 | G1, G2, G3, G4(20) | G5(5) | 3/1-3/20 | 3/21-3/25 |

| RECORD No. Ri | TIME D | TEMPERATURE T2 (°C) | SMALL SET Gj | |
|---|---|---|---|---|
| RECORD R1 | MARCH 1st | 10.7 | G1 | |
| RECORD R2 | MARCH 2nd | 7.3 | G1 | |
| RECORD R3 | MARCH 3rd | 9.9 | G1 | G1 |
| RECORD R4 | MARCH 4th | 6 | G1 | |
| RECORD R5 | MARCH 5th | 11.7 | G1 | |
| RECORD R6 | MARCH 6th | 19.3 | G2 | |
| RECORD R7 | MARCH 7th | 20 | G2 | |
| RECORD R8 | MARCH 8th | 22.8 | G2 | G2 |
| RECORD R9 | MARCH 9th | 21.4 | G2 | |
| RECORD R10 | MARCH 10th | 25 | G2 | |
| RECORD R11 | MARCH 11th | 7.7 | G3 | |
| RECORD R12 | MARCH 12th | 9.4 | G3 | |
| RECORD R13 | MARCH 13th | 3.2 | G3 | G3 |
| RECORD R14 | MARCH 14th | 8.5 | G3 | |
| RECORD R15 | MARCH 15th | 5.3 | G3 | |
| RECORD R16 | MARCH 16th | 11.8 | G4 | |
| RECORD R17 | MARCH 17th | 13.8 | G4 | |
| RECORD R18 | MARCH 18th | 12.4 | G4 | G4 |
| RECORD R19 | MARCH 19th | 10.4 | G4 | |
| RECORD R20 | MARCH 20th | 13.2 | G4 | |
| RECORD R21 | MARCH 21st | 20.8 | G5 | |
| RECORD R22 | MARCH 22nd | 20 | G5 | |
| RECORD R23 | MARCH 23rd | 18.3 | G5 | G5 |
| RECORD R24 | MARCH 24th | 21 | G5 | |
| RECORD R25 | MARCH 25th | 17.5 | G5 | |

FIG.13

TEMPERATURE T2

| RANK | COMBINATION Ak | GRADE OF UNITY | LARGE SET G'1k (RECORD NUMBER) | LARGE SET G'2k (RECORD NUMBER) | LARGE SET G'1k AREA | LARGE SET G'2k AREA |
|---|---|---|---|---|---|---|
| 1 | A2 | 81.19 | G2, G5(10) | G1, G3, G4(15) | 3/6-3/10, 3/21-3/25 | 3/1-3/5, 3/11-3/20 |
| 2 | A3 | 63.25 | G2, G4, G5(15) | G1, G3(10) | 3/6-3/10, 3/16-3/25 | 3/1-3/5, 3/11-3/15 |
| 3 | A1 | 41.13 | G2(5) | G1, G3, G4, G5(20) | 3/6-3/10 | 3/1-3/5, 3/11-3/25 |
| 4 | A4 | 33.82 | G1, G2, G4, G5(20) | G3(5) | 3/1-3/10, 3/16-3/25 | 3/11-3/15 |

| RECORD No. Ri | TIME D | TEMPERATURE T3 (°C) | SMALL SET Gj | |
|---|---|---|---|---|
| RECORD R1 | MARCH 1st | 10.7 | G1 | |
| RECORD R2 | MARCH 2nd | 7.3 | G1 | |
| RECORD R3 | MARCH 3rd | 9.9 | G1 | G1 |
| RECORD R4 | MARCH 4th | 6 | G1 | |
| RECORD R5 | MARCH 5th | 11.7 | G1 | |
| RECORD R6 | MARCH 6th | 19.3 | G2 | |
| RECORD R7 | MARCH 7th | 20 | G2 | |
| RECORD R8 | MARCH 8th | 22.8 | G2 | G2 |
| RECORD R9 | MARCH 9th | 21.4 | G2 | |
| RECORD R10 | MARCH 10th | 25 | G2 | |
| RECORD R11 | MARCH 11th | 7.7 | G3 | |
| RECORD R12 | MARCH 12th | 9.4 | G3 | |
| RECORD R13 | MARCH 13th | 3.2 | G3 | G3 |
| RECORD R14 | MARCH 14th | 8.5 | G3 | |
| RECORD R15 | MARCH 15th | 5.3 | G3 | |
| RECORD R16 | MARCH 16th | 6.8 | G4 | |
| RECORD R17 | MARCH 17th | 7.8 | G4 | |
| RECORD R18 | MARCH 18th | 7.4 | G4 | G4 |
| RECORD R19 | MARCH 19th | 5.4 | G4 | |
| RECORD R20 | MARCH 20th | 8.2 | G4 | |
| RECORD R21 | MARCH 21st | 10.8 | G5 | |
| RECORD R22 | MARCH 22nd | 10 | G5 | |
| RECORD R23 | MARCH 23rd | 8.3 | G5 | G5 |
| RECORD R24 | MARCH 24th | 11 | G5 | |
| RECORD R25 | MARCH 25th | 7.5 | G5 | |

FIG.21

TEMPERATURE T3

| RANK | COMBINATION Ak | GRADE OF UNITY | LARGE SET G'1k (RECORD NUMBER) | LARGE SET G'2k (RECORD NUMBER) | LARGE SET G'1k AREA | LARGE SET G'2k AREA |
|---|---|---|---|---|---|---|
| 1 | A1 | 86.78 | G2(5) | G1, G3, G4, G5(20) | 3/6-3/10 | 3/1-3/5, 3/11-3/25 |
| 2 | A2 | 44.47 | G2, G5(10) | G1, G3, G4(15) | 3/6-3/10, 3/21-3/25 | 3/1-3/5, 3/11-3/20 |
| 3 | A3 | 29.72 | G1, G2, G5(15) | G3, G4(10) | 3/1-3/10, 3/21-3/25 | 3/11-3/20 |
| 4 | A4 | 12.02 | G1, G2, G4, G5(20) | G3(5) | 3/1-3/10, 3/16-3/25 | 3/11-3/15 |

| RECORD No. Ri | TIME D | TEMPERATURE T4 (°C) | SMALL SET Gj | |
|---|---|---|---|---|
| RECORD R1 | MARCH 1st | 2.2 | G1 | |
| RECORD R2 | MARCH 2nd | 14 | G1 | |
| RECORD R3 | MARCH 3rd | 2.2 | G1 | G1 |
| RECORD R4 | MARCH 4th | 16.9 | G1 | |
| RECORD R5 | MARCH 5th | 12.2 | G1 | |
| RECORD R6 | MARCH 6th | 12.2 | G2 | |
| RECORD R7 | MARCH 7th | 8.7 | G2 | |
| RECORD R8 | MARCH 8th | 13.5 | G2 | G2 |
| RECORD R9 | MARCH 9th | 16.6 | G2 | |
| RECORD R10 | MARCH 10th | 14 | G2 | |
| RECORD R11 | MARCH 11th | 7 | G3 | |
| RECORD R12 | MARCH 12th | 19 | G3 | |
| RECORD R13 | MARCH 13th | 6.9 | G3 | G3 |
| RECORD R14 | MARCH 14th | 5.5 | G3 | |
| RECORD R15 | MARCH 15th | 6.2 | G3 | |
| RECORD R16 | MARCH 16th | 5.4 | G4 | |
| RECORD R17 | MARCH 17th | 7 | G4 | |
| RECORD R18 | MARCH 18th | 10.2 | G4 | G4 |
| RECORD R19 | MARCH 19th | 13.4 | G4 | |
| RECORD R20 | MARCH 20th | 8.5 | G4 | |
| RECORD R21 | MARCH 21st | 2.5 | G5 | |
| RECORD R22 | MARCH 22nd | 6.8 | G5 | |
| RECORD R23 | MARCH 23rd | 2.6 | G5 | G5 |
| RECORD R24 | MARCH 24th | 13.9 | G5 | |
| RECORD R25 | MARCH 25th | 4 | G5 | |

FIG.29

TEMPERATURE T4

| RANK | COMBINATION Ak | GRADE OF UNITY | LARGE SET (RECORD NUMBER) | LARGE SET G'1k (RECORD NUMBER) | LARGE SET G'2k (RECORD NUMBER) | LARGE SET G'1k AREA | LARGE SET G'2k AREA |
|---|---|---|---|---|---|---|---|
| 1 | A1 | 14.47 | G2(5) | | G1, G3, G4, G5(20) | 3/6-3/10 | 3/1-3/5, 3/11-3/25 |
| 2 | A4 | 11.22 | G1, G2, G3, G4(20) | | G5(5) | 3/1-3/20 | 3/21-3/25 |
| 3 | A2 | 10.95 | G1, G2(10) | | G3, G4, G5(15) | 3/1-3/10 | 3/11-3/25 |
| 4 | A3 | 9.18 | G1, G2, G3(15) | | G4, G5(10) | 3/1-3/15 | 3/16-3/25 |

FIG.34

| RECORD No. Ri | TIME D | TEMPERATURE T1 (°C) | SMALL SET Gj | | SMALL SET G2j | | SMALL SET G3j | |
|---|---|---|---|---|---|---|---|---|
| RECORD R1  | MARCH 1st  | 10.7 | G1 ⎫       |     |                |      | G31 ⎫        |      |
| RECORD R2  | MARCH 2nd  | 7.3  | G1          |     |                |      | G31          |      |
| RECORD R3  | MARCH 3rd  | 9.9  | G1  ⎬ G1   |     | G21 ⎫          |      | G31          |      |
| RECORD R4  | MARCH 4th  | 6    | G1          |     | G21            |      | G31          | G31  |
| RECORD R5  | MARCH 5th  | 11.7 | G1 ⎭       |     | G21 ⎬ G21     |      | G31          |      |
| RECORD R6  | MARCH 6th  | 19.3 | G2 ⎫       |     | G21            |      | G31 ⎭        |      |
| RECORD R7  | MARCH 7th  | 20   | G2          |     | G21 ⎭          |      | G32 ⎫        |      |
| RECORD R8  | MARCH 8th  | 22.8 | G2  ⎬ G2   |     | G22 ⎫          |      | G32          |      |
| RECORD R9  | MARCH 9th  | 21.4 | G2          |     | G22            |      | G32          | G32  |
| RECORD R10 | MARCH 10th | 25   | G2 ⎭       |     | G22 ⎬ G22     |      | G32          |      |
| RECORD R11 | MARCH 11th | 20.8 | G3 ⎫       |     | G22            |      | G32          |      |
| RECORD R12 | MARCH 12th | 20   | G3          |     | G22 ⎭          |      | G32 ⎭        |      |
| RECORD R13 | MARCH 13th | 18.3 | G3  ⎬ G3   |     | G23 ⎫          |      | G33 ⎫        |      |
| RECORD R14 | MARCH 14th | 21   | G3          |     | G23            |      | G33          |      |
| RECORD R15 | MARCH 15th | 17.5 | G3 ⎭       |     | G23 ⎬ G23     |      | G33          | G33  |
| RECORD R16 | MARCH 16th | 11.8 | G4 ⎫       |     | G23            |      | G33          |      |
| RECORD R17 | MARCH 17th | 13.8 | G4          |     | G23 ⎭          |      | G33          |      |
| RECORD R18 | MARCH 18th | 12.4 | G4  ⎬ G4   |     | G24 ⎫          |      | G33 ⎭        |      |
| RECORD R19 | MARCH 19th | 10.4 | G4          |     | G24            |      | G34 ⎫        |      |
| RECORD R20 | MARCH 20th | 13.2 | G4 ⎭       |     | G24 ⎬ G24     |      | G34          |      |
| RECORD R21 | MARCH 21st | 7.7  | G5 ⎫       |     | G24            |      | G34          | G34  |
| RECORD R22 | MARCH 22nd | 9.4  | G5          |     | G24 ⎭          |      | G34          |      |
| RECORD R23 | MARCH 23rd | 3.2  | G5  ⎬ G5   |     |                |      | G34          |      |
| RECORD R24 | MARCH 24th | 8.5  | G5          |     |                |      | G34 ⎭        |      |
| RECORD R25 | MARCH 25th | 5.3  | G5 ⎭       |     |                |      |              |      |

FIG.36

SMALL SET G2k-TEMPERATURE T1

| RANK | COMBINATION Ak | GRADE OF UNITY | LARGE SET G'1k (RECORD NUMBER) | LARGE SET G'2k (RECORD NUMBER) | LARGE SET G'1k AREA | LARGE SET G'2k AREA |
|---|---|---|---|---|---|---|
| 1 | A1 | 45.62 | G22(5) | G23, G21, G24(15) | 3/8-3/12 | 3/3-3/7, 3/13-3/22 |
| 2 | A2 | 44.07 | G22, G23(10) | G21, G24(10) | 3/8-3/17 | 3/3-3/7, 3/18-3/22 |
| 3 | A3 | 28.02 | G23, G22, G21(15) | G24(5) | 3/3-3/17 | 3/18-3/22 |

| RECORD No. Ri | TIME D | TEMPERATURE T1 (°C) | LEAF NODE No. LNO |
|---|---|---|---|
| RECORD R1 | 1 | 10.7 | No.6 |
| RECORD R2 | 2 | 7.3 | No.6 |
| RECORD R3 | 3 | 9.9 | No.6 |
| RECORD R4 | 4 | 6 | No.6 |
| RECORD R5 | 5 | 11.7 | No.6 |
| RECORD R6 | 6 | 19.3 | No.5 |
| RECORD R7 | 7 | 20 | No.5 |
| RECORD R8 | 8 | 22.8 | No.5 |
| RECORD R9 | 9 | 21.4 | No.5 |
| RECORD R10 | 10 | 25 | No.5 |
| RECORD R11 | 11 | 20.8 | No.5 |
| RECORD R12 | 12 | 20 | No.5 |
| RECORD R13 | 13 | 18.3 | No.5 |
| RECORD R14 | 14 | 21 | No.5 |
| RECORD R15 | 15 | 17.5 | No.5 |
| RECORD R16 | 16 | 11.8 | No.4 |
| RECORD R17 | 17 | 13.8 | No.4 |
| RECORD R18 | 18 | 12.4 | No.4 |
| RECORD R19 | 19 | 10.4 | No.4 |
| RECORD R20 | 20 | 13.2 | No.4 |
| RECORD R21 | 21 | 7.7 | No.1 |
| RECORD R22 | 22 | 9.4 | No.1 |
| RECORD R23 | 23 | 3.2 | No.1 |
| RECORD R24 | 24 | 8.5 | No.1 |
| RECORD R25 | 25 | 5.3 | No.1 |

OBJECT VARIABLE : YIELD

Title : TEMPERATURE T1
All Std Dev=6.209367
Stop Std Dev=4.346557

FIG.50

TEMPERATURE T1

| RANK | COMBINATION Ak | GRADE OF UNITY | LARGE SET G1k (RECORD NUMBER) | LARGE SET G'1k (RECORD NUMBER) | LARGE SET G'2k (RECORD NUMBER) | LARGE SET G'1k AREA | LARGE SET G'2k AREA |
|---|---|---|---|---|---|---|---|
| 1 | A1 | 81.19 | No.5 (10) | No.5, No.4 (15) | No.4, No.6, No.1 (15) | 6~15 | 1~5, 16~25 |
| 2 | A2 | 63.25 | No.5, No.4 (15) | No.5, No.4, No.6 (20) | No.1, No.6 (10) | 6~20 | 1~5, 21~25 |
| 3 | A3 | 33.81 | No.5, No.4, No.6 (20) | 1~20 | No.1 (5) | 21~25 | |

| RECORD No. Ri | TIME D | TEMPERATURE T2 (°C) | LEAF NODE No. LNO |
|---|---|---|---|
| RECORD R1 | 1 | 10.7 | No.6 |
| RECORD R2 | 2 | 7.3 | No.6 |
| RECORD R3 | 3 | 9.9 | No.6 |
| RECORD R4 | 4 | 6 | No.6 |
| RECORD R5 | 5 | 11.7 | No.6 |
| RECORD R6 | 6 | 19.3 | No.5 |
| RECORD R7 | 7 | 20 | No.5 |
| RECORD R8 | 8 | 22.8 | No.5 |
| RECORD R9 | 9 | 21.4 | No.5 |
| RECORD R10 | 10 | 25 | No.5 |
| RECORD R11 | 11 | 7.7 | No.3 |
| RECORD R12 | 12 | 9.4 | No.3 |
| RECORD R13 | 13 | 3.2 | No.3 |
| RECORD R14 | 14 | 8.5 | No.3 |
| RECORD R15 | 15 | 5.3 | No.3 |
| RECORD R16 | 16 | 11.8 | No.3 |
| RECORD R17 | 17 | 13.8 | No.3 |
| RECORD R18 | 18 | 12.4 | No.3 |
| RECORD R19 | 19 | 10.4 | No.3 |
| RECORD R20 | 20 | 13.2 | No.3 |
| RECORD R21 | 21 | 20.8 | No.1 |
| RECORD R22 | 22 | 20 | No.1 |
| RECORD R23 | 23 | 18.3 | No.1 |
| RECORD R24 | 24 | 21 | No.1 |
| RECORD R25 | 25 | 17.5 | No.1 |

Title : TEMPERATURE T2
All Std Dev=6.209367
Stop Std Dev=4.346557

FIG.58

TEMPERATURE T2

| RANK | COMBINATION Ak | GRADE OF UNITY | LARGE SET G'1k (RECORD NUMBER) | LARGE SET G'2k (RECORD NUMBER) | LARGE SET G'1k AREA | LARGE SET G'2k AREA |
|---|---|---|---|---|---|---|
| 1 | A2 | 81.19 | No.5, No.1 (10) | No.3, No.6 (15) | 6~10, 21~25 | 1~5, 11~20 |
| 2 | A1 | 41.13 | No.5 (5) | No.3, No.6, No.1 (20) | 6~10 | 1~5, 11~25 |
| 3 | A3 | 15.41 | No.5, No.1, No.3 (20) | No.6 (5) | 6~25 | 1~5 |

| RECORD No. Ri | TIME D | TEMPERATURE T3 (°C) | LEAF NODE No. LNO |
|---|---|---|---|
| RECORD R1 | 1 | 10.7 | No.4 |
| RECORD R2 | 2 | 7.3 | No.4 |
| RECORD R3 | 3 | 9.9 | No.4 |
| RECORD R4 | 4 | 6 | No.4 |
| RECORD R5 | 5 | 11.7 | No.4 |
| RECORD R6 | 6 | 19.3 | No.3 |
| RECORD R7 | 7 | 20 | No.3 |
| RECORD R8 | 8 | 22.8 | No.3 |
| RECORD R9 | 9 | 21.4 | No.3 |
| RECORD R10 | 10 | 25 | No.3 |
| RECORD R11 | 11 | 7.7 | No.1 |
| RECORD R12 | 12 | 9.4 | No.1 |
| RECORD R13 | 13 | 3.2 | No.1 |
| RECORD R14 | 14 | 8.5 | No.1 |
| RECORD R15 | 15 | 5.3 | No.1 |
| RECORD R16 | 16 | 6.8 | No.1 |
| RECORD R17 | 17 | 7.8 | No.1 |
| RECORD R18 | 18 | 7.4 | No.1 |
| RECORD R19 | 19 | 5.4 | No.1 |
| RECORD R20 | 20 | 8.2 | No.1 |
| RECORD R21 | 21 | 10.8 | No.1 |
| RECORD R22 | 22 | 10 | No.1 |
| RECORD R23 | 23 | 8.3 | No.1 |
| RECORD R24 | 24 | 11 | No.1 |
| RECORD R25 | 25 | 7.5 | No.1 |

Title : TEMPERATURE T3
All Std Dev=5.940334
Stop Std Dev=4.158234

FIG.66

TEMPERATURE T3

| RANK | COMBINATION Ak | GRADE OF UNITY | LARGE SET G'1k (RECORD NUMBER) | LARGE SET G'2k (RECORD NUMBER) | LARGE SET G'1k AREA | LARGE SET G'2k AREA |
|---|---|---|---|---|---|---|
| 1 | A1 | 86.78 | No.3(5) | No.4, No.1(20) | 6~10 | 1~5, 11~25 |
| 2 | A2 | 40.81 | No.3, No.4(10) | No.1(15) | 1~10 | 11~25 |

| RECORD No. Ri | TIME D | TEMPERATURE T4 (°C) | LEAF NODE No. LNO |
|---|---|---|---|
| RECORD R1 | 1 | 2.2 | No.16 |
| RECORD R2 | 2 | 14 | No.15 |
| RECORD R3 | 3 | 2.2 | No.14 |
| RECORD R4 | 4 | 16.9 | No.11 |
| RECORD R5 | 5 | 12.2 | No.11 |
| RECORD R6 | 6 | 12.2 | No.11 |
| RECORD R7 | 7 | 8.7 | No.11 |
| RECORD R8 | 8 | 13.5 | No.11 |
| RECORD R9 | 9 | 16.6 | No.11 |
| RECORD R10 | 10 | 14 | No.11 |
| RECORD R11 | 11 | 7 | No.11 |
| RECORD R12 | 12 | 19 | No.10 |
| RECORD R13 | 13 | 6.9 | No.7 |
| RECORD R14 | 14 | 5.5 | No.7 |
| RECORD R15 | 15 | 6.2 | No.7 |
| RECORD R16 | 16 | 5.4 | No.7 |
| RECORD R17 | 17 | 7 | No.7 |
| RECORD R18 | 18 | 10.2 | No.7 |
| RECORD R19 | 19 | 13.4 | No.7 |
| RECORD R20 | 20 | 8.5 | No.7 |
| RECORD R21 | 21 | 2.5 | No.6 |
| RECORD R22 | 22 | 6.8 | No.6 |
| RECORD R23 | 23 | 2.6 | No.6 |
| RECORD R24 | 24 | 13.9 | No.5 |
| RECORD R25 | 25 | 4 | No.4 |

FIG.73

TEMPERATURE T4

| RANK | COMBINATION Ak | GRADE OF UNITY | LARGE SET G'1k (RECORD NUMBER) | LARGE SET G'2k (RECORD NUMBER) | LARGE SET G'1k AREA | LARGE SET G'2k AREA |
|---|---|---|---|---|---|---|
| 1 | A4 | 57.2 | No.10, No.15, No.5, No.11 (11) | No.4, No.6, No.16, No.14, No.7 (14) | 2, 4~12, 24 | 1, 3, 13~23, 25 |
| 2 | A5 | 44.37 | No.10, No.15, No.5, No.11, No.7 (19) | No.4, No.6, No.16, No.14 (6) | 2, 4~20, 24 | 1, 3, 21~23, 25 |
| 3 | A6 | 37.12 | No.10, No.15, No.5, No.11, No.7, No.4 (20) | No.6, No.16, No.14 (5) | 2, 4~20, 24, 25 | 1, 3, 21~23 |
| 4 | A3 | 22.9 | No.10, No.15, No.5 (3) | No.11, No.7, No.4, No.6, No.16, No.14 (22) | 2, 12, 24 | 1, 3~11, 13~23, 25 |
| 5 | A2 | 18.84 | No.10, No.15 (2) | No.5, No.11, No.7, No.4, No.6, No.16, No.14 (23) | 2, 12 | 1, 3~11, 13~25 |
| 6 | A7 | 17.88 | No.10, No.15, No.5, No.11, No.7, No.4, No.6 (23) | No.16, No.14 (2) | 2, 4~25 | 1, 3 |
| 7 | A1 | 16.34 | No.10 (1) | No.15, No.5, No.11, No.7, No.4, No.6, No.16, No.14 (24) | 12 | 1~11, 13~25 |
| 8 | A8 | 8.57 | No.10, No.15, No.5, No.11, No.7, No.4, No.6, No.16 (24) | No.14 (1) | 1~2, 4~25 | 3 |

DATA ANALYZING DEVICE AND METHOD, AND PROGRAM FOR MAKING COMPUTER EXECUTE THE DATA ANALYZING METHOD

BACKGROUND OF THE INVENTION

1. Field of the Invention

The present invention relates to a data analyzing device and method for detecting the relationship between data which is widely used in the industrial fields and extracting a significant result for producing industrially superior results and to a program for making a computer execute the data analyzing method.

2. Description of the Related Art

In analysis of numerical data, in many cases the data distribution (particularly the greatness or smallness of the value) indicates a certain characteristic rather than showing a random distribution. Accordingly, if such a certain characteristic can be efficiently extracted from the data distribution, it is possible to obtain industrially superior information. Practically, most collected data have temporal variation. In particular, such a temporal variation is important in manufacturing process data. In the data analysis, it is important to determine whether the temporal variation in data has a random pattern or a characteristic pattern. If the temporal variation is characterized, it is desirable to efficiently extract the information relating to the characteristic. In particular, in semiconductor manufacturing process operations for efficiently detecting the temporal variation and the factor thereof from test results or various measurement results such as yield having continuous values so as to establish a counterplan thereof are performed in business in order to produce superior results. In such a semiconductor manufacturing process, yield which is numerical data, performance, and various variables relating thereto are examples of the data subjected to the data analysis.

Generally, the temporal variation of the various variables can be detected by drawing a trend graph in which the variable subjected to the data analysis is set as the vertical axis and time is set as the horizontal axis. In the trend graph, an area is identified in which the fluctuation pattern of the variable or the value of the variable is distinctively different from that of the other areas. For example, in the case of the trend graph showing the yield of the semiconductor manufacturing process or the like, information such as the fluctuation pattern of the yield, for example, serves as a very important clue that leads to an improvement in the manufacturing process. Accordingly, industrially superior result can be produced by efficiently extracting an area and the characteristics thereof having the different fluctuation pattern of the variable and the values of the variable in comparison with the other areas, that is, the area having the extreme value, from the temporal variation of the variable having continuous values.

In addition, information about degree of statistical significant difference between values of variable in one area and values of variables in the other areas is widely adopted and particularly effective used as the information of the temporal variation. For example, in the semiconductor manufacturing process, if the area with low yield in production is found, the information about the statistical significant difference corresponding thereto can be used to extract an area in which a device was abnormally operating or an area in which a defective device was used. Accordingly, the information is important.

[Patent Document 1] JP-A-2004-186374
[Patent Document 2] JP-A-2001-306999

The conventional technology has problems as follows.

First, the data analysis using the trend graph requires a lot of variables to be identified. In order to extract more information, temporal variations of the same variables should be regarded as different trend graphs of the temporal variations were obtained under different devices or different conditions. Therefore the number of trend graphs corresponding to the combination of variables, devices, and conditions may increase greatly. Accordingly, to extract the variables and the corresponding areas (i.e., a time zone) in which the value of the variable is distinctively different from that of the other areas, one who analyzes the data, an engineer, has to investigate a large number of the trend graphs. Therefore, a lot of analyzing processes for an engineer are required to investigate the trend graph one by one for each variable.

Additionally, the data analysis using the trend graph does not employ a quantitative indicator. Accordingly, when the engineer investigates the respective trend graphs corresponding to a lot of the variables, the engineer may find difficulties in determining a variable to be identified and a variable to be used for extracting an area in which the values of the variable is distinctively different from that of the other areas. Consequently, precision of the data analysis may deteriorate.

Patent Document 1 discloses a manufacturing data analyzing method and a program for making a computer execute the same for efficiently extracting the information relating to the temporal variation of the variable having continuous values without using the trend graph. The manufacturing data analyzing method disclosed in Patent Document 1 provides an indicator (i.e., discriminative tracking feature: DTF) that indicates whether the temporal variation of the variable has a random pattern or a characteristic pattern. Particularly, if the temporal variation of the variable has a characteristic pattern, in many cases, it may be effective to perform the data analysis by focusing on the temporal variation of the variable.

Although the manufacturing data analyzing method disclosed in Patent Document 1 provides an indicator indicating whether the temporal variation is random or not, the method is not effective in judging whether there is an area having a statistical significant difference larger than that of the other areas, and extracting the area. In the manufacturing data analyzing method disclosed in Patent Document 1, in order to extract the area having the statistical significant difference larger than that of the other areas, it is necessary to investigate the trend graph even if the DTF has a large value. Particularly, if the investigating requires a relatively long period is required, it is necessary to investigate the trend graph for a discontinuous area while scrolling down a display screen. Accordingly, the number of processes are required and the precision of analysis decreases.

Additionally, in the data analysis by using the trend graph, it is difficult to decide position at which the distribution of numerical data on the trend graph is suitably partitioned into a large-valued area and a small-valued area. That is, it is difficult to judge which method for partitioning area can maximize the statistical significant difference between two areas. Accordingly, the effective method based on a quantitative standard is desirable. In addition, it is desirable to extract the variable and information of the corresponding area which are distinctively different from the other variables and areas, before investigating the trend graph for every variable. The invention is contrived to solve these problems.

SUMMARY OF THE INVENTION

It is an object of the invention to provide a data analyzing device and method for efficiently extracting data distribution information and the like and a program for making a computer execute the data analyzing method.

According to an aspect of the invention, there is provided a data analyzing method including the steps of:

allowing a memory unit to store m records Ri (i=1, 2, . . . , m and m is a natural number of 2 or more) having an explanatory variable xi and an object variable yi which is a quantitative variable; and allowing a computing unit
to read out the m records Ri from the memory unit,
to partition the m records Ri into n small sets Gj (j=1, 2, ..., n and n is a natural number satisfying $2 \leq n \leq m$),
to calculate an average value of the object variables yi for every small set Gj,
to rearrange the n small sets Gj in the ascending order or the descending order of the average value,
to calculate the n−1 combinations Ak in which the n rearranged small sets Gj are partitioned into the two large sets which are a large set G'1k including the k small sets Gj (k=1, 2, ..., n−1 and k is a natural number) selected in the descending order from the small set having the largest average value and a large set G'2k including the number n−k remaining small sets Gj,
to calculate a grade of unity which is represented as the following expression for each of the n−1 combinations Ak, and
to perform a predetermined data analyzing operation on the basis of the grade of unity:

Grade of Unity=[{$S0-(S1+S2)$}/$S0$]×100, where S0 is the sum of deviation squares of the object variables yi of the m records Ri,
S1 is the sum of deviation squares of the object variables yi of the records Ri belonging to the large set G'1k, and
S2 is the sum of deviation squares of the object variables yi of the records Ri belonging to the large set G'2k.

According to another aspect of the invention, there is provided a data analyzing program for making a computer execute the data analyzing method according to above aspect of the invention.

According to a further aspect of the invention, there is provided a data analyzing device including:
a memory unit for storing m records Ri (i=1, 2, ..., m and m is a natural number of 2 or more) having an explanatory variable xi and an object variable yi which is a quantitative variable; and
a computing unit for
reading out the m records Ri from the memory unit,
partitioning the m records Ri into n small sets Gj (j=1, 2, ..., n and n is a natural number satisfying $2 \leq n \leq m$),
calculating an average value of the object variables yi for every small set Gj,
rearranging the n small sets Gj in the ascending order or the descending order of the average value,
calculating the n−1 combinations Ak in which the n rearranged small sets Gj are partitioned into the two large sets which are a large set G'1k including the k small sets Gj (k=1, 2, ..., n−1 and k is a natural number) selected in the descending order from the small set having the largest average value and a large set G'2k including the number n−k remaining small sets Gj, where,
calculating a grade of unity which is represented as the following expression for each of the n−1 combinations Ak, and
performing a predetermined data analyzing operation on the basis of the grade of unity:

Grade of Unity=[{$S0-(S1+S2)$}/$S0$]×100, where S0 is the sum of deviation squares of the object variables yi of the m records Ri,
S1 is the sum of deviation squares of the object variables yi of the records Ri belonging to the large set G'1k, and
S2 is the sum of deviation squares of the object variables yi of the records Ri belonging to the large set G'2k.

According to the above-described aspects of the invention, it is possible to embody a data analyzing device and method for efficiently extracting data distribution information and the like and a program for making a computer execute the data analyzing method.

BRIEF DESCRIPTION OF THE DRAWINGS

FIG. 1 is a table illustrating a data file 1 subjected to a data analysis according to a first embodiment of the invention;
FIG. 4 is a table illustrating an example of output results obtained by the data analyzing method according to the first embodiment of the invention;
FIG. 10 is a table illustrating a data file 101 subjected to a data analysis according to a second embodiment of the invention;
FIG. 13 is a table illustrating an example of output results obtained by the data analyzing method according to the second embodiment of the invention;
FIG. 18 is a table illustrating a data file 201 subjected to a data analysis according to a third embodiment of the invention;
FIG. 21 is a table illustrating an example of output results obtained by the data analyzing method according to the third embodiment of the invention.

FIG. 26 is a table illustrating a data file 301 subjected to a data analysis according to a fourth embodiment of the invention;

FIG. 29 is a table illustrating an example of output results obtained by the data analyzing method according to the fourth embodiment of the invention;

FIG. 34 is a table illustrating a data file 401 subjected to a data analysis according to a fifth embodiment of the invention;

FIG. 36 is a table illustrating an example of output results obtained by the data analyzing method according to the fifth embodiment of the invention;

FIG. 45 is a table illustrating a data file 501 subjected to a data analysis according to a sixth embodiment of the invention;

FIG. 50 is a table illustrating an example of output results obtained by the data analyzing method according to the sixth embodiment of the invention;

FIG. 54 is a table illustrating a data file 601 subjected to a data analysis according to a seventh embodiment of the invention;

FIG. 58 is a table illustrating an example of output results obtained by the data analyzing method according to the seventh embodiment of the invention;

FIG. 62 is a table illustrating a data file 701 subjected to a data analysis according to an eighth embodiment of the invention;

FIG. 66 is a table illustrating an example of output results obtained by the data analyzing method according to the eighth embodiment of the invention;

FIG. 69 is a table illustrating a data file 801 subjected to a data analysis according to a ninth embodiment of the invention;

FIG. 73 is a table illustrating an example of output results obtained by the data analyzing method according to the ninth embodiment of the invention;

DESCRIPTION OF THE PREFERRED EMBODIMENT

First Embodiment

A data analyzing device, a data analyzing method, and program for making a computer execute the method according to a first embodiment of the invention will be described with reference to FIGS. 1 to 9. First, referring to FIGS. 1 and 2, data subjected to the data analysis according to the present embodiment will be described. FIG. 1 is a table illustrating a data file 1 subjected to the data analysis according to the first embodiment of the invention. As shown in FIG. 1, the data file 1 has daily data relating to temperature T1 (° C.) from March 1st to March 25th. The data file 1 includes 25 records Ri (i=1, 2, . . . , 25). Each record Ri has data of time D and the temperature T1 (° C.). A record number of each record Ri is given in the order of the time D.

For example, the temperature T1 is atmosphere temperature at which the semiconductor manufacturing process is performed, or stage temperature at which several processing treatments are performed. The temperature T1 is a factor having influence on the yield or performance of a product. The data analysis according to the present embodiment, temperature T1 is defined as an object variable and the time D is defined as an explanatory variable. Generally, in the data analysis, a variable used for the purpose of finding a fluctuation factor or a fluctuation pattern is referred to as an object variable, and a variable to explain the fluctuation corresponding to the object variable is called an explanatory variable.

Figure 2:
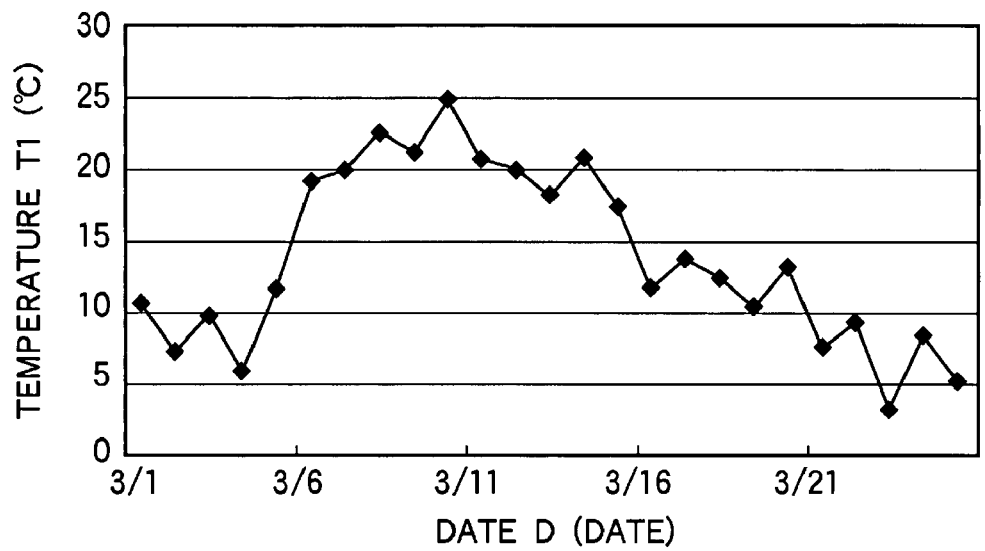
FIG. 2 is a trend graph of temperature T1.

FIG. 2 is a trend graph of temperature T1. The horizontal axis represents the time D (date), and the vertical axis represents the temperature T1 (° C.). As shown in FIG. 2, the trend graph of the temperature T1 shows a peak area which has high values of the temperature T1 in the front portion of the center region, and a trend of a gradual increase and a gradual decrease from the peak area as the maximum area, and a area which has slightly low values of the temperature T1 in the first and end area.

Hereinafter, the data analyzing method according to the present embodiment will be described. It is an object of the data analyzing method to extract an area which is distinctively different from the other area with regard to a value of the temperature T1 (object variable). For example, the data analyzing method is performed on a computer by a program for executing the method. First, as shown in FIG. 1, 25 records Ri are rearranged in order of the explanatory variable, that is, in order of the time D.

Next, as shown in FIG. 1, the 25 records Ri rearranged in the order of the time D are partitioned into 5 small sets Gj (j=1, 2, . . . , 5). Each of the small sets Gj includes the records Ri which are continuous and rearranged in the order of the time D. Each of the small sets Gj includes the same number (5) of records Ri. One of the records Ri belongs to any one of the small sets Gj, and each record Ri has a group ID (Gj) as an attribute. Each small set Gj has information of attributes including the group ID, a starting record number and an ending record number (or starting time and ending time) of each of the records Ri composing the small set Gj, and the object variable (temperature T1) of each of the records Ri. The five small sets Gj are arranged in the order of the time D: i.e., in the order of G1, G2, G3, G4, and G5.

As shown in FIG. 1, the small set G1 includes the records R1 to R5 (March 1st to 5th). The small set G2 includes the records R6 to R10 (March 6th to 10th). The small set G3 includes the records R11 to R15 (March 11th to 15th). The small set G4 includes the records R16 to R20 (March 16th to 20th). The small set G5 includes the records R21 to R25 (March 21st to 25th).

Figure 3:
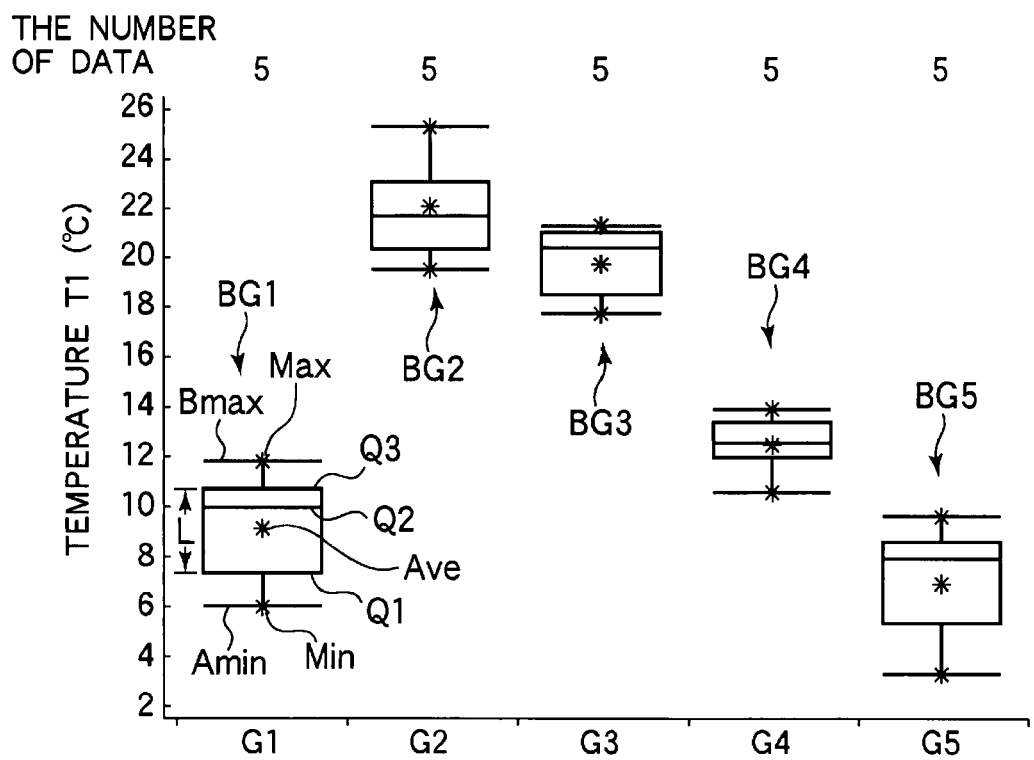
FIG. 3 is a box and whisker plot illustrating distribution of the temperature T1 for every small set Gj.

Here, the distribution of temperature T1 in each of the small sets Gj is illustrated in FIG. 3. FIG. 3 is a box and whisker plot illustrating the distribution of temperature T1 in each of the small sets Gj. In FIG. 3, the horizontal axis represents the small set Gj, the vertical axis represents the temperature T1 (° C.). The number of records (the number of data) belonging to each of the small sets G1 to G5 is displayed on each of the top portions of the box and whisker plots BG1 to BG5 of the small sets G1 to G5. Referring to the box and whisker plot BG1 of the small set G1, the way the box and whisker plot is constructed will be described. In the box and whisker plot BG1, "*" Max in the upper portion of the plot represents the maximum value of the temperature T1 in the small set G1, "*" Ave in the central portion represents the average value, and "*" Min in the lower portion represents the minimum value.

Additionally, the lower side Q1 of the box represents a first quartile (a 25% point), the side Q2 in the box represents a second quartile (a middle value), and the upper side Q3 of the box represents a third quartile (a 75% point). Since the small set G1 includes five records Ri, the first quartile Q1 represents the fourth largest value of the temperature T1 among the small set G1, the second quartile Q2 represents the third largest value of the temperature T1, and the third quartile Q3 represents the second largest value of the temperature T1.

The height L of the box is given as L=Q3−Q1 and is referred to as a quartile range (i.e., a quartile deviation). The side Amin in the lower part of the box represents the minimum value of the temperature T1 in the range A (Q1−1.5L≦A≦Q1) between the first quartile Q1 and the position apart therefrom toward the lower part of the box by 1.5 times the quartile range L. The side Bmax in the upper part of the box represents the maximum value of the temperature T1 in the range B (Q3≦B≦Q3 +1.5L) between the third quartile Q3 and the position apart therefrom toward the upper part of the box by 1.5 times the quartile range L. When the data of the temperature T1 does not exist in the corresponding range, the sides Amin and/or Bmax are not plotted. The box and whisker plots BG2 to BG5 of the small sets G2 to G5 and the plots illustrated in FIG. 3 and the following drawings are constructed in the same manner as the above-described box and whisker plot BG1.

The data analyzing method according to the present embodiment will be described again. After partitioning the records into five small sets Gj, the average value Ave (T1) of the temperature T1 of the records Ri belonging to each of the small sets Gj is calculated. As shown in FIG. 3, if the small sets Gj are rearranged in the order of the larger average value Ave (T1) of the temperature T1, the small sets are arranged in the order of G2 (average value=21.7), G3 (19.52), G4 (12.32), G1 (9.12), and G5 (6.82). Next, the five small sets Gj are rearranged in the descending order of the average value Ave (T1). The small sets Gj are arranged in the order of G2, G3, G4, G1, and G5.

Next, four (=5–1) combinations Ak of the small sets Gj are calculated in which the five small sets Gj rearranged in the order of the average value are partitioned into two large sets which are a large set G'1k including k small sets Gj (k=1, 2, . . . , 4 (=5–1); and k is a natural number) selected in the descending order of the average value from the small set having the largest average value and a large set G'2k including 5–k remaining small sets Gj. The four combinations Ak are listed in Table 1.

TABLE 1

| COMBINATION Ak | LARGE SET G'1k | LARGE SET G'2k |
| --- | --- | --- |
| A1 | G2 | G3, G4, G1, G5 |
| A2 | G2, G3 | G4, G1, G5 |
| A3 | G2, G3, G4 | G1, G5 |
| A4 | G2, G3, G4, G1 | G5 |

Table 1 shows the small sets Gj belonging to the large sets G'1k and G'2k for every four combinations Ak. For example, in the case of combination A1, the large set G'11 includes one small set G2 having the largest average value, and the large set G'21 includes four small sets G3, G4, G1, and G5 having the average values smaller than that of G2. In the case of combination A2, the large set G'12 includes two small sets G2 and G3 respectively having the largest and the second largest average values, and the large set G'22 includes three small sets G4, G1, and G5 having the average values smaller than those of G2 and G3.

Next, a grade of unity represented by Expression 1 is calculated for every four combinations Ak.

$$\text{Grade of Unity} = [\{S0 - (S1 + S2)\}/S0] \times 100 \quad (1)$$

In the above expression, S0 is the sum of deviation squares of the object variables (in the present embodiment, the variable is the temperature T1) of m records Ri (in the present embodiment, m=25), S1 is the sum of deviation squares of the temperature T1 of the records Ri belonging to the large set G'1k, and S2 is the sum of deviation squares of the temperature T1 of the records Ri belonging to the large set G'2k. The average value (13.896) of the temperature T1 of the 25 records Ri is used in calculation of the sum of deviation squares S0. The average value of the temperature T1 of the records Ri belonging to the large set G'1k is used in calculation of the sum of deviation squares S1. The average value of the temperature T1 of the records Ri belonging to the large set G'2k is used in calculation of the sum of deviation squares S2. The grade of unity can take values in the range of from 0% to 100%.

The grade of unity has a mathematical meaning as described below. The grade of unity is an indicator that indicates how much the unity of the values of the temperature T1 of the records Ri belonging to each of the large sets G'1k and G'2k will be improved when partitioning the n small sets Gj (in the present embodiment, n=5) are partitioned into the two large sets G'1k and G'2k. The larger the value of grade of unity, the lesser the dispersion in the values of the temperature T1 of the records Ri belonging to each of the large sets G'1k and G'2k will become prominent by the partition of the small sets Gj into the two large sets G'1k and G'2k. Conversely, the smaller the value of grade of unity, the dispersion in the values of the temperature T1 of the records Ri belonging to each of the large sets G'1k and G'2k is less likely to be variable by the partitioning.

Next, the grade of unity obtained for the same data, that is, the same S0 in Expression 1 (which is true in this application) will be described. As mentioned above, having a great value of grade of unity indicates that the dispersion of the temperature T1 in the two large sets G'1k and G'2k is small. That is, in the case of the same two large sets G'1k and G'2k, having a great value of grade of unity indicates that a statistical significance difference of the temperature T1 of the records Ri belonging to the respective set is large. A smaller value of grade of unity means a smaller statistical significance difference.

The grade of unity is a standardized indicator, and is an indicator that is not influenced by the object variables and physical units of the object variables. Since the grade of unity is a standardized indicator, it can be treated as a common indicator even in the analysis of other data (temperature T2, T3, T4, or the like subjected to the data analysis of second to fourth embodiments) other than the temperature T1. The calculation result of the grade of unity for every 4 combinations Ak is shown in Table 2.

TABLE 2

| COMBINATION Ak | LARGE SET G'1k | LARGE SET G'2k | GRADE OF UNITY |
| --- | --- | --- | --- |
| A1 | G2 | G3, G4, G1, G5 | 41.13 |
| A2 | G2, G3 | G4, G1, G5 | 81.19 |
| A3 | G2, G3, G4 | G1, G5 | 63.25 |
| A4 | G2, G3, G4, G1 | G5 | 33.82 |

Table 2 shows the small sets Gj belonging to the large sets G'1k and G'2k for every four combinations Ak and the grade of unity for every four combinations Ak. As shown in Table 2, the combinations have a greater grade of unity in the A2, A3, A1, and A4 order.

Next, the four combinations Ak are rearranged in the descending order (in the A2, A3, A1, and A4 order) of the values of the grade of unity. Then, the value and rank of the grade of unity and the starting record number and ending record number (starting time and ending time) of the records Ri belonging to the large sets G'1k and G'2k are outputted in the descending order of the value of the grade of unity from the combination Ak having the largest value of the grade of unity. When the output result is displayed on a screen of a computer, in addition to the aforementioned output data, descriptive statistics (the number of data, the maximum value, the minimum value, the average value, the standard deviation, and the like) of the object variable (i.e., the temperature T1) for each of the large sets G'1k and G'2k are also outputted, and thus it is possible to easily recognize the output result. In the data analyzing method according to the present embodiment, since m records Ri (in the present embodiment, m=25) is grouped into n small sets Gj (in the present embodiment, n=5) in the order of the time D, the combinations Ak of the areas having a difference between the values of object variable (temperature T1) are sequentially extracted.

FIG. 4 illustrates an example of output results obtained by the data analyzing method according to the present embodiment. In FIG. 4, the combinations Ak, the grade of unity, the small sets Gj and the number of records Ri (large set G'1k (number of records)) belonging to the large set G'1k, the small sets Gj and the number of records Ri (large set G'2k (number of records)) belonging to the large set G'2k, an area of the large set G'1k (large set G'1k area), and an area of the large set G'2k (large set G'2k area) are shown in the descending order (rank) of the value of the grade of unity.

When the areas of the large sets G'1k and G'2k illustrated in FIG. 4 are displayed on a screen of a computer, the state where the small sets Gj are continuously arranged is automatically recognized and displayed as continuous areas. For example, as shown in FIG. 4, the large set G'12 of the combination A2 includes a small set G2 (March 6th to March 10th), G3 (March 11th to March 15th) having continuous dates, and thus the area of the large set G'1k is displayed as '3/6-3/15'.

As shown in FIG. 4, the combination Ak (rank 1) having the largest grade of unity is the combination A2. In the combination A2, the large set G'12 includes the small sets G2 and G3 (3/6-3/15), and the large set G'22 includes the small sets G1, G4, and G5 (3/1-3/5, 3/16-3/25). The grade of unity of the combination A2 is 81.19 which is a relatively large value. The combination Ak (rank 2) having the second largest grade of unity is the combination A3. In the combination A3, the large set G'13 includes the small sets G2, G3, and G4 (3/6-3/20), and the large set G'23 includes the small sets G1 and G5 (3/1-3/5, 3/21-3/25). The grade of unity of the combination A3 is 63.25. The combination Ak (rank 3) having the third largest grade of unity is the combination A1. The grade of unity of the combination A1 is 41.13. The combination Ak having the smallest grade of unity is the combination A4. The grade of unity of the combination A4 is 33.82.

Figure 5:
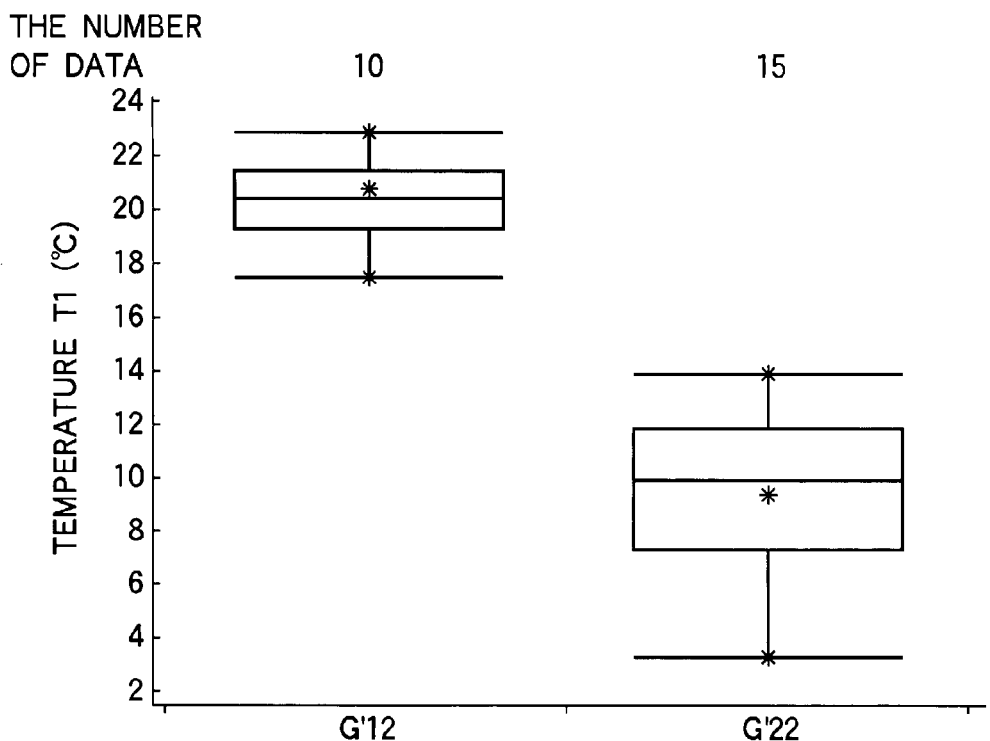
FIG. 5 is a box and whisker plot illustrating the distribution of the temperature T1 corresponding to G'12, G'22 of a combination A2.
Figure 6:
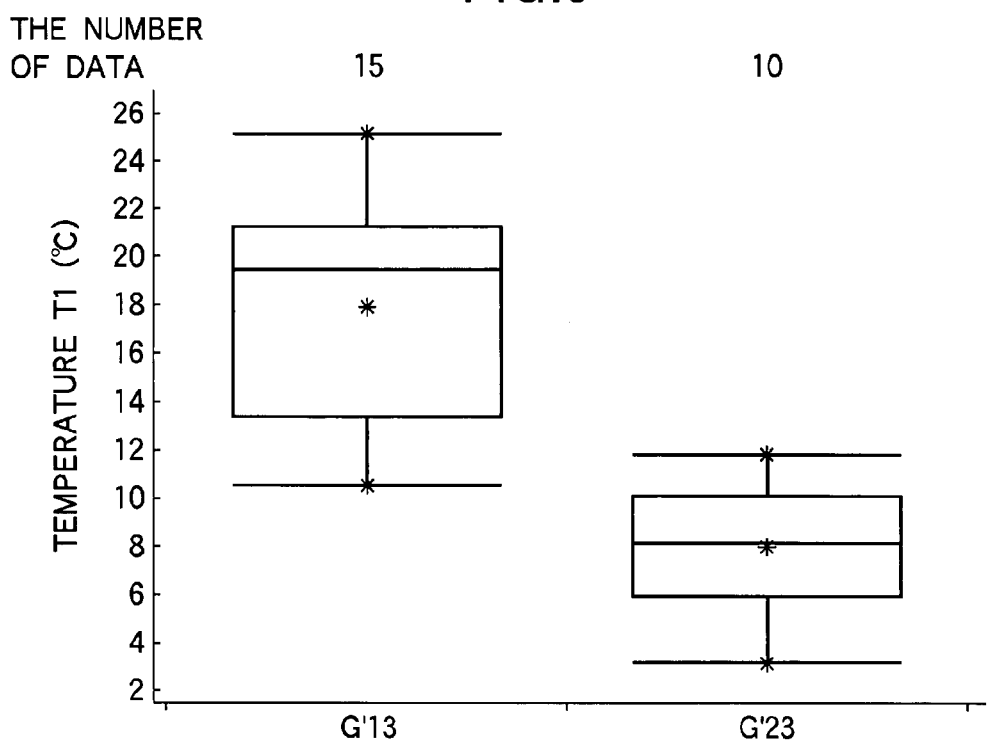
FIG. 6 is a box and whisker plot illustrating the distribution of the temperature T1 corresponding to G'13, G'23 of a combination A3.
Figure 7:
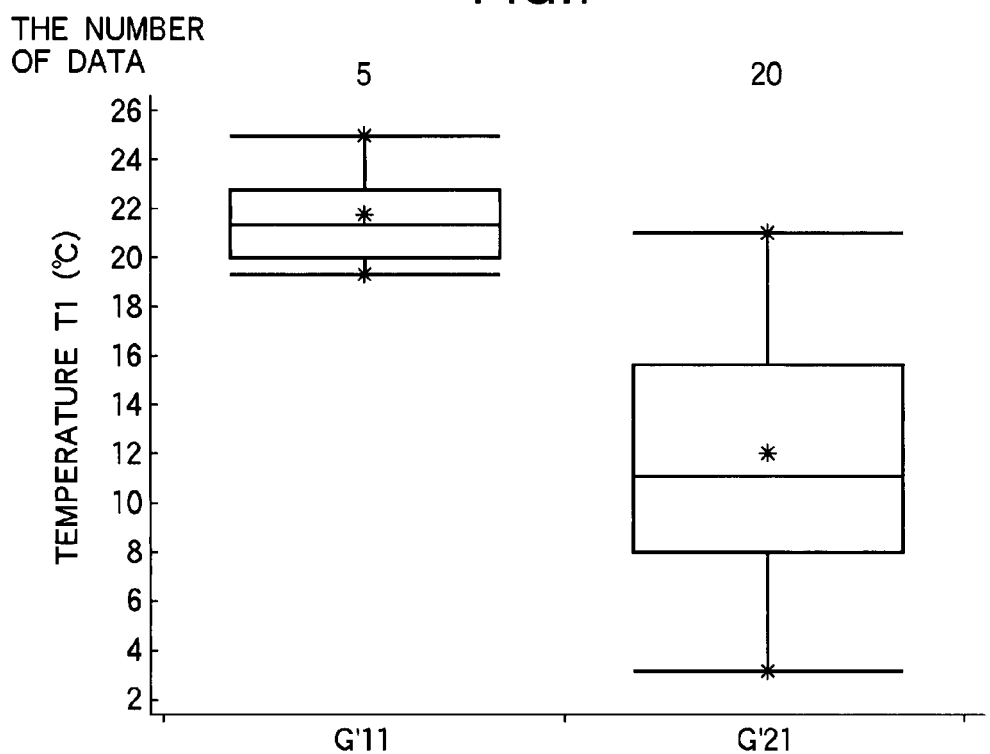
FIG. 7 is a box and whisker plot illustrating the distribution of the temperature T1 corresponding to G'11, G'21 of a combination A1.
Figure 8:
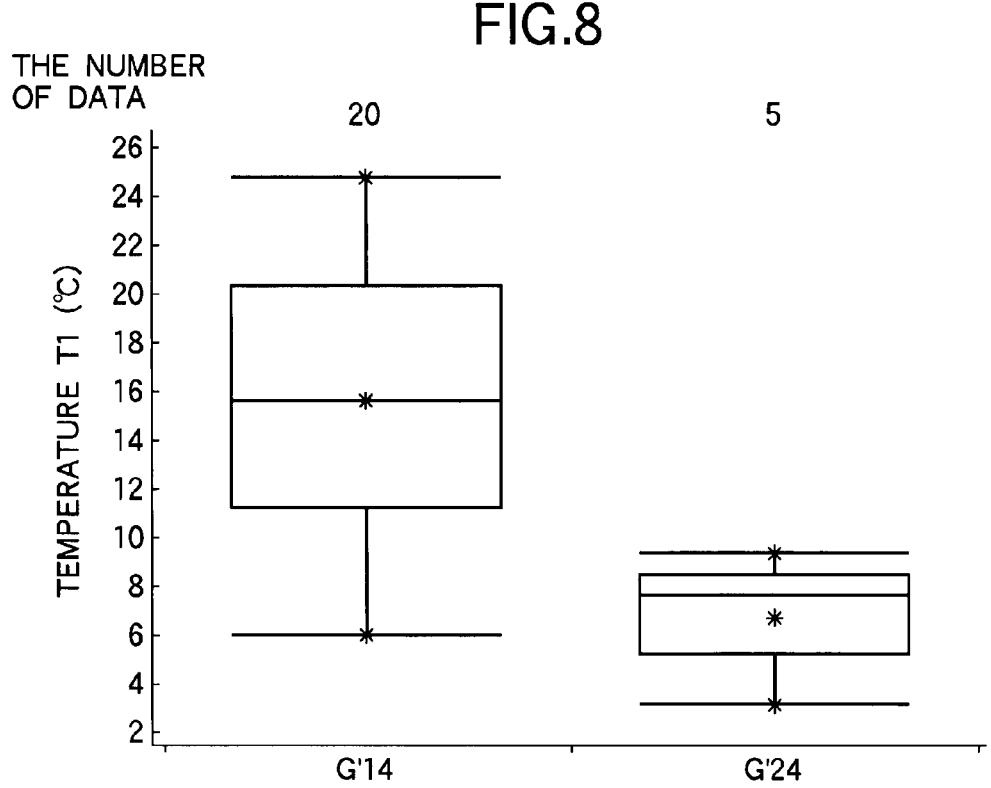
FIG. 8 is a box and whisker plot illustrating the distribution of the temperature T1 corresponding to G'14, G'24 of a combination A4.

FIG. 5 is a box and whisker plot illustrating the distribution of the temperature T1 corresponding to the large sets G'12 and G'22 of the combination A2. Likewise, FIGS. 6 to 8 are box and whisker plots illustrating the distribution of the temperature T1 corresponding to the large sets G'1k and G'2k of the combinations A3, A1, and A4. In FIGS. 5 to 8, the horizontal axis represents the large sets G'1k and G'2k, and the vertical axis represents the temperature T1 (° C.). As shown in FIG. 5, in the combination A2 having the largest grade of unity of 81.19, the statistical significance difference of the temperature T1 between the large sets G'12 and G'22 becomes the maximum. As shown in FIGS. 5 to 8, the statistical significance difference of the temperature T1 between the large sets G'1k and G'2k decreases with the decrease of the grade of unity.

According to the data analyzing method of the present embodiment, when partitioning the n small sets Gj (in the present embodiment, n=5) into two large sets G'1 and G'2, the partitioning method for maximizing the statistical significance difference of the values of temperature T1 between the two large sets G'1 and G'2 is automatically extracted by means of the grade of unity which is a quantitative indicator. Thus, the grade of unity is an indicator that indicates the statistical significance difference. Accordingly, an engineer can quantitatively recognize from the grade of unity that the statistical significance difference decreases in the order of the combination A2, A3, A1, and A4.

If the engineer tries to extract an area in which the temperature T1 (i.e., the object variable) is distinctively different from that of other areas from the trend graph illustrated in FIG. 2, the engineer has to judge on the basis of their know-how, experience, technique, and the like. In FIG. 2, since the temperature T1 of an area of 3/6-3/10 is relatively high, the engineer can find the area of 3/6-3/10 as a noticeable area without difficulty. Therefore, it is desirable to perform the analysis only on the area, assuming that the area is under a particular circumstance.

Meanwhile, according to the data analyzing method of the present embodiment, the statistical significance difference of the temperature T1 is automatically extracted in which the statistical significance difference becomes the maximum in the case (combination A2) where the 5 small sets Gj are partitioned into an area (the small sets G2 and G3) of 3/6-3/15 and an area (the small sets G1, G4, and G5) of 3/1-3/5 and 3/16-3/25. Therefore, the engineer can recognize that analyzing to find what causes the difference between both areas is more effective in finding the cause of defects.

In the case (combination A3) where the 5 small sets Gj is partitioned into an area (the small sets G2, G3, and G4) of 3/6-3/20 and an area (the small sets G1 and G5) of 3/1-3/5 and 3/21-3/25, the second largest grade of unity is obtained. Whether the area partition should be noticed is judged by the grade of unity.

The data analyzing method according to the present embodiment has advantages as bellows.

According to the present embodiment, it is automatically extracted whether the utmost statistical significance difference exists between the values of the object variable (temperature T1) of the two areas, depending on which area partition is performed. Therefore, different from the known data analyzing method, it is not necessary for the engineer to perform the data analysis by looking into the trend graph one by one, and the engineer can get information about the area partition having the utmost statistical significance difference before looking into the trend graph. Accordingly, the data analyzing method according to the present embodiment can achieve the efficient data analysis, and thus making the time required to the data analysis short. In addition, according to the present embodiment, since the data analysis is performed by using the quantitative indicator which is the grade of unity, the proportion of depending on the engineers' know-how, experience, technique, and the like may be reduced. As a result, the data analyzing method according to the present embodiment can achieve a high reliable data analysis.

In the data analyzing method according to the present embodiment, the m records Ri (in the present embodiment, m=25) is partitioned into the n small sets Gj (in the present embodiment, n=5). Additionally, in a method of partitioning n small sets Gj into two large sets G'1 and G'2, the partitioning method which gives the maximum statistical significance difference of the value of the object variable (which is the temperature T1 in the present embodiment) of the two large sets G'1 and G'2 is extracted. A regression tree data analysis method which is a method of extracting the corresponding the statistical significance difference is applied to the data analyzing method according to the present embodiment.

Figure 9:
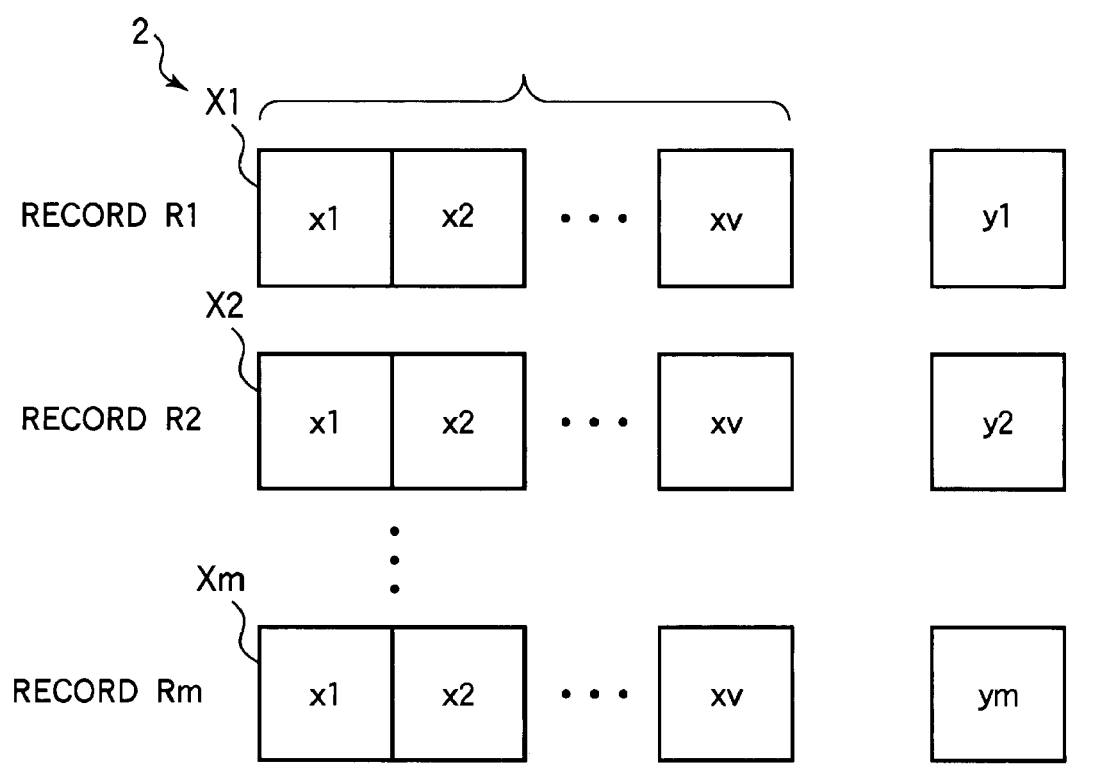
FIG. 9 is a diagram illustrating a data file 2 subjected to a data analysis in a regression tree analysis.

Referring to FIG. 9, the regression tree data analysis will be briefly described. FIG. 9 is a diagram illustrating a data file 2 subjected to a data analysis in a regression tree analysis. As shown in FIG. 9, the regression tree data analysis analyzes the m records Ri having explanatory variable groups Xi (i=1, 2, . . . , m, m=2, and m is a natural number) including v explanatory variables xu (u=1, 2, . . . , v, and v is a natural number) and an object variable yi under the influence of the explanatory variable group Xi. As a result, the analysis extracts the explanatory variable xu and the condition thereof (values of the explanatory variable xu) which have influence on the object variable yi. The object variable yi is a quantitative variable.

A process of regression tree data analysis is operable to repeat the two partitions of the sets on the basis of the values of the explanatory variable xu. First, in the regression tree data analysis, the m records Ri is partitioned into the two large sets G'1 and G'2. When partitioning the corresponding sets, the type and value of the explanatory variable xu having the maximum ΔS which is represented by the following Expression 2 is obtained, and then the plural records Ri into two large sets G'1 and G'2 are partitioned on the basis of the corresponding explanatory variable xu and the value thereof.

$$\Delta S = S0 - (S1 + S2) \quad (2)$$

The S0 is the sum of deviation squares of the object variable yi of the m records Ri ahead of the partition, and the S1 and S2 are the sum of deviation squares of the object variable yi of the two large sets G'1 and G'2 after partition, respectively. Here, the utmost statistical significance difference occurs between the values of the object variable yi of the two large sets G'1 and G'2 by a set partition having the maximum ΔS.

In the regression tree data analysis, the ΔS is calculated for the entire $2^{(m-1)}-1$ combinations of the m records Ri in which the m records are partitioned into the two large sets G'1 and G'2, and the combination having the most statistical significance difference between values of the object variables yi is extracted. This is because the regression tree data analysis is designed to find the values of the object variable yi on the basis of the combination for every level value of explanatory variable xu.

Meanwhile, the difference between the data analyzing method according to the present embodiment and the regression tree data analysis is as follows. In the data analyzing method according to the present embodiment, the explanatory variable regarded as a factor having influence on the object variable yi (i.e., the temperature T1) is one type of the small set Gj representing a time area. Additionally, in the data analyzing method according to the present embodiment, it is possible to find the statistical significance difference of the object variable yi, only for the n−1 combinations for partitioning the n small sets Gj into two sets in the order of the large average value of the object variable yi. Here, in the data analyzing method according to the present embodiment, the task is obtaining the statistical significance difference which occurs between the values of the object variable yi when the n small sets Gj is partitioned into the two sets by combination of the level values of the small sets Gj having n levels.

Second Embodiment

A data analyzing device, a data analyzing method, and program for making a computer execute the method according to a second embodiment of the invention will be described with reference to FIGS. 10 to 17. First, referring to FIGS. 10 and 11, data subjected to the data analysis according to the present embodiment will be described. FIG. 10 is a table illustrating a data file 101 subjected to the data analysis according to the second embodiment of the invention. As shown in FIG. 10, the data file 101 has daily data relating to temperature T2 (° C.) from March 1st to March 25th. The data file 101 includes 25 records Ri (i=1, 2, . . . , 25). Each record Ri has data of time D and the temperature T2 (° C.). A record number of each record Ri is given in the order of time D.

For example, in the same manner as temperature T1, the temperature T2 is atmosphere temperature at which the semiconductor manufacturing process is performed, or stage temperature at which several processing treatments are performed. The temperature T2 is a factor having influence on the yield or performance of a product. The data analysis according to the present embodiment, temperature T2 is defined as an object variable and the time D is defined as an explanatory variable.

Figure 11:
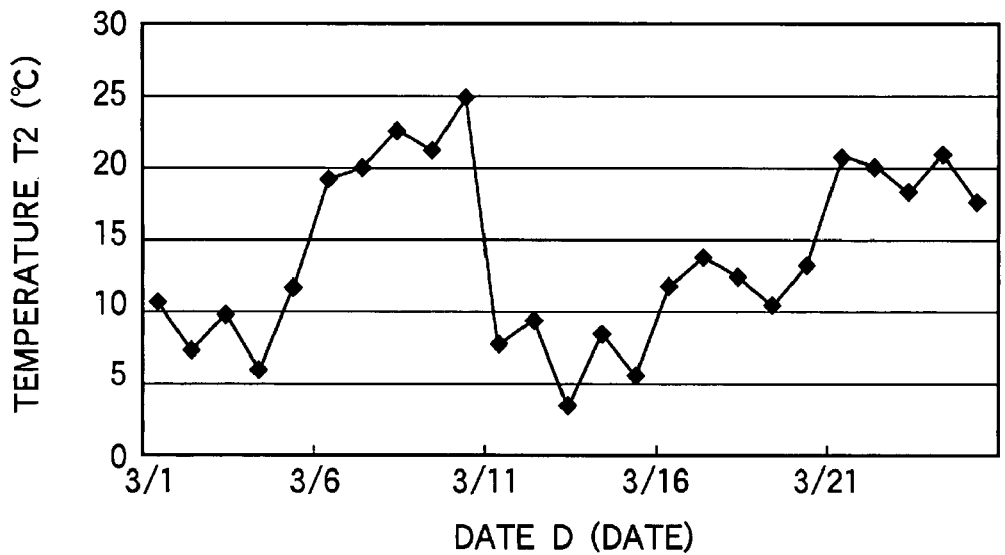
FIG. 11 is a trend graph of temperature T2.

FIG. 11 is a trend graph of temperature T2. The horizontal axis represents the time D (date), and the vertical axis represents the temperature T2 (° C.). As shown in FIG. 11, it looks like the temporal variation of the temperature T2 is excessively different from the temporal variation of the temperature T1 illustrated in FIG. 2. However, as shown in FIGS. 1 and 10, the temporal variation of the temperature T2 is different with the temporal variation of the temperature T1 only in that the temperature of 3/11-3/15 (which are the area of small set G3 in the first embodiment) changes with the temperature of 3/21-3/25 (which are the area of the small set G5 in the first embodiment).

Hereinafter, the data analyzing method according to the present embodiment will be described. In the present embodiment, the data analysis which is the same as the data analyzing method according to the first embodiment is performed on the data file 101. First, as shown in FIG. 10, 25 records Ri are rearranged in order of the explanatory variable, that is, in order of the time D.

Next, as shown in FIG. 10, the 25 records Ri rearranged in the order of the time D are partitioned into five small sets Gj (j=1, 2, . . . , 5). Each of the small sets Gj includes the records Ri which are continuous and rearranged in the order of the time D. Each of the small sets Gj includes the same number (5) of records Ri. Each area of the small sets Gj is the same as each area of the small sets Gj in the first embodiment. Each record Ri belongs to any one of the small sets Gj, and each record Ri has a group ID (Gj) as an attribute. Each small set Gj has information of attributes including the group ID, a starting record number and an ending record number (or starting time and ending time) of each of the records Ri composing the small set Gj, and the object variable (temperature T2) of each of the records Ri. The five small sets Gj are arranged in the order of the time D: i.e., in the order of G1, G2, G3, G4, and G5.

As shown in FIG. 10, the small set G1 includes the records R1 to R5 (March 1st to 5th). The small set G2 includes the records R6 to R10 (March 6th to 10th). The small set G3 includes the records R11 to R15 (March 11th to 15th). The small set G4 includes the records R16 to R20 (March 16th to 20th). The small set G5 includes the records R21 to R25 (March 21st to 25th).

Figure 12:
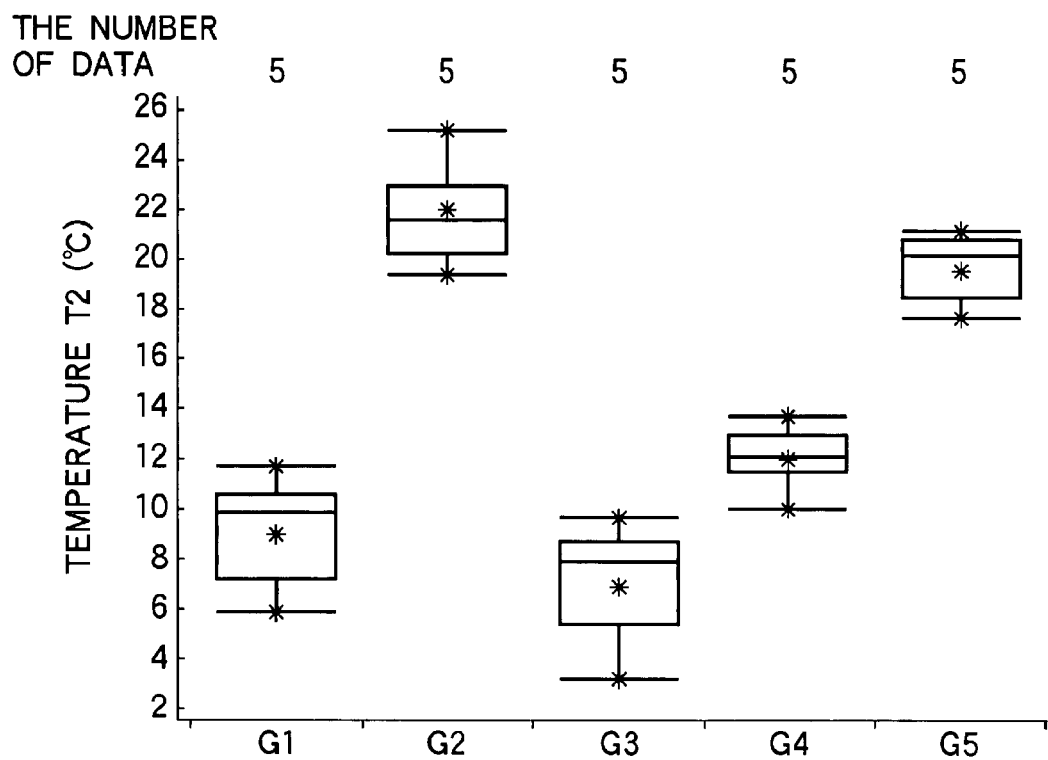
FIG. 12 is a box and whisker plot illustrating distribution of the temperature T2 for every small set Gj.

Here, the distribution of temperature T2 in each of the small sets Gj is illustrated in FIG. 12. FIG. 12 is a box and whisker plot illustrating the distribution of temperature T2 in each of the small sets Gj. In FIG. 12, the horizontal axis represents the small set Gj, the vertical axis represents the temperature T2 (° C.). The time varying fluctuation of the temperature T2 is different from the time varying fluctuation of the temperature T1 only in that the temperature in the area (March 11th to 15th) of the small set G3 is changed with the temperature in the area (March 21st to 25th) of the small set G5. Accordingly, as shown in FIG. 12, the distribution of the temperature T2 of each of the small sets Gj is different from the distribution of the temperature T1 of each of the small sets Gj illustrated in FIG. 3 only in that the temperature distribution of the small set G3 is changed with the temperature distribution of the small set G5.

After partitioning the records into five small sets Gj, the average value Ave (T2) of the temperature T2 of the records Ri belonging to each of the small sets Gj is calculated. As shown in FIG. 12, if the small sets Gj are rearranged in the order of the larger average value Ave (T2) of the temperature T2, the small sets are arranged in the order of G2, G5, G4, G1, and G3. Next, the five small sets Gj are rearranged in the descending order of the average value Ave (T2). The small sets Gj are arranged in the order of G2, G5, G4, G1, and G3.

The order of the five small sets Gj rearranged in the descending order of the average value Ave (T2) of the temperature T2 is different from that of the sets rearranged in the descending order of the average value Ave (T1) of the temperature T1, only in that the order of G5 and G3 are changed with each other.

Next, four (=5−1) combinations Ak of the small sets Gj are calculated in which the five small sets Gj rearranged in the order of the average value are partitioned into two large sets which are a large set G'1k including k small sets Gj (k=1, 2, ..., 4 (=5−1); and k is a natural number) selected in the descending order of the average value from the small set having the largest average value and a large set G'2k including 5−k remaining small sets Gj. The four combinations Ak are listed in Table 3.

TABLE 3

| COMBINATION Ak | LARGE SET G'1k | LARGE SET G'2k |
|---|---|---|
| A1 | G2 | G5, G4, G1, G3 |
| A2 | G2, G5 | G4, G1, G3 |
| A3 | G2, G5, G4 | G1, G3 |
| A4 | G2, G5, G4, G1 | G3 |

Table 3 shows the small sets Gj belonging to the large sets G'1k and G'2k for every four combinations Ak. For example, in the case of combination A1, the large set G'11 includes one small set G2 having the largest average value, and the large set G'21 includes four small sets G5, G4, G1, and G3 having the average values smaller than that of G2. In the case of combination A2, the large set G'12 includes two small sets G2 and G5 respectively having the largest and the second largest average values, and the large set G'22 includes three small sets G4, G1, and G3 having the average values smaller than those of G2 and G5.

Next, a grade of unity is calculated for every four combinations Ak. The calculation result of the grade of unity for every four combinations Ak is shown in Table 4.

TABLE 4

| COMBINATION Ak | LARGE SET G'1k | LARGE SET G'2k | GRADE OF UNITY |
|---|---|---|---|
| A1 | G2 | G5, G4, G1, G3 | 41.13 |
| A2 | G2, G5 | G4, G1, G3 | 81.19 |
| A3 | G2, G5, G4 | G1, G3 | 63.25 |
| A4 | G2, G5, G4, G1 | G3 | 33.82 |

Table 4 shows the small sets Gj belonging to the large sets G'1k and G'2k for every four combinations Ak and the grade of unity for every four combinations Ak. As shown in Table 4, the combinations have a greater grade of unity in the A2, A3, A1, and A4 order. The distribution of the temperature T2 of each of the small sets Gj is different from the distribution of the temperature T1 of each of the small sets Gj only in that the temperature distribution of the small set G3 is changed with the temperature distribution of the small set G5. Accordingly, the distribution of the temperature T2 in each of the large sets G'1k and G'2k of the combinations Ak is the same as the distribution of the temperature T1 in each of the large sets G'1k and G'2k of the first embodiment. Therefore, the grade of unity of each of the combinations Ak is the same as the grade of unity of each of the combinations Ak of the first embodiment.

Next, the four combinations Ak are rearranged in the descending order (in the order of A2, A3, A1, and A4) of the values of the grade of unity. Then, the value and rank of the grade of unity and the starting record number and ending record number (starting time and ending time) of the records Ri belonging to the large sets G'1k and G'2k are outputted in the descending order of the value of the grade of unity from the combination Ak having the largest value of the grade of unity.

FIG. 13 illustrates an example of output results obtained by the data analyzing method according to the present embodiment. In FIG. 13, the combinations Ak, the grade of unity, the small sets Gj and the number of records Ri (large set G'1k (number of records)) belonging to the large set G'1k, the small sets Gj and the number of records Ri (large set G'2k (number of records)) belonging to the large set G'2k, an area of the large set G'1k (large set G'1k area), and an area of the large set G'2k (large set G'2k area) are shown in the descending order (rank) of the value of the grade of unity.

As shown in FIG. 13, the combination Ak (rank 1) having the largest grade of unity is the combination A2. In the combination A2, the large set G'12 includes the small sets G2 and G5 (3/6-3/10, 3/21-3/25), and the large set G'22 includes the small sets G1, G3, and G4 (3/1-3/5, 3/11-3/20). The grade of unity of the combination A2 is 81.19 which is a relatively large value. The combination Ak (rank 2) having the second largest grade of unity is the combination A3. In the combination A3, the large set G'13 includes the small sets G2, G4, and G5 (3/6-10 and 3/16-3/25), and the large set G'23 includes the small sets G1 and G3 (3/1-3/5, 3/11-3/15). The grade of unity of the combination A3 is 63.25. The combination Ak (rank 3) having the third largest grade of unity is the combination A1. The grade of unity of the combination A1 is 41.13. The combination Ak having the smallest grade of unity is the combination A4. The grade of unity of the combination A4 is 33.82.

Figure 14:
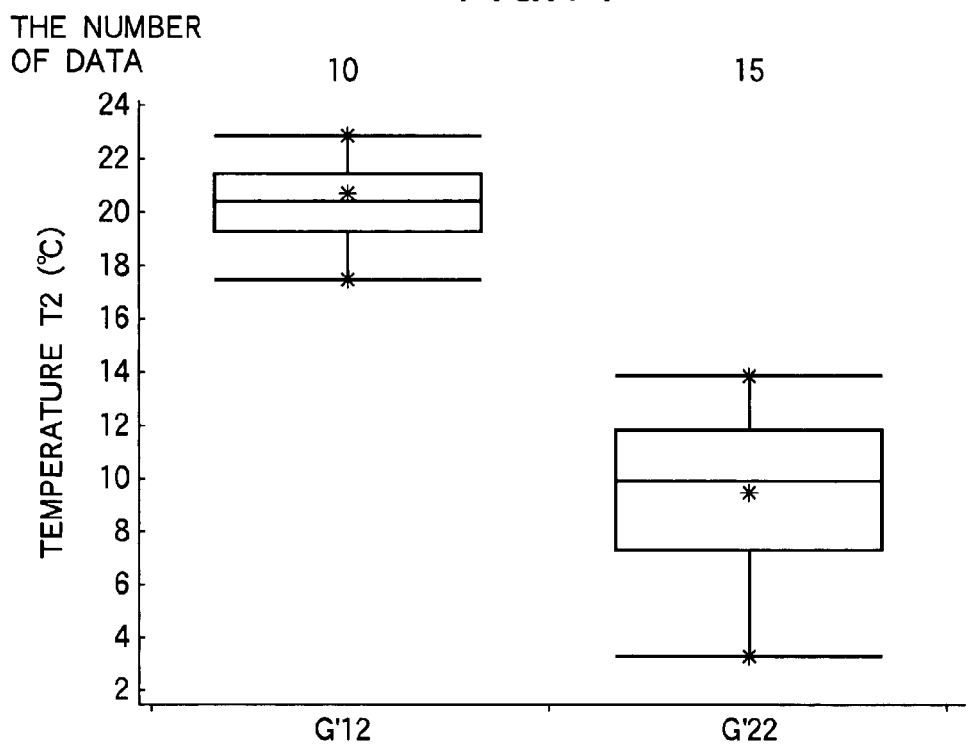
FIG. 14 is a box and whisker plot illustrating the distribution of the temperature T2 corresponding to G'12, G'22 of a combination A2.
Figure 15:
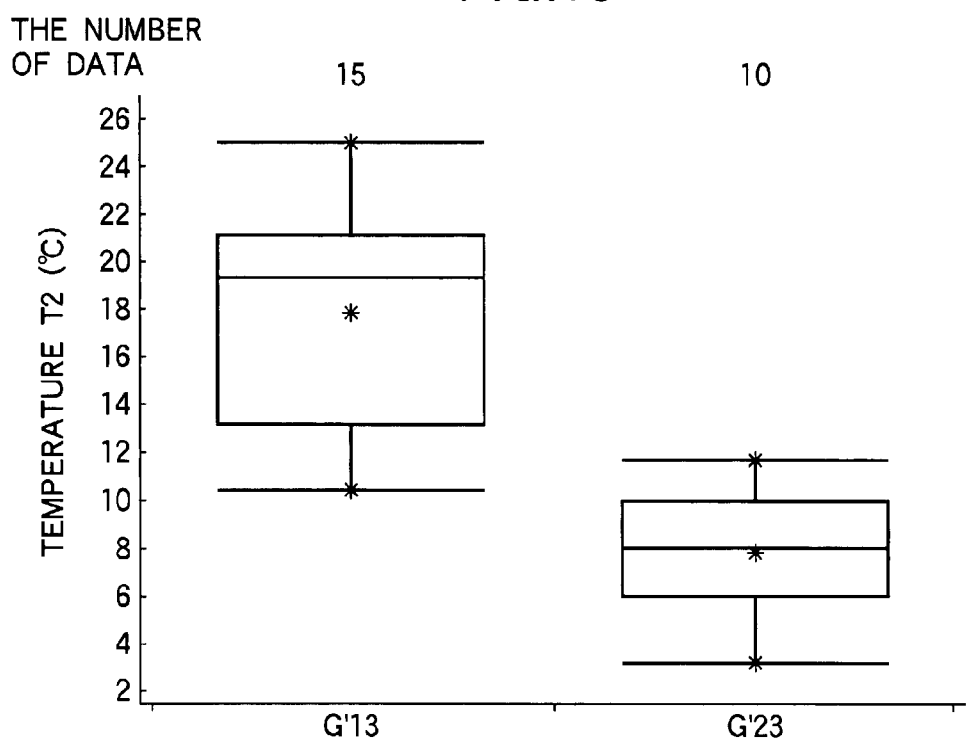
FIG. 15 is a box and whisker plot illustrating the distribution of the temperature T2 corresponding to G'13, G'23 of a combination A3.
Figure 16:
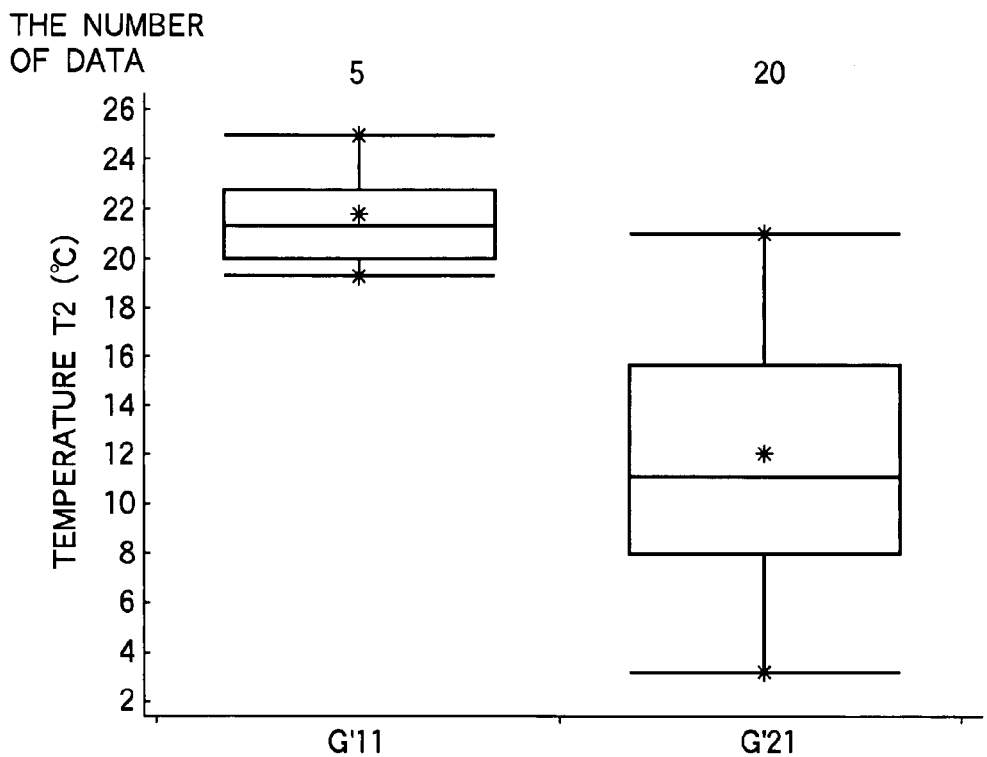
FIG. 16 is a box and whisker plot illustrating the distribution of the temperature T2 corresponding to G'11, G'21 of a combination A1.
Figure 17:
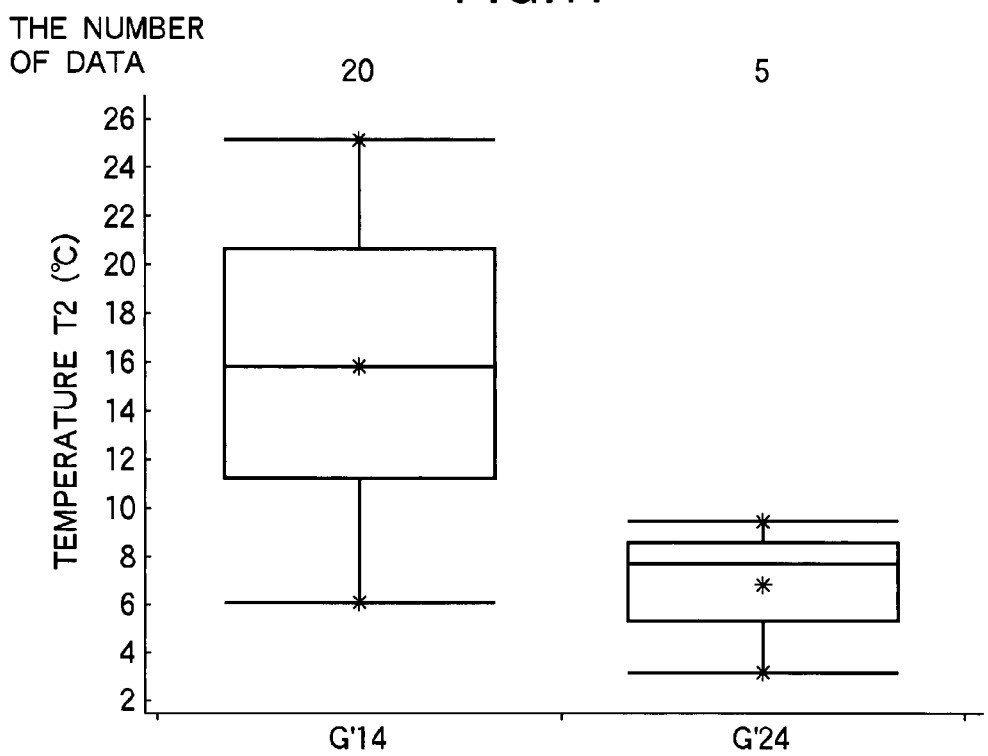
FIG. 17 is a box and whisker plot illustrating the distribution of the temperature T2 corresponding to G'14, G'24 of a combination A4.

FIG. 14 is a box and whisker plot illustrating the distribution of the temperature T2 corresponding to the large sets G'12 and G'22 of the combination A2. Likewise, FIGS. 15 to 17 are box and whisker plots illustrating the distribution of the temperature T2 corresponding to the large sets G'1k and G'2k of the combinations A3, A1, and A4. In FIGS. 14 to 17, the horizontal axis represents the large sets G'1k and G'2k, and the vertical axis represents the temperature T2 (° C.). The distribution of the temperature T2 in each of the large sets G'1k and G'2k of each of the combinations Ak is the same as the distribution of the temperature T1 in each of the large sets G'1k and G'2k of the first embodiment. Accordingly, the box and whisker plots illustrating the distribution of the temperature T2 of the large sets G'1k and G'2k illustrated in FIGS. 14 to 17 are the same as the box and whisker plots illustrating the distribution of the temperature T1 of the large sets G'1k and G'2k illustrated in FIGS. 5 to 8. As shown in FIG. 14, in the combination A2 having the largest grade of unity of 81.19, the statistical significance difference of the temperature T2 between the large sets G'12 and G'22 becomes the maximum. As shown in FIGS. 14 to 17, the statistical significance difference of the temperature T2 between the large sets G'1k and G'2k decreases with the decrease of the grade of unity.

When looking into FIGS. 2 and 11, the time varying fluctuation of the temperature T2 seems to have a great difference from the time varying fluctuation of the temperature T1. However, according to the data analyzing method of the present embodiment, as shown in FIGS. 4 and 13, the result can be obtained that the grade of unity of each of the combinations Ak is the same as the grade of unity of each of the combinations Ak of the first embodiment. Accordingly, by looking into FIGS. 4 and 13, the engineers can find a lot of common points in the time varying fluctuation of the temperature T2 and the time varying fluctuation of the temperature T1. In addition, for example, by looking into the data files 1 and 101 illustrated in FIGS. 1 and 10 and the box and whisker plots illustrated in FIGS. 3 and 12, the engineers can recognize that the time varying fluctuation of the temperature T2 is different from the time varying fluctuation of the temperature T1 only in that the temperature in the area (March 11th to 15th) of the small set G3 is changed with the temperature in the area (March 21st to 25th) of the small set G5. As a result, according to the data analyzing method of the present embodiment, the engineers can guess that there is a possibility of the same phenomenon occurring in the area (March 6th to 15th) of each of the small sets G2 and G3 illustrated in FIG. 3 and the areas (March 6th to 10th and March 21st to 25th) of the small sets G2 and G5 illustrated in FIG. 12, and a possibility of the same defective factor existing in them.

However, if the engineer tries to extract a distinctively different area from the other areas in the temperature T2 (i.e., the object variable) by looking into the trend graph illustrated in FIG. 11, the engineer may find difficulties in detecting the common and different points in the time varying fluctuation of the temperature T1 and the time varying fluctuation of the temperature T2. Accordingly, the engineer may also find difficulties in guessing that there is a possibility of the same phenomenon occurring in the area (March 6th to 15th) of each of the small sets G2 and G3 illustrated in FIG. 3 and the areas (March 6th to 10th and March 21st to 25th) of the small sets G2 and G5 illustrated in FIG. 12, and a possibility of the same defective factor existing in them.

As a result, according to the data analyzing method of the present embodiment, the same advantages as the analyzing method of the first embodiment can be obtained.

Third Embodiment

A data analyzing device, a data analyzing method, and program for making a computer execute the method according to a third embodiment of the invention will be described with reference to FIGS. 18 to 25. First, referring to FIGS. 18 and 19, data subjected to the data analysis according to the present embodiment will be described. FIG. 18 is a table illustrating a data file 201 subjected to the data analysis according to the third embodiment of the invention. As shown in FIG. 18, the data file 201 has daily data relating to temperature T3 (° C.) from March 1st to March 25th. The data file 201 includes 25 records Ri (i=1, 2, ..., 25). Each record Ri has data of time D and the temperature T3 (° C.). A record number of each record Ri is given in the order of the time D.

In the same manner as the temperature T1, the temperature T3 is atmosphere temperature at which the semiconductor manufacturing process is performed, or stage temperature at which several processing treatments are performed. The temperature T3 is a factor having influence on the yield or performance of a product. The data analysis according to the present embodiment, temperature T3 is defined as an object variable and the time D is defined as an explanatory variable.

Figure 19:
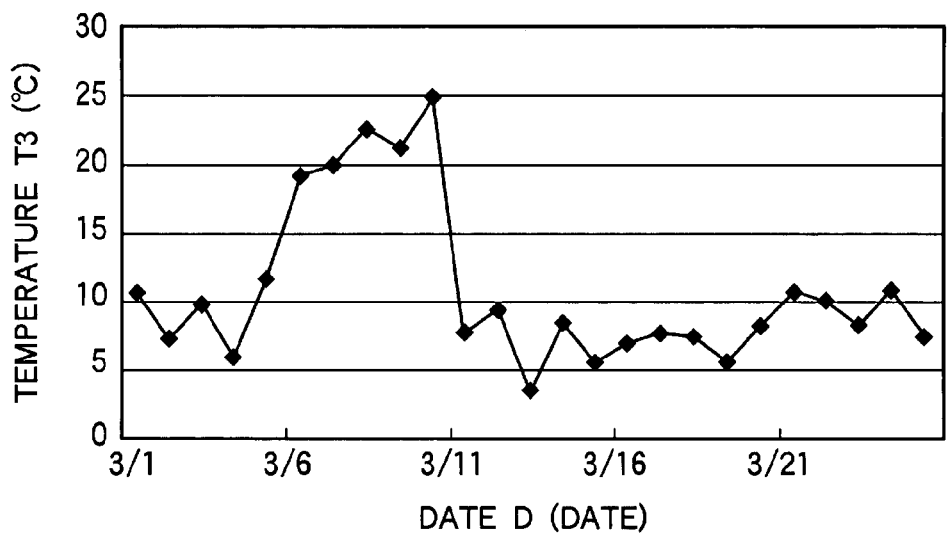
FIG. 19 is a trend graph of temperature T3.

FIG. 19 is a trend graph of temperature T3. The horizontal axis represents the time D (date), and the vertical axis represents the temperature T3 (° C.). As shown in FIG. 19, the temperature T3 in the area of 3/6-3/10 has distinctively a large value in comparison with that of the other areas.

Hereinafter, the data analyzing method according to the present embodiment will be described. In the present embodiment, the data analysis which is the same as the data analyzing method according to the first embodiment is performed on the data file 201. First, as shown in FIG. 18, 25 records Ri are rearranged in order of the explanatory variable, that is, in order of the time D.

Next, as shown in FIG. 18, the 25 records Ri rearranged in the order of the time D are partitioned into five small sets Gj (j=1, 2, ..., 5). Each of the small sets Gj includes the records Ri which are continuous and rearranged in the order of the time D. Each of the small sets Gj includes the same number (5) of records Ri. Each area of the small sets Gj is the same as each area of the small sets Gj in the first embodiment. Each record Ri belongs to any one of the small sets Gj, and each record Ri has a group ID (Gj) as an attribute. Each small set Gj has information of attributes including the group ID, a starting record number and an ending record number (or starting time and ending time) of each of the records Ri composing the small set Gj, and the object variable (temperature T3) of each of the records Ri. The five small sets Gj are arranged in the order of the time D: i.e., in the order of G1, G2, G3, G4, and G5.

As shown in FIG. 18, the small set G1 includes the records R1 to R5 (March 1st to 5th). The small set G2 includes the records R6 to R10 (March 6th to 10th). The small set G3 includes the records R11 to R15 (March 11th to 15th). The small set G4 includes the records R16 to R20 (March 16th to 20th). The small set G5 includes the records R21 to R25 (March 21st to 25th).

Figure 20:
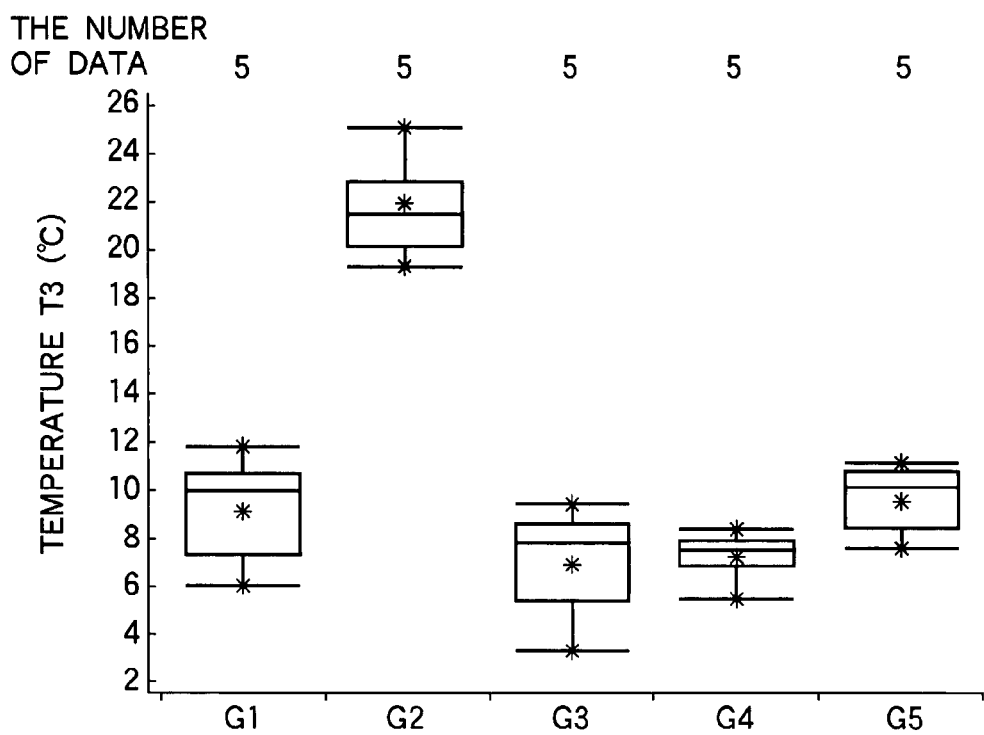
FIG. 20 is a box and whisker plot illustrating distribution of the temperature T3 for every small set Gj.

Here, the distribution of temperature T3 in each of the small sets Gj is illustrated in FIG. 20. FIG. 20 is a box and whisker plot illustrating the distribution of temperature T3 in each of the small sets Gj. In FIG. 20, the horizontal axis represents the small set Gj, the vertical axis represents the temperature T3 (° C.).

After partitioning the records into five small sets Gj, the average value Ave (T3) of the temperature T3 of the records Ri belonging to each of the small sets Gj is calculated. As shown in FIG. 20, if the small sets Gj are rearranged in the order of the larger average value Ave (T3) of the temperature T3, the small sets are arranged in the order of G2, G5, G1, G4, and G3. Next, the five small sets Gj are rearranged in the descending order of the average value Ave (T3). The small sets Gj are arranged in the order of G2, G5, G1, G4, and G3.

Next, four (=5−1) combinations Ak of the small sets Gj are calculated in which the five small sets Gj rearranged in the order of the average value are partitioned into two large sets which are a large set G'1k including k small sets Gj (k=1, 2, ..., 4 (=5−1); and k is a natural number) selected in the descending order of the average value from the small set having the largest average value and a large set G'2k including 5−k remaining small sets Gj. The four combinations Ak are listed in Table 5.

TABLE 5

| COMBINATION Ak | LARGE SET G'1k | LARGE SET G'2k |
| --- | --- | --- |
| A1 | G2 | G5, G1, G4, G3 |
| A2 | G2, G5 | G1, G4, G3 |
| A3 | G2, G5, G1 | G4, G3 |
| A4 | G2, G5, G1, G4 | G3 |

Table 5 shows the small sets Gj belonging to the large sets G'1k and G'2k for every four combinations Ak. For example, in the case of combination A1, the large set G'11 includes one small set G2 having the largest average value, and the large set G'21 includes four small sets G5, G1, G4, and G3 having the average values smaller than that of G2. In the case of combination A2, the large set G'12 includes two small sets G2 and G5 respectively having the largest and the second largest average values, and the large set G'22 includes three small sets G1, G4, and G3 having the average values smaller than those of G2 and G5.

Next, a grade of unity is calculated for every four combinations Ak. The calculation result of the grade of unity for every four combinations Ak is shown in Table 6.

TABLE 6

| COMBINATION Ak | LARGE SET G'1k | LARGE SET G'2k | GRADE OF UNITY |
|---|---|---|---|
| A1 | G2 | G5, G1, G4, G3 | 86.78 |
| A2 | G2, G5 | G1, G4, G3 | 44.47 |
| A3 | G2, G5, G1 | G4, G3 | 29.72 |
| A4 | G2, G5, G1, G4 | G3 | 12.02 |

Table 6 shows the small sets Gj belonging to the large sets G'1k and G'2k for every four combinations Ak and the grade of unity for every four combinations Ak. As shown in Table 6, the combinations have a greater grade of unity in the A1, A2, A3, and A4 order.

Next, the four combinations Ak are rearranged in the descending order (in the order of A1, A2, A3, and A4) of the values of the grade of unity. Then, the value and rank of the grade of unity and the starting record number and ending record number (starting time and ending time) of the records Ri belonging to the large sets G'1k and G'2k are outputted in the descending order of the value of the grade of unity from the combination Ak having the largest value of the grade of unity.

FIG. 21 illustrates an example of output results obtained by the data analyzing method according to the present embodiment. In FIG. 21, the combinations Ak, the grade of unity, the small sets Gj and the number of records Ri (large set G'1k (number of records)) belonging to the large set G'1k, the small sets Gj and the number of records Ri (large set G'2k (number of records)) belonging to the large set G'2k, an area of the large set G'1k (large set G'1k area), and an area of the large set G'2k (large set G'2k area) are shown in the descending order (rank) of the value of the grade of unity.

As shown in FIG. 21, the combination Ak (rank 1) having the largest grade of unity is the combination A1. In the combination A1, the large set G'11 includes the small set G2 (3/6-3/10), and the large set G'21 includes the small sets G1, G3, G4, and G5 (3/1-3/5, 3/11-3/25). The grade of unity of the combination A1 is 86.78 which is a relatively large value. The combination Ak (rank 2) having the second largest grade of unity is the combination A2. In the combination A2, the large set G'12 includes the small sets G2, G5 (3/6-3/10, 3/21-3/25), and the large set G'22 includes the small sets G1, G3, and G4 (3/1-3/5, 3/11-3/20). The grade of unity of the combination A2 is 44.47. The combination Ak (rank 3) having the third largest grade of unity is the combination A3. The grade of unity of the combination A3 is 29.72. The combination Ak having the smallest grade of unity is the combination A4. The grade of unity of the combination A4 is 12.02.

Figure 22:
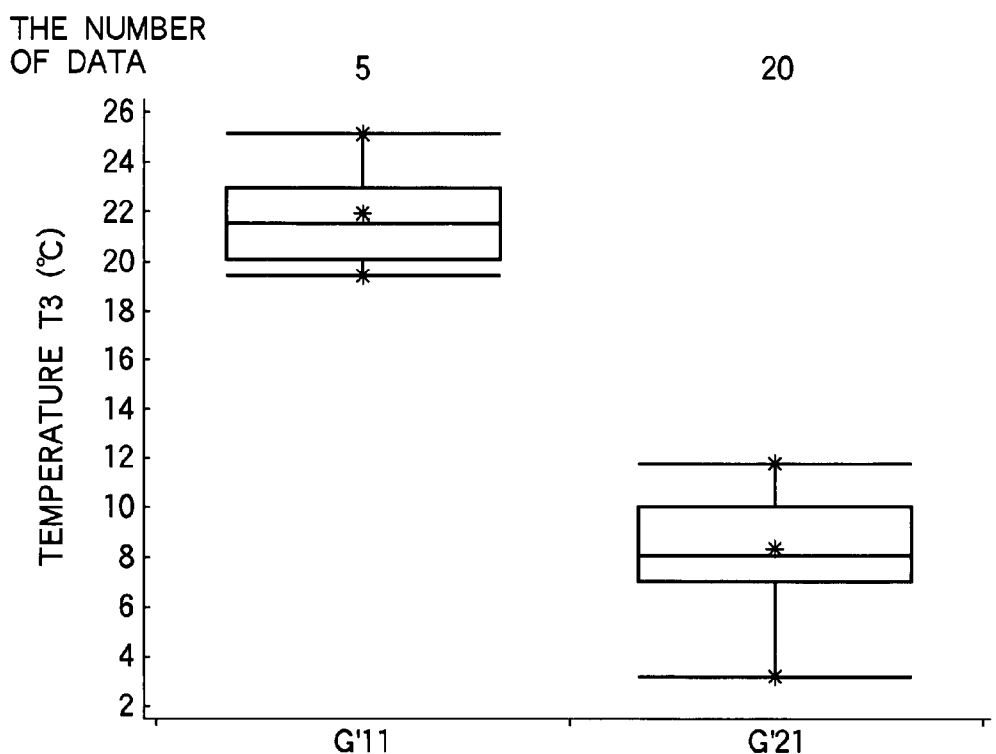
FIG. 22 is a box and whisker plot illustrating the distribution of the temperature T3 corresponding to G'11, G'21 of a combination A1.
Figure 23:
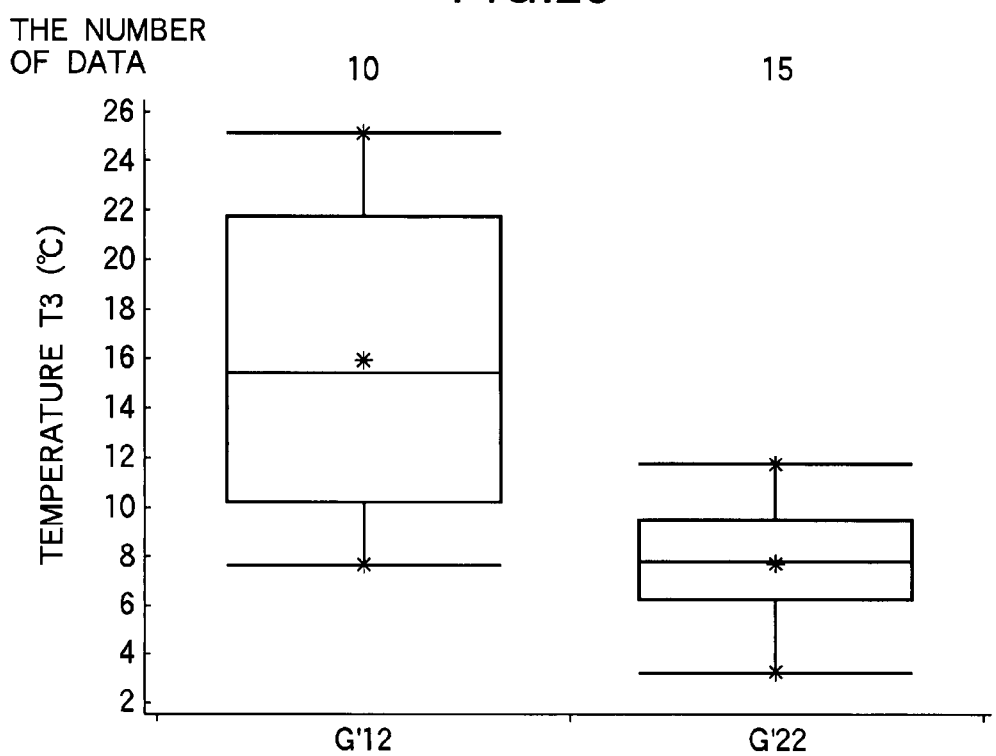
FIG. 23 is a box and whisker plot illustrating the distribution of the temperature T3 corresponding to G'12, G'22 of a combination A2.
Figure 24:
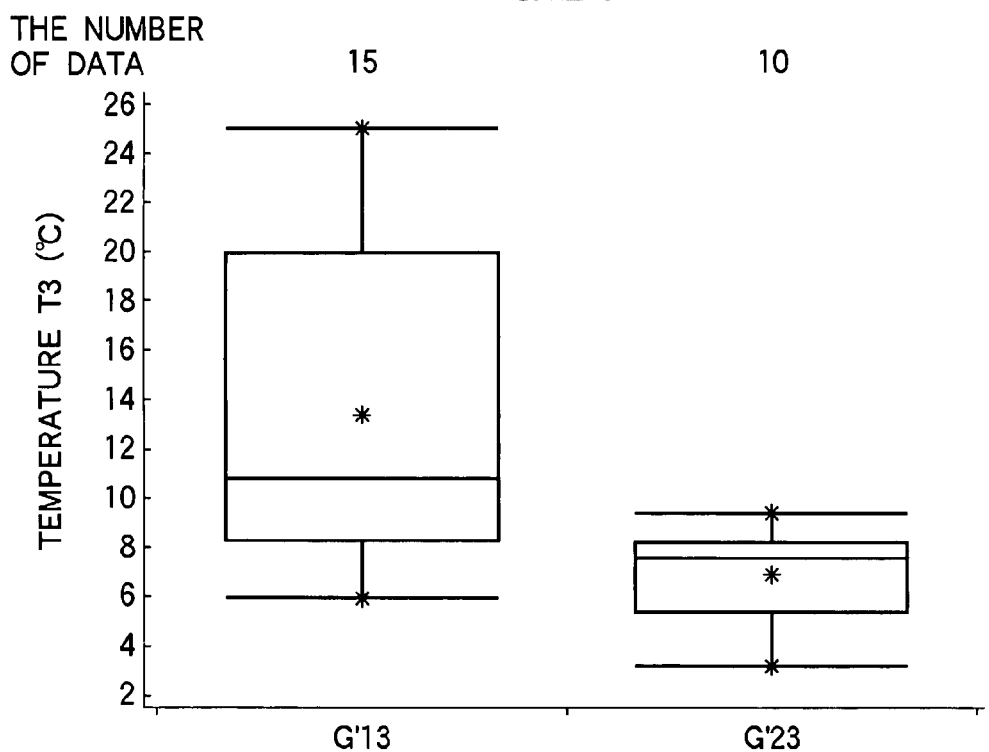
FIG. 24 is a box and whisker plot illustrating the distribution of the temperature T3 corresponding to G'13, G'23 of a combination A3.
Figure 25:
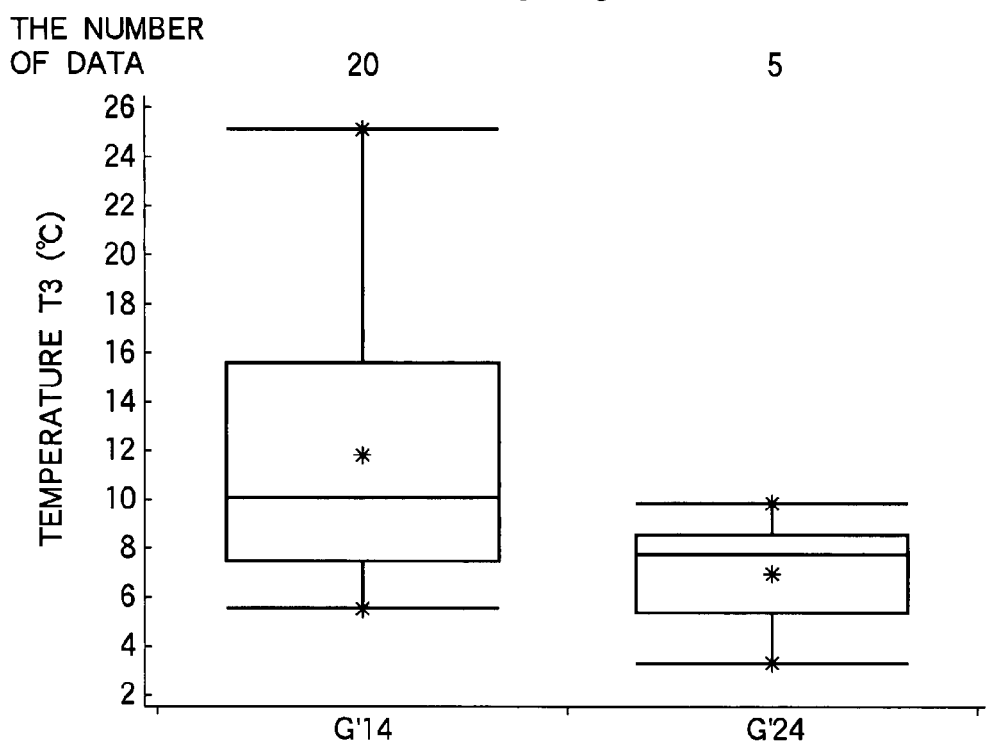
FIG. 25 is a box and whisker plot illustrating the distribution of the temperature T3 corresponding to G'14, G'24 of a combination A4.

FIG. 22 is a box and whisker plot illustrating the distribution of the temperature T3 corresponding to the large sets G'11 and G'21 of the combination A1. Likewise, FIGS. 23 to 25 are box and whisker plots illustrating the distribution of the temperature T3 corresponding to the large sets G'1k and G'2k of the combinations A2, A3, and A4. In FIGS. 22 to 25, the horizontal axis represents the large sets G'1k and G'2k, and the vertical axis represents the temperature T3 (° C.). As shown in FIG. 22, in the combination A1 having the largest grade of unity of 86.78, the statistical significance difference of the temperature T3 between the large sets G'11 and G'21 becomes the maximum. As shown in FIGS. 22 to 25, the statistical significance difference of the temperature T3 between the large sets G'1k and G'2k decreases with the decrease of the grade of unity.

According to the data analyzing method of the present embodiment, in the case (combination A1) where the five small sets Gj are partitioned into an area (the small set G2) of 3/6-3/10 and the areas (the small sets G1, G3, G4, and G5) of 3/1-3/5 and 3/11-3/25, the result can be obtained that the grade of unity distinctively increases in comparison with other area partition method (i.e., other combinations Ak). The grade of unity is an indicator that indicates a degree of the statistical significance difference between values of the temperature T1 of the records Ri belonging to each of the large sets G'1k and G'2k. Accordingly, the engineer can find a distinctive increase in the statistical significance difference when partitioning the areas into the area of 3/6-3/10 and the area of 3/1-3/5 and 3/11-3/25, by using the grade of unity which is a quantitative indicator. As a result, the engineer can guess that there is a cause of the difference between the values of the temperature T3 in both areas and hence it is probably worthwhile to analyze.

As in the data analysis according to the present embodiment, in the case where the result can be obtained such that the grade of unity of one partition method distinctively increases in comparison with other area partition methods (i.e., other combinations Ak), it can be said that the partition method gives a large statistical significance difference between the two areas (large sets G'1k and G'2k) distinctive in comparison with the other area partition methods, and thus it is particularly worthwhile to analyze. According to the present embodiment, the engineer can quantitatively recognize that the area partition method deserves to be analyzed only by looking into the grade of unity without needing to investigate the trend graph illustrated in FIG. 19.

As a result, according to the data analyzing method of the present embodiment, the same advantages as the analyzing method of the first embodiment can be obtained.

Fourth Embodiment

A data analyzing device, a data analyzing method, and program for making a computer execute the method according to a fourth embodiment of the invention will be described with reference to FIGS. 26 to 33. First, referring to FIGS. 26 and 27, data subjected to the data analysis according to the present embodiment will be described. FIG. 26 is a table illustrating a data file 301 subjected to the data analysis according to the fourth embodiment of the invention. As shown in FIG. 26, the data file 301 has daily data relating to temperature T4 (° C.) from March 1st to March 25th. The data file 301 includes 25 records Ri (i=1, 2, . . . , 25). Each record Ri has data of time D and the temperature T4 (° C.). A record number of each record Ri is given in the order of the time D.

In the same manner as the temperature T1, the temperature T4 is atmosphere temperature at which the semiconductor manufacturing process is performed, or stage temperature at which several processing treatments are performed. The temperature T4 is a factor having influence on the yield or performance of a product. The data analysis according to the present embodiment, temperature T4 is defined as an object variable and the time D is defined as an explanatory variable.

Figure 27:
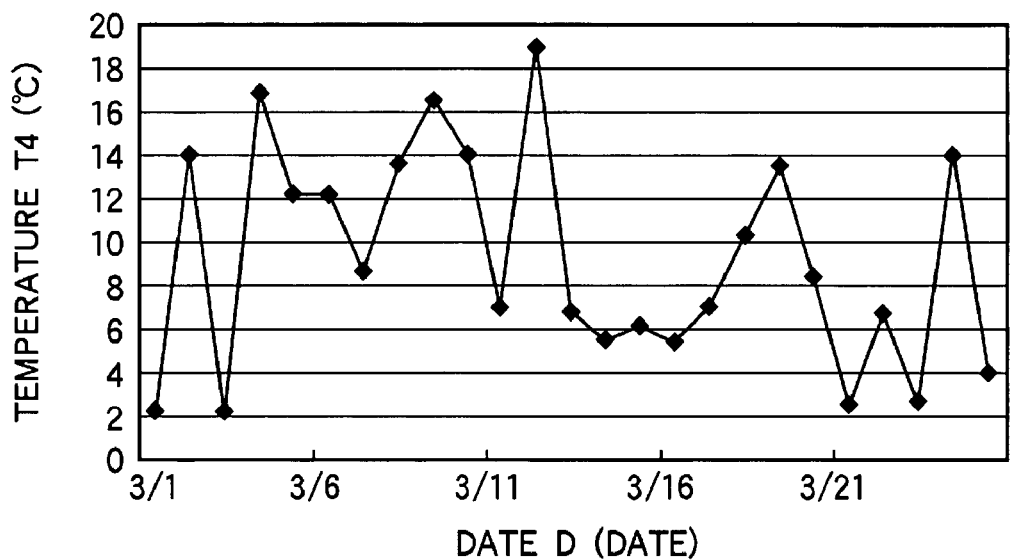
FIG. 27 is a trend graph of temperature T4.

FIG. 27 is a trend graph of temperature T4. The horizontal axis represents the time D (date), and the vertical axis represents the temperature T4 (° C.). Unlike the time varying fluctuation of the temperature T3 illustrated in FIG. 19, the time varying fluctuation of the temperature T4 illustrated in FIG. 27 does not seem to have an area having characteristic values compared to other areas.

Hereinafter, the data analyzing method according to the present embodiment will be described. In the present embodiment, the data analysis which is the same as the data analyzing method according to the first embodiment is performed on the data file 301. First, as shown in FIG. 26, 25 records Ri are rearranged in order of the explanatory variable, that is, in order of the time D.

Next, as shown in FIG. 26, the 25 records Ri rearranged in the order of the time D are partitioned into five small sets Gj (j=1, 2, . . . , 5). Each of the small sets Gj includes the records Ri which are continuous and rearranged in the order of the time D. Each of the small sets Gj includes the same number (5) of records Ri. Each area of the small sets Gj is the same as each area of the small sets Gj in the first embodiment. Each record Ri belongs to any one of the small sets Gj, and each record Ri has a group ID (Gj) as an attribute. Each small set Gj has information of attributes including the group ID, a starting record number and an ending record number (or starting time and ending time) of each of the records Ri composing the small set Gj, and the object variable (temperature T4) of each of the records Ri. The five small sets Gj are arranged in the order of the time D: i.e., in the order of G1, G2, G3, G4, and G5.

As shown in FIG. 26, the small set G1 includes the records R1 to R5 (March 1st to 5th). The small set G2 includes the records R6 to R10 (March 6th to 10th). The small set G3 includes the records R11 to R15 (March 11th to 15th). The small set G4 includes the records R16 to R20 (March 16th to 20th). The small set G5 includes the records R21 to R25 (March 21st to 25th).

Figure 28:
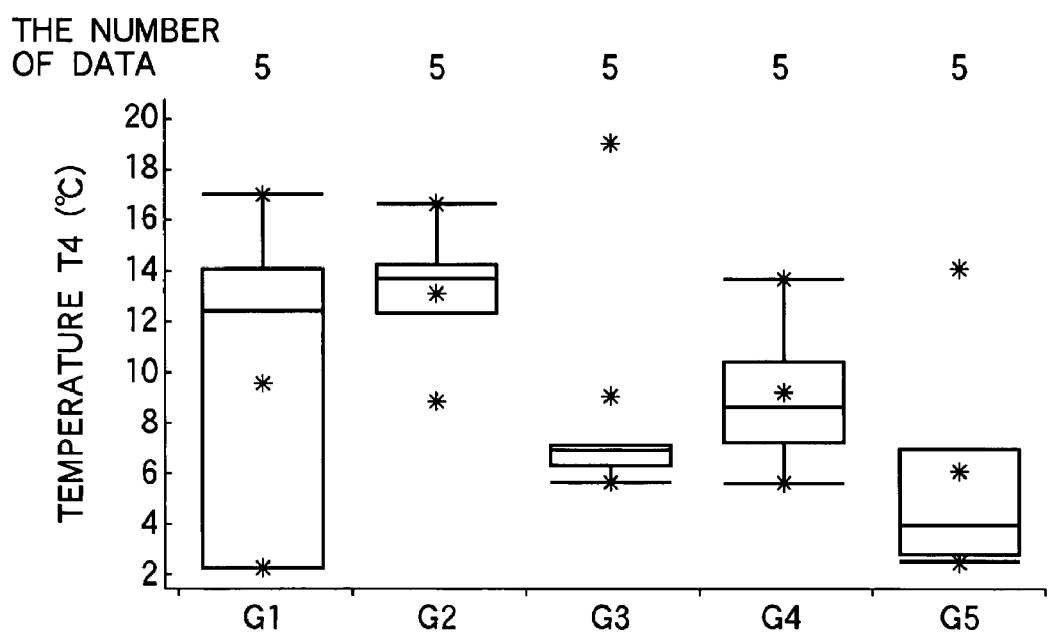
FIG. 28 is a box and whisker plot illustrating distribution of the temperature T4 for every small set Gj.

Here, the distribution of temperature T4 in each of the small sets Gj is illustrated in FIG. 28. FIG. 28 is a box and whisker plot illustrating the distribution of temperature T4 in each of the small sets Gj. In FIG. 28, the horizontal axis represents the small set Gj, the vertical axis represents the temperature T4 (° C.).

After partitioning the records into five small sets Gj, the average value Ave (T4) of the temperature T4 of the records Ri belonging to each of the small sets Gj is calculated. As shown in FIG. 28, if the small sets Gj are rearranged in the order of the larger average value Ave (T4) of the temperature T4, the small sets are arranged in the order of G2, G1, G3, G4, and G5. Next, the five small sets Gj are rearranged in the descending order of the average value Ave (T4). The small sets Gj are arranged in the order of G2, G1, G3, G4, and G5.

Next, four (=5−1) combinations Ak of the small sets Gj are calculated in which the five small sets Gj rearranged in the order of the average value are partitioned into two large sets which are a large set G'1k including k small sets Gj (k=1, 2, . . . , 4 (=5−1); and k is a natural number) selected in the descending order of the average value from the small set having the largest average value and a large set G'2k including 5−k remaining small sets Gj. The four combinations Ak are listed in Table 7.

TABLE 7

| COMBINATION Ak | LARGE SET G'1k | LARGE SET G'2k |
| --- | --- | --- |
| A1 | G2 | G1, G3, G4, G5 |
| A2 | G2, G1 | G3, G4, G5 |
| A3 | G2, G1, G3 | G4, G5 |
| A4 | G2, G1, G3, G4 | G5 |

Table 7 shows the small sets Gj belonging to the large sets G'1k and G'2k for every four combinations Ak. For example, in the case of combination A1, the large set G'11 includes one small set G2 having the largest average value, and the large set G'21 includes four small sets G1, G3, G4, and G5 having the average values smaller than that of G2. In the case of combination A2, the large set G'12 includes two small sets G2 and G1 respectively having the largest and the second largest average values, and the large set G'22 includes three small sets G3, G4, and G5 having the average values smaller than those of G2 and G1.

Next, a grade of unity is calculated for every four combinations Ak. The calculation result of the grade of unity for every four combinations Ak is shown in Table 8.

TABLE 8

| COMBINATION Ak | LARGE SET G'1k | LARGE SET G'2k | GRADE OF UNITY |
| --- | --- | --- | --- |
| A1 | G2 | G1, G3, G4, G5 | 14.47 |
| A2 | G2, G1 | G3, G4, G5 | 10.95 |
| A3 | G2, G1, G3 | G4, G5 | 9.18 |
| A4 | G2, G1, G3, G4 | G5 | 11.22 |

Table 8 shows the small sets Gj belonging to the large sets G'1k and G'2k for every four combinations Ak and the grade of unity for every four combinations Ak. As shown in Table 8, the combinations have a greater grade of unity in the A1, A4, A2, and A3 order.

Next, the four combinations Ak are rearranged in the descending order (in the order of A1, A4, A2, and A3) of the values of the grade of unity. Then, the value and rank of the grade of unity and the starting record number and ending record number (starting time and ending time) of the records Ri belonging to the large sets G'1k and G'2k are outputted in the descending order of the value of the grade of unity from the combination Ak having the largest value of the grade of unity.

FIG. 29 illustrates an example of output results obtained by the the data analyzing method according to the present embodiment. In FIG. 29, the combinations Ak, the grade of unity, the small sets Gj and the number of records Ri (large set G'1k (number of records)) belonging to the large set G'1k, the small sets Gj and the number of records Ri (large set G'2k (number of records)) belonging to the large set G'2k, an area of the large set G'1k (large set G'1k area), and an area of the large set G'2k (large set G'2k area) are shown in the descending order (rank) of the value of the grade of unity.

As shown in FIG. 29, the combination Ak (rank 1) having the largest grade of unity is the combination A1. In the combination A1, the large set G'11 includes the small set G2 (3/6-3/10), and the large set G'21 includes the small sets G1, G3, G4, and G5 (3/1-3/5, 3/11-3/25). The grade of unity of the combination A1 is 14.47. The combination Ak (rank 2) having the second largest grade of unity is the combination A4. In the combination A4, the large set G'14 includes the small sets G1, G2, G3, and G4 (3/1-3/20), and the large set G'24 includes the small set G5 (3/21-3/25). The grade of unity of the combination A4 is 11.22. The combination Ak (rank 3) having the third largest grade of unity is the combination A2. The grade of unity of the combination A2 is 10.95. The combination Ak having the smallest grade of unity is the combination A3. The grade of unity of the combination A3 is 9.18. In the present embodiment, the maximum grade of unity is 14.47 which is a very small value grade of unity compared to the values of grade of unity of the combinations Ak of the first to third embodiments. Additionally, in the present embodiment, there are few differences between the values of the grade of unity of the Combinations Ak.

Figure 30:
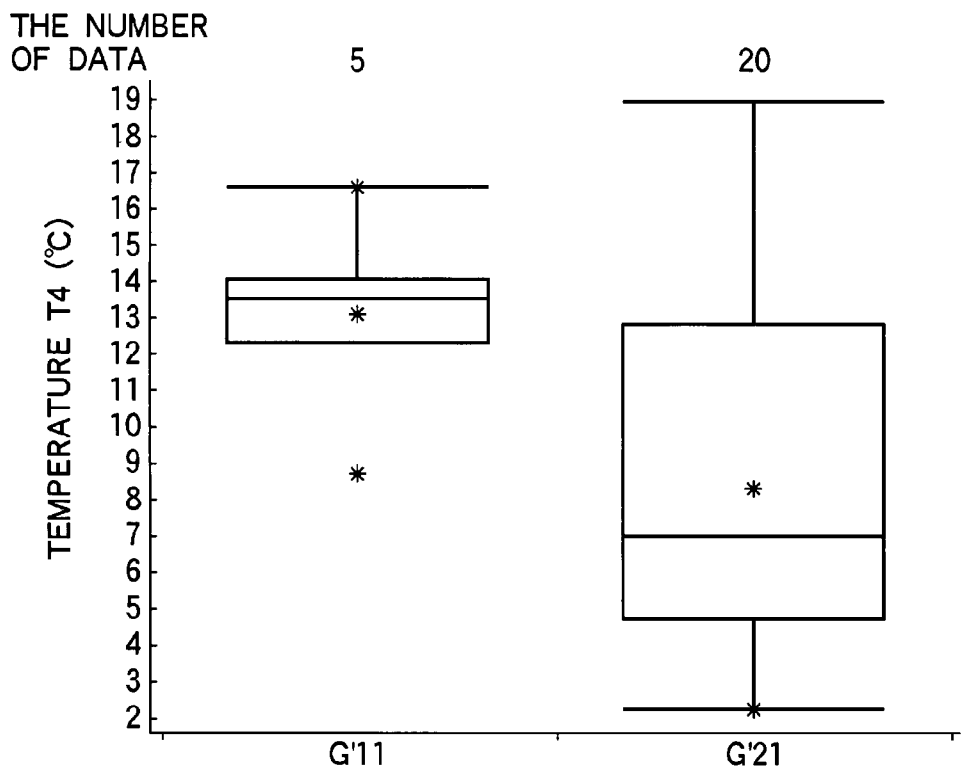
FIG. 30 is a box and whisker plot illustrating the distribution of the temperature T4 corresponding to G'11, G'21 of a combination A1.
Figure 31:
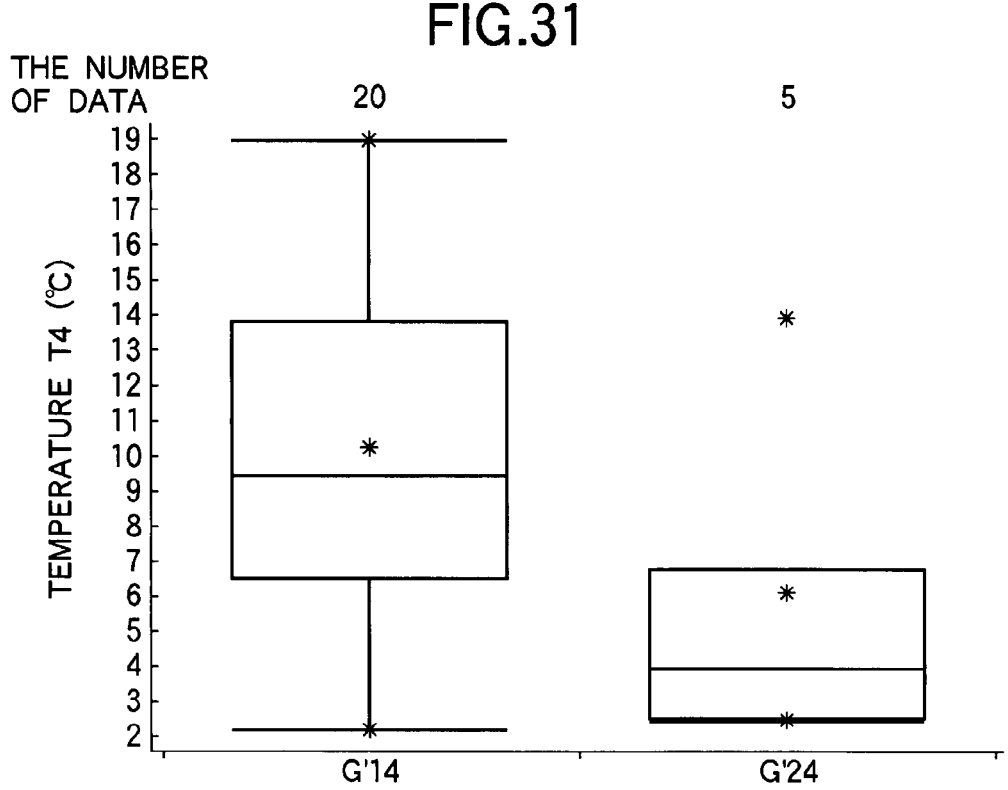
FIG. 31 is a box and whisker plot illustrating the distribution of the temperature T4 corresponding to G'14, G'24 of a combination A4.
Figure 32:
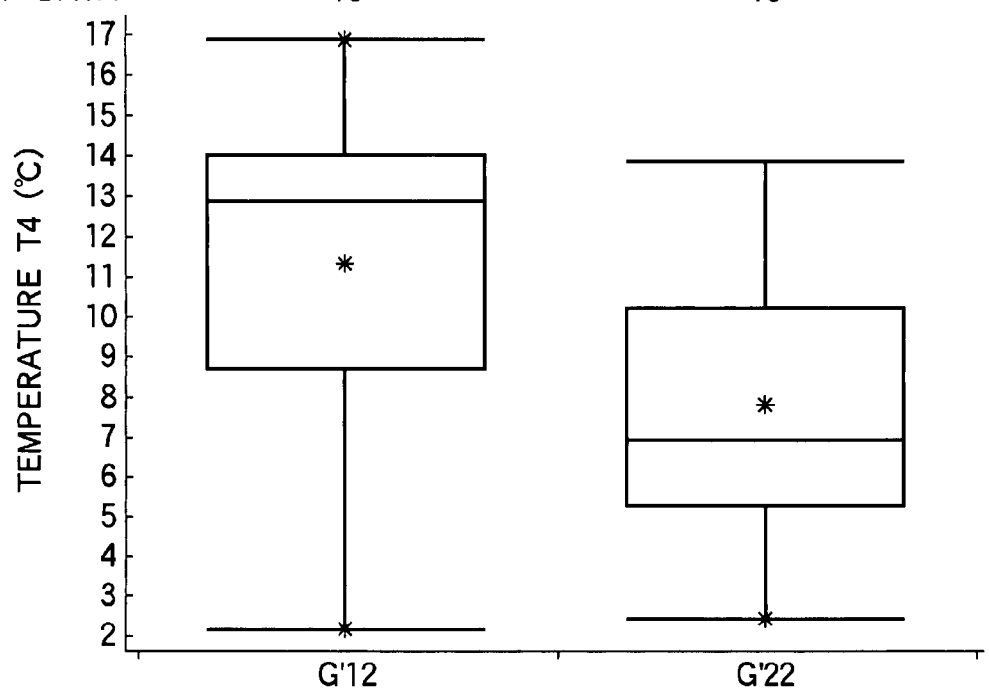
FIG. 32 is a box and whisker plot illustrating the distribution of the temperature T4 corresponding to G'12, G'22 of a combination A2.
Figure 33:
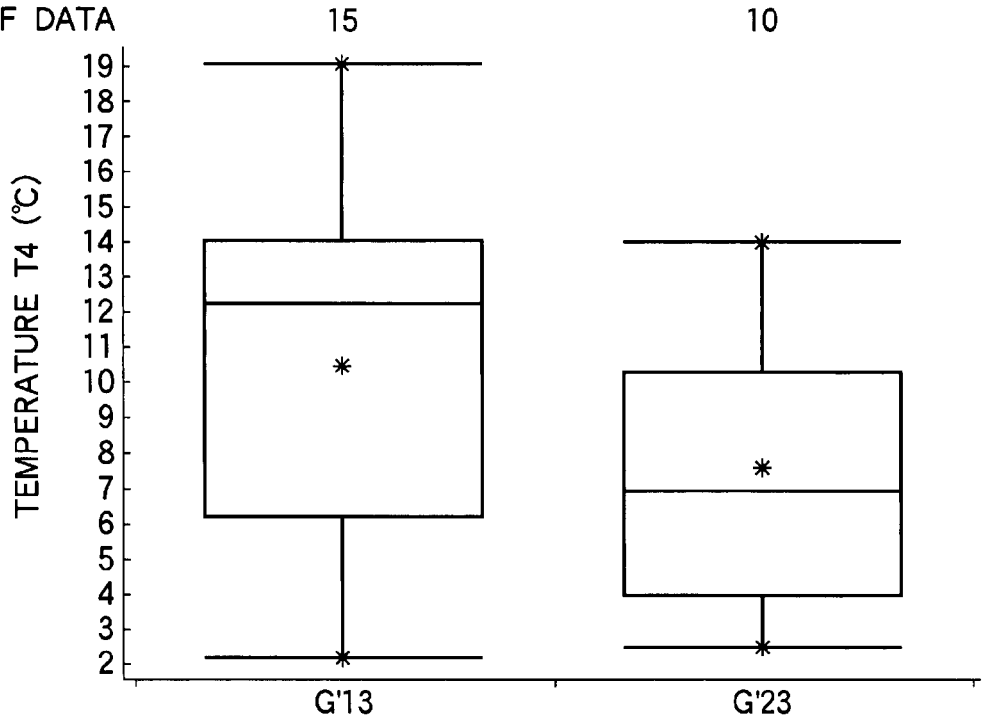
FIG. 33 is a box and whisker plot illustrating the distribution of the temperature T4 corresponding to G'13, G'23 of a combination A3.

FIG. 30 is a box and whisker plot illustrating the distribution of the temperature T4 corresponding to the large sets G'11 and G'21 of the combination A1. Likewise, FIGS. 31 to 33 are box and whisker plots illustrating the distribution of the temperature T4 corresponding to the large sets G'1$k$ and G'2$k$ of the combinations A4, A2, and A3. In FIGS. 30 to 33, the horizontal axis represents the large sets G'1$k$ and G'2$k$, and the vertical axis represents the temperature T4 (° C.).

In the same manner as the data analysis according to the present embodiment, in the case where the result can be obtained such that values of the grade of unity of combinations Ak are relatively very small and have not so significant difference to each other, it can be said that there is no area of which the value of the object variable (which is the temperature T4 in the present embodiment) is distinctively different from that of the other areas. Therefore, it can be said that there is no desirable area subjected to the analysis. According to the present embodiment, the engineer can quantitatively recognize that the area partition deserves to be analyzed only by looking into the grade of unity without needing to investigate the trend graph illustrated in FIG. 27.

As a result, according to the data analyzing method of the present embodiment, the same advantages as the analyzing method of the first embodiment can be obtained.

Fifth Embodiment

A data analyzing device, a data analyzing method, and program for making a computer execute the method according to a fifth embodiment of the invention will be described with reference to FIGS. 34 to 39. FIG. 34 is a table illustrating a data file 401 subjected to the data analysis according to the fifth embodiment of the invention. As shown in FIG. 34, the data file 401 is the same as the data file 1 subjected to the data analysis in the first embodiment. The data analysis according to the present embodiment, temperature T1 is defined as an object variable and the time D is defined as an explanatory variable.

Hereinafter, the data analyzing method according to the present embodiment will be described. In the present embodiment, the data analysis has a characteristic in that the method of partitioning the small sets is changed in comparison with the data analysis according to the first embodiment. First, as shown in FIG. 34, 25 records Ri are rearranged in order of the explanatory variable, that is, in order of the time D.

Next, as shown in FIG. 34, the 25 records Ri rearranged in the order of the time D are partitioned into four small sets G2$j$ ($j$=1, 2, . . . , 4). Each of the small sets G2$j$ includes the records Ri which are continuous and rearranged in the order of the time D. Each of the small sets G2$j$ includes the same number (5) of records Ri. As shown in FIG. 34, in the data analyzing method according to the present embodiment, the starting position of the records Ri in each of the small sets G2$j$ is behind the starting position of the records of the small sets Gj according to the first embodiment by two records (two days). The leading two records (i.e., records R1 and R2) and the ending three records (i.e., records R23, R24, and R25) do not belong to any of the small sets G2$j$, and thus those records are not subjected to the data analysis.

Record Ri other than records R1, R2, R23, R24, and R25 has a group ID (G2$j$) as an attribute. Each small set G2$j$ has information of attributes including the group ID, a starting record number and an ending record number (or starting time and ending time) of each of the records Ri composing the small set G2$j$, and the object variable (temperature T1) of each of the records Ri. The four small sets G2$j$ are arranged in the order of the time D: i.e., in the order of G21, G22, G23, and G24.

As shown in FIG. 34, the small set G21 includes the records R3 to R7 (March 3rd to 7th). The small set G22 includes the records R8 to R12 (March 8th to 12th). The small set G23 includes the records R13 to R17 (March 13th to 17th). The small set G24 includes the records R18 to R22 (March 18th to 22nd).

Figure 35:
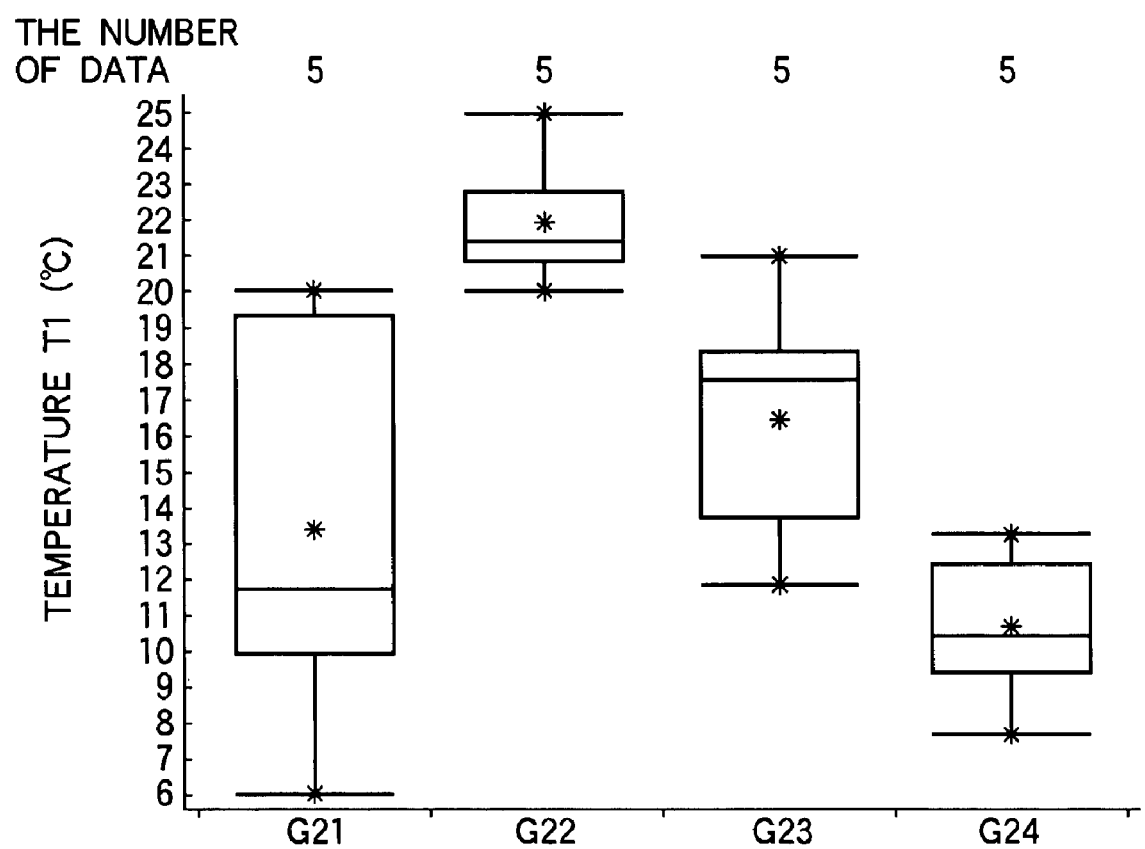
FIG. 35 is a box and whisker plot illustrating distribution of the temperature T1 for every small set G2j.

Here, the distribution of temperature T1 in each of the small sets G2$j$ is illustrated in FIG. 35. FIG. 35 is a box and whisker plot illustrating the distribution of temperature T1 in each of the small sets G2$j$. In FIG. 35, the horizontal axis represents the small set G2$j$, the vertical axis represents the temperature T1 (° C.).

After partitioning the records into four small sets G2$j$, the average value Ave (T1) of the temperature T1 of the records Ri belonging to each of the small sets G2$j$ is calculated. As shown in FIG. 35, if the small sets G2$j$ are rearranged in the order of the larger average value Ave (T1) of the temperature T1, the small sets are arranged in the order of G22, G23, G21, and G24. Next, the four small sets G2$j$ are rearranged in the descending order of the average value Ave (T1). The small sets G2$j$ are arranged in the order of G22, G23, G21, and G24.

Next, three (=4−1) combinations Ak of the small sets G2$j$ are calculated in which the four small sets G2$j$ rearranged in the order of the average value are partitioned into two large sets which are a large set G'1$k$ including k small sets G2$j$ (k=1, 2, 3 (=4−1); and k is a natural number) selected in the descending order of the average value from the small set having the largest average value and a large set G'2$k$ including 4−k remaining small sets G2$j$. The three combinations Ak are listed in Table 9.

TABLE 9

| COMBINATION Ak | LARGE SET G'1k | LARGE SET G'2k |
|---|---|---|
| A1 | G22 | G23, G21, G24 |
| A2 | G22, G23 | G21, G24 |
| A3 | G22, G23, G21 | G24 |

Table 9 shows the small sets G2$j$ belonging to the large sets G'1$k$ and G'2$k$ for every three combinations Ak. For example, in the case of combination A1, the large set G'11 includes one small set G22 having the largest average value, and the large set G'21 includes three small sets G23, G21, and G24 having the average values smaller than that of G22. In the case of combination A2, the large set G'12 includes two small sets G22 and G23 respectively having the largest and the second largest average values, and the large set G'22 includes two small sets G21 and G24 having the average values smaller than those of G22 and G23.

Next, a grade of unity is calculated for every three combinations Ak. The calculation result of the grade of unity for every three combinations Ak is shown in Table 10.

TABLE 10

| COMBINATION Ak | LARGE SET G'1k | LARGE SET G'2k | GRADE OF UNITY |
|---|---|---|---|
| A1 | G22 | G23, G21, G24 | 45.62 |
| A2 | G22, G23 | G21, G24 | 44.07 |
| A3 | G22, G23, G21 | G24 | 28.02 |

Table 10 shows the small sets G2$j$ belonging to the large sets G'1$k$ and G'2$k$ for every three combinations A$k$ and the grade of unity for every three combinations A$k$. As shown in Table 10, the combinations have a greater grade of unity in the A1, A2, and A3 order.

Next, the three combinations A$k$ are rearranged in the descending order (in the order of A1, A2, and A3) of the values of the grade of unity. Then, the value and rank of the grade of unity and the starting record number and ending record number (or starting time and ending time) of the records R$i$ belonging to the large sets G'1$k$ and G'2$k$ are outputted in the descending order of the value of the grade of unity of the combination A$k$.

FIG. 36 illustrates an example of output results obtained by the data analyzing method according to the present embodiment. In FIG. 36, the combinations A$k$, the grade of unity, the small sets G2$j$ and the number of records R$i$ (large set G'1$k$ (number of records)) belonging to the large set G'1$k$, the small sets G2$j$ and the number of records R$i$ (large set G'2$k$ (number of records)) belonging to the large set G'2$k$, an area of the large set G'1$k$ (large set G'1$k$ area), and an area of the large set G'2$k$ (large set G'2$k$ area) are shown in the descending order (rank) of the value of the grade of unity.

As shown in FIG. 36, the combination A$k$ (rank 1) having the largest grade of unity is the combination A1. In the combination A1, the large set G'11 includes the small set G22 (3/8-3/12), and the large set G'21 includes the small sets G23, G21, and G24 (3/3-3/7, 3/13-3/22). The grade of unity of the combination A1 is 45.62. The combination A$k$ (rank 2) having the second largest grade of unity is the combination A2. In the combination A2, the large set G'12 includes the small sets G22 and G23 (3/8-3/17), and the large set G'22 includes the small sets G21 and G24 (3/3-3/7, 3/18-3/22). The grade of unity of the combination A2 is 44.07. The combination A$k$ (rank 3) having the smallest grade of unity is the combination A3. The grade of unity of the combination A3 is 28.02.

Figure 37:
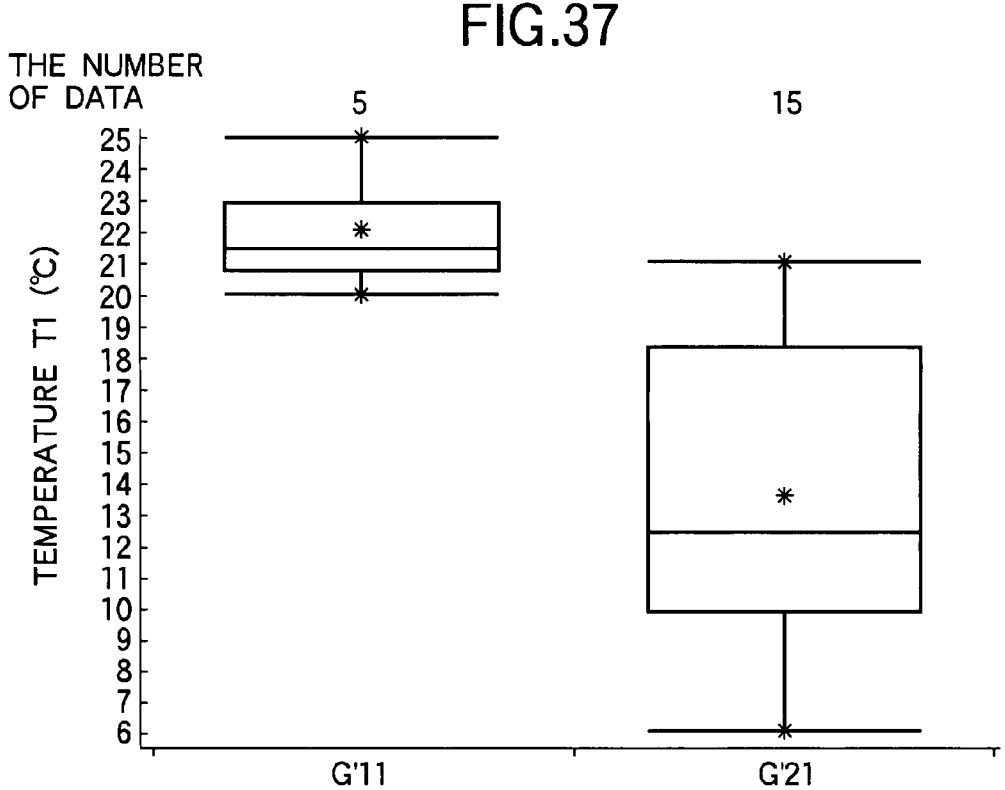
FIG. 37 is a box and whisker plot illustrating the distribution of the temperature T1 corresponding to G'11, G'21 of a combination A1.
Figure 38:
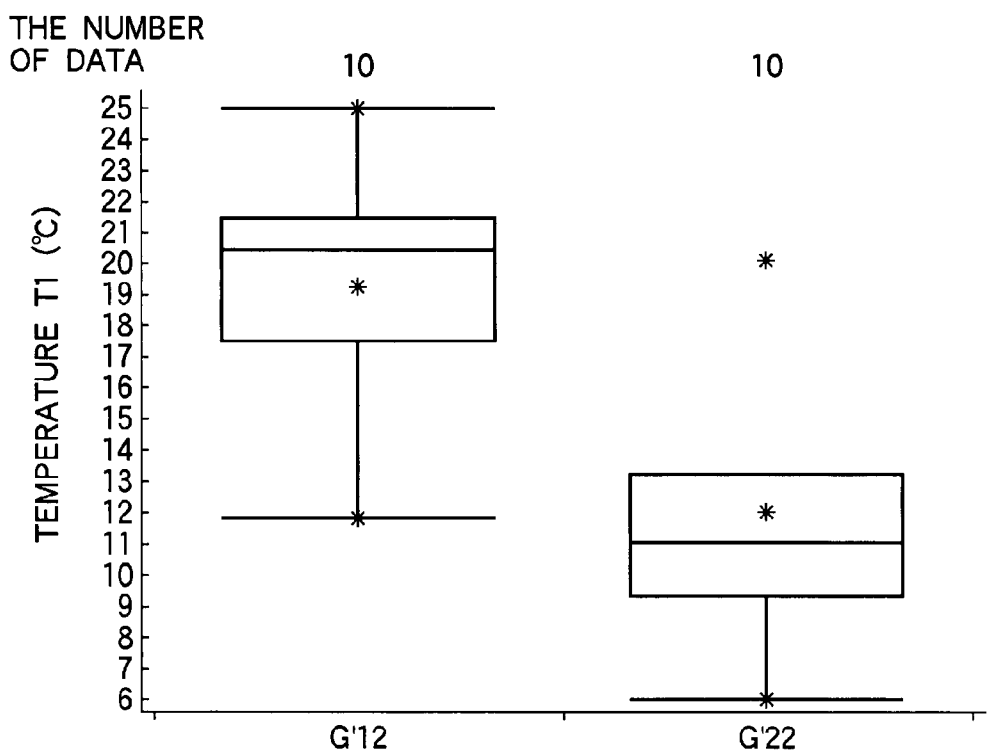
FIG. 38 is a box and whisker plot illustrating the distribution of the temperature T1 corresponding to G'12, G'22 of a combination A2.
Figure 39:
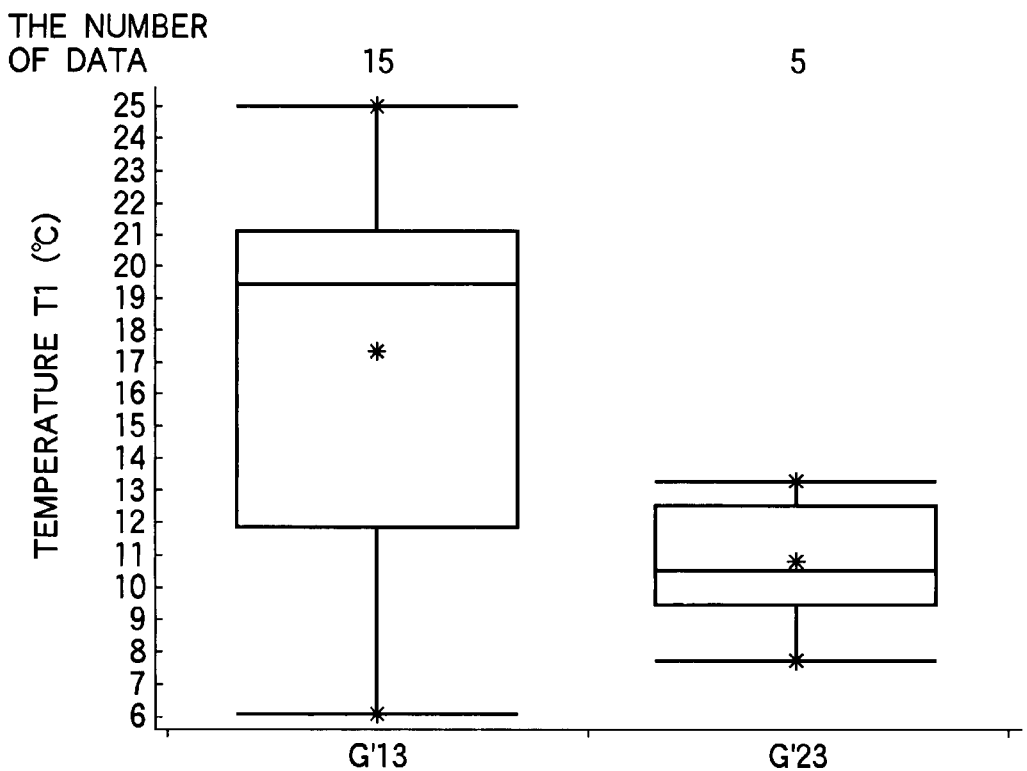
FIG. 39 is a box and whisker plot illustrating the distribution of the temperature T1 corresponding to G'13, G'23 of a combination A3.

FIG. 37 is a box and whisker plot illustrating the distribution of the temperature T1 corresponding to the large sets G'11 and G'21 of the combination A1. Likewise, FIGS. 38 and 39 are box and whisker plots illustrating the distribution of the temperature T1 corresponding to the large sets G'1$k$ and G'2$k$ of the combinations A2 and A3. In FIGS. 37 to 39, the horizontal axis represents the large sets G'1$k$ and G'2$k$, and the vertical axis represents the temperature T1 (° C.). As shown in FIG. 37, in the combination A1 having the largest grade of unity of 45.62, the statistical significance difference of the temperature T1 between the large sets G'11 and G'21 becomes the maximum. As shown in FIGS. 37 to 39, the statistical significance difference of the temperature T1 between the large sets G'1$k$ and G'2$k$ decreases with the decrease of the grade of unity.

In the data analysis according to the present embodiment, the area partition method of the small set areas differs from that of the data analysis according to the first embodiment. Therefore, although the data files subjected to the data analysis are the same as those of the data analysis according to the first embodiment, the maximum grade of unity (45.62) obtained in the present embodiment is lower than the maximum grade of unity (81.19) obtained from the data analysis according to the first embodiment. That is, in the area partition method according to the present embodiment, there is not extracted the statistical significance difference of the temperature T1 that was originally present.

In the data analyzing methods according to the first to fifth embodiments, the records R$i$ that was originally arranged in the order of the time D so as to be continuous to each other are partitioned into discrete areas (i.e., small sets). Accordingly, depending on the partition pattern of the small sets, as can be seen from the result of the data analysis according to the fifth embodiment, there may be cases where the original statistical significance difference are not extracted.

In the data analyzing methods according to the first to fifth embodiments, the statistical significance difference in the object variables (which are temperature T1 in the first and fifth embodiments) can be extracted by making various partition patterns differing in the area partition method or in the number of records R$i$ of the small sets and thus obtaining the respective values of the grade of unity for each of the various partition patterns. The same can be also applied to other object variables (i.e., the temperatures T2, T3, and T4).

According to the data analyzing method of the present embodiment, the following additional advantages to be described below can be obtained in addition to the advantages of the foregoing embodiments. The grade of unity is a standardized indicator, and is an indicator that is not influenced by the object variables and physical units of the object variables. Therefore, the data analysis can be performed on a plurality of object variables (the temperatures T1, T2, T3, and T4 in the present embodiment) by using the grade of unity as the common indicator. According to the data analyzing method of the present embodiment, the data analysis result obtained from the different object variables can be compared to each other.

The data analyzing methods according to the first to fifth embodiments can be performed by making a computer such as a personal computer or a workstation execute a program prepared in advance. Additionally, the program is recorded on a computer-readable recording medium such as a hard disk, flexible disk, CD-ROM, MO, or DVD, and is executed by the computer reading out of the recording medium. The program can be distributed as the recording medium or through a transmission medium such as a network.

Figure 40:
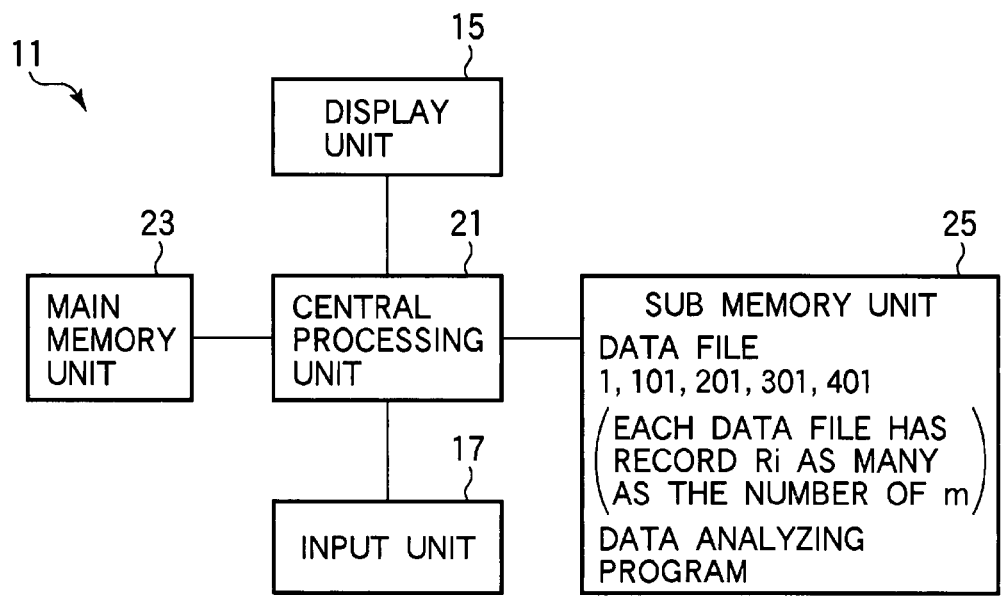
FIG. 40 is a block diagram illustrating a personal computer 11.
Figure 41:
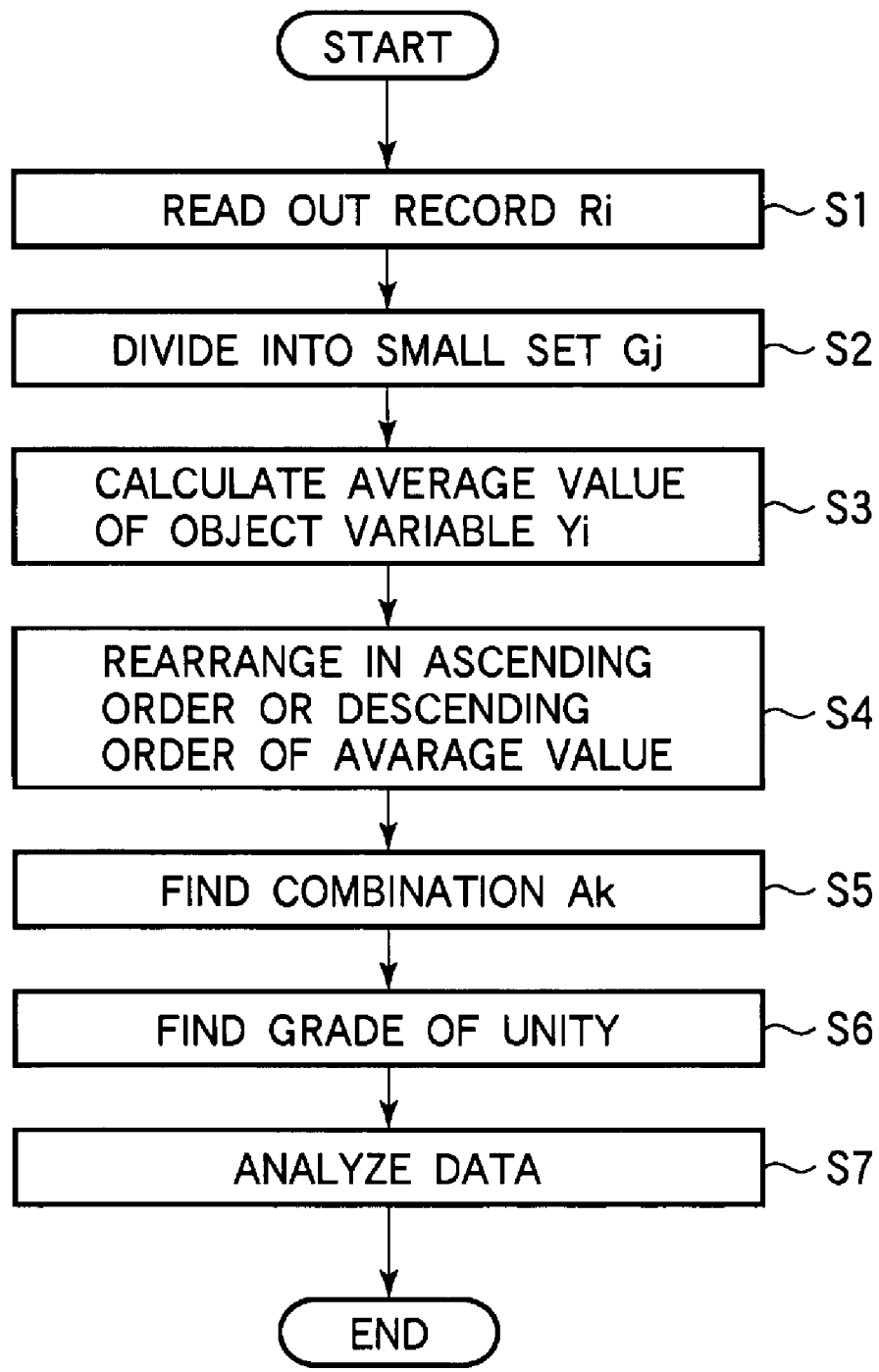
FIG. 41 is a flow chart illustrating a data analyzing operation in a data analyzing device according to the first to the fifth embodiments of the invention.

FIG. 40 illustrates a data analyzing device for executing the data analyzing methods according to the first to fifth embodiments. FIG. 41 is a flow chart illustrating the data analysis sequence performed by the data analyzing device.

FIG. 40 is a block diagram illustrating a personal computer 11 as an example of the data analyzing device. As shown in FIG. 40, the personal computer 11 includes a display unit 15, an input unit 17 such as a keyboard or a mouse, a central processing unit (CPU) 21, a main storage unit (i.e., a main memory) 23, and a secondary storage unit 25 such as a hard disk drive. The central processing unit 21 is connected to the display unit 15, the input unit 17, the main storage unit 23, and the secondary storage unit 25. The secondary storage unit 25 stores the program of the present embodiment, data files 1, 101, 201, 301, and 401, and the like. The program is read out by the main storage unit 23 in accordance with a demand, a program sequence recorded in the program is performed by the central processing unit 21.

In the first to fifth embodiments, the data files 1, 101, 201, 301, and 401 respectively including the m records R$i$ (i=1, 2, ..., m; and m is a natural number of 2 or more) having the explanatory variable $x_i$ (i.e., the time D) and the object variables $y_i$ (i.e., the temperatures T1, T2, T3, and T4) which each is a quantitative variable are stored in the secondary storage unit (storage unit) 25. The central processing unit (computing unit) 21 performs the data analyzing method according to the present embodiment.

As shown in FIG. 41, when the data analysis process is started, the central processing unit 21 reads out the m records R$i$ from the secondary storage unit 25 and stores the m records R$i$ in the main storage unit 23 (step S1). Next, the central processing unit 21 partitions the m records Ri into n small sets Gj (j=1, 2, ..., n; and n is a natural number satisfying $2 \leq n \leq m$) (step S2).

Next, the central processing unit 21 calculates the average value of the object variable yi for every partitioned small set Gj (step S3), and rearranges the n small sets Gj in the ascending order or the descending order of the average value (step S4). Next, the central processing unit 21 calculates n−1 combinations Ak of the n rearranged small sets Gj in which the n small sets Gj are partitioned into two large sets which are a large set G'1k including the k small sets Gj (k=1, 2, ..., n−1; and k is a natural number) selected in the descending order from the small set having the largest average value and a large set G'2k including the n−k remaining small sets Gj (step S5). Next, the central processing unit 21 calculate a grade of unity for each of the n−1 combinations Ak (step S6), and perform a predetermined data analysis on the basis of the grade of unity (step S7).

With such a configuration, the data analyzing device can efficiently extract distribution information of the data.

The predetermined file created by the data analysis of the data analyzing device is stored in the secondary storage unit 25, and is outputted through the display unit 15 or a printing device (not shown). For example, the box and whisker plots illustrated in FIGS. 3 and 5 to 8 and the output results illustrated in FIG. 4 for example are displayed on the display unit 15.

Sixth Embodiment

A data analyzing device and method, and a program for making a computer execute the data analyzing method according to the sixth embodiment will be described by referring to FIG. 40 and FIGS. 42 to 53.

The present embodiment relates to a data analyzing device and method for detecting the relationship between data which is widely used in the industrial fields and extracting a significant result for producing industrially superior results and to a program for making a computer execute the data analyzing method. In particular, the present embodiment relates the program for making the computer perform the data analyzing device and method for extracting correlation between data which are not easily detectable and otherwise will be left undetected when roughly looking into a plurality of data accumulated in a calculating system.

In many sites including the semiconductor manufacturing process, a large amount of data of various types is accumulated in a calculating system. These data do not produce any profit if they are just accumulated. A data mining is one of the data analysis methods for efficiently finding the regularity and characteristic hidden in the large amount of data of various types. The data mining is widely used in industrial fields. The data mining has been used in finance and distribution fields producing excellent results, and recently the data mining has been applied to process data analysis fields including the semiconductor process.

In analysis of numerical data, in many cases the data distribution indicates a certain characteristic rather than showing a random distribution. Accordingly, if such a certain characteristic can be efficiently extracted from the data distribution, it is possible to obtain industrially superior information. Practically, most collected data have temporal variation. In particular, such a temporal variation is important in manufacturing process data. In the data analysis, it is important to determine whether the temporal variation in data has a random pattern or a characteristic pattern. If the temporal variation is characterized, it is desirable to efficiently extract the information relating to the characteristic. In such a semiconductor manufacturing process, yield which is numerical data, performance, and various variables relating thereto are examples of the data subjected to the data analysis.

Generally, the temporal variation of the various variables can be detected by drawing a trend graph in which the variable subjected to the data analysis is set as the vertical axis and time is set as the horizontal axis. In the trend graph, an area is identified in which the fluctuation pattern of the variable or the value of the variable is distinctively different from that of the other areas. For example, in the case of the trend graph showing the yield of the semiconductor manufacturing process or the like, information such as the fluctuation pattern of the yield, for example, serves as a very important clue that leads to an improvement in the manufacturing process.

Figure 42:
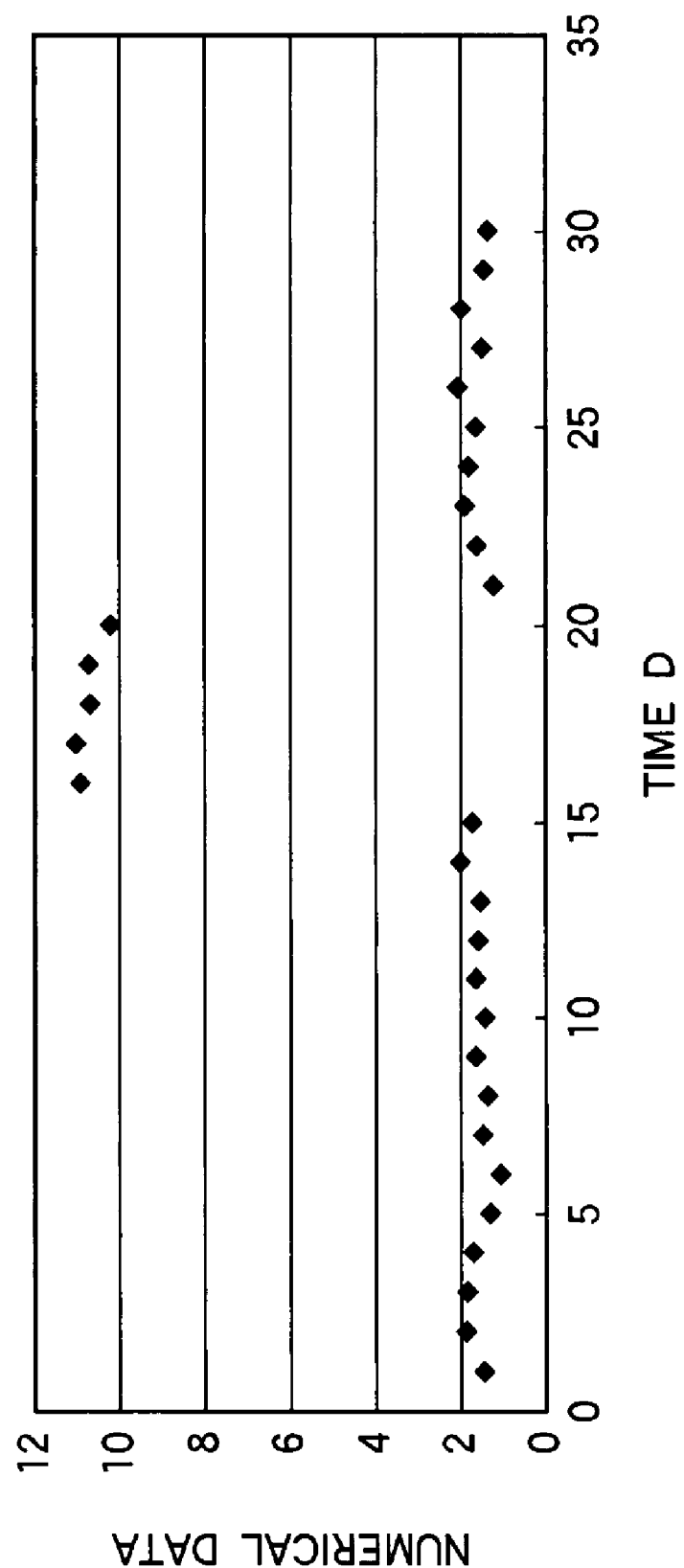
FIG. 42 is a first example of a trend graph.
Figure 43:
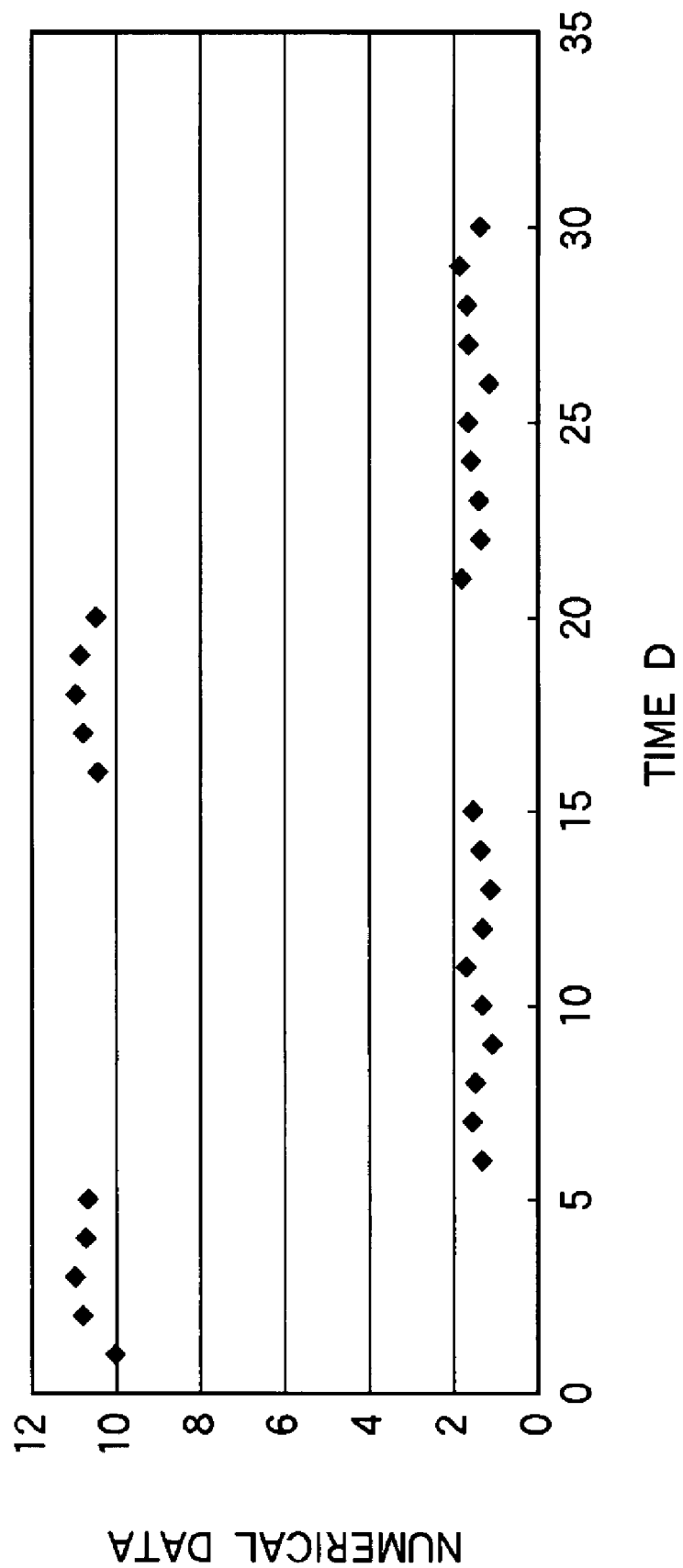
FIG. 43 is a second example of a trend graph.
Figure 44:
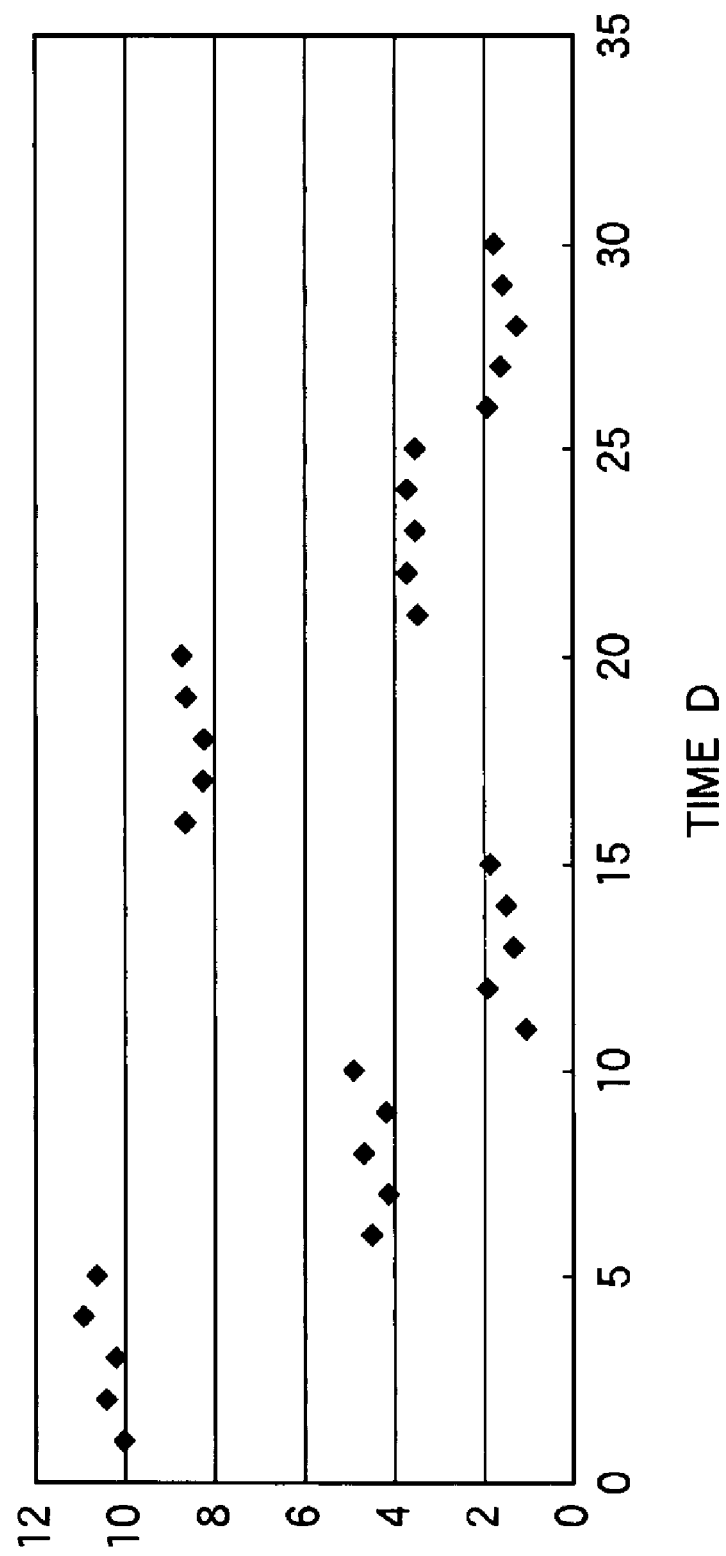
FIG. 44 is a third example of a trend graph.

FIGS. 42 to 44 illustrate examples of the trend graph. In FIGS. 42 to 44, the horizontal axis represents the time D and the vertical axis represents predetermined numerical data such as yield and measure in the semiconductor manufacturing process and the like. For example, the time D is defined in units of date.

In the trend graph, there are some characteristic areas in which the numerical data values are larger or smaller than those of other areas. For example, in the trend graph illustrated in FIG. 42, the numerical data values in the area satisfying $16 \leq$ time $D \leq 20$ are larger than those of other areas. That is, the area satisfying $16 \leq$ time $D \leq 20$ is a characteristic area. It can be expected that the numerical data values in the characteristic area are different from those of normal areas (the other areas) due to a cause of some kind. By extracting the difference of the numerical data values between the characteristic area and the other areas, a detection of defective factors in the semiconductor manufacturing process is performed. Accordingly, it is important to extract the characteristic area in an efficient and precise manner in which various variables such as yield and measure have unusual values.

However, there are a lot of items (i.e., the variables) requiring the trend to be investigated. Accordingly, in the data analysis using the trend graph, one who analyzes the data, such as an engineer, has to investigate a large number of the trend graphs. A lot of analyzing processes are required for an engineer to investigate the trend graph one by one for each of the variables. In addition, in the data analysis using the trend graph, although the trend graph subjected to the data analysis is as simple as the trend graph illustrated in FIG. 42, one who analyzes the data has to scroll down the display screen on which the trend graph is displayed. Furthermore, in many cases, the characteristic area is not only limited in one area, but may spread over a plurality of areas as shown in FIG. 43. In the trend graph illustrated in FIG. 43, the characteristic area having the larger numerical data value than that of the other areas is in two areas of $1 \leq$ time $D \leq 5$ and $16 \leq$ time $D \leq 20$. As shown in FIG. 44, when values of the variable (i.e., the object variable) subjected to the data analysis are varying for every area, it is also important to select a method of partitioning the areas into a large-valued area and a small-valued area so as to efficiently extract the maximum statistical significance difference between two areas.

However, in the data analysis by using the trend graph, it is difficult to decide position at which the distribution of numerical data on the trend graph is suitably partitioned into a large-valued area and a small-valued area. That is, it is difficult to judge which method for partitioning area can maximize the statistical significance difference between two areas. Accordingly, the effective method based on a quantitative standard is desirable.

In the data analyzing device and method, and the program for making a computer execute data analyzing method according to the first to fifth embodiments, the data analysis is performed by using the quantitative indicator which is the grade of unity, and it is automatically extracted whether the utmost statistical significance difference exists between the values of the object variable of the two areas, depending on which area partition is performed. However, in the first to fifth embodiments, the records Ri are grouped into the n small sets Gj each having the fixed number of records in the order of serial numbers of the records, and the size of the object variable values in the grouping areas is estimated. The grouping into small set Gj is performed independent of the object variable values. Accordingly, In accordance with the pattern partitioned into the small sets Gj, for example, it may happen that an area having large values and an area having small values of the numerical data illustrated in FIGS. 42 and 43 are grouped into the same small set Gj. Since the small set Gj is the minimum unit of the partition into two areas, in such a case, it may also happen that the original statistical significance difference can not be extracted. Consequently, in the first to fifth embodiments, it easily occurs that the precision of extracting the statistical significance difference decreases.

In the first to fifth embodiments, the statistical significance difference between the values of the object variable is extracted by making the various partition patterns of small sets differing in the area partition method or in the number of records Ri and calculating the grade of unity for each partition pattern. As a result, in the first to fifth embodiments, extracting speed of the statistical significance difference easily decrease.

In such a manner according to the first to fifth embodiments, a decrease of efficiency for extracting the statistical significance difference easily occurs in view of precision and speed. The data analyzing device and method, and the program for making the computer execute the data analyzing method according to the present embodiment are configured to solve the aforementioned task.

The difference between the present embodiment and the first to fifth embodiments to provide the data analyzing device and method, and the program for making the computer execute the data analyzing method exists in the method of grouping the records Ri into the small sets Gj. In the first to fifth embodiments, when grouping the m records Ri into the n small sets Gj, the fixed number of records Ri is grouped into the small sets Gj in the order of the serial number of records Ri. Conversely, in the present embodiment, by using a regression tree analysis, the area having a large value of the statistical significance difference is automatically extracted.

In the data analyzing device and method, and the program for making the computer execute the data analyzing method according to the present embodiment, when the m records Ri are partitioned into the n small sets Gj, a regression tree analysis is performed on the m records Ri, and leaf nodes obtained as the result of the regression tree analysis are used as the n small sets Gj. Additionally, only one explanatory variable is used as the explanatory variables of the regression tree analysis.

Hereinafter, the data analyzing device and method, and the program for making the computer execute the data analyzing method according to the present embodiment will be described.

First, referring to FIGS. 45 and 46, data subjected to the data analysis according to the present embodiment will be described. FIG. 45 is a table illustrating a data file 501 subjected to a data analysis according to the present embodiment. As shown in FIGS. 1 and 45, the data file 501 is different from the data file 1 in that the data of the time D in the data file 1 is data of dates which are March 1st, March 2nd, . . . , March $25^{th}$, while the data of the time D in the data file 501 is data for calculating the dates which are 1, 2, . . . , and 25, that is, numerical data. In the present embodiment, since the method of grouping the records Ri into the n small sets Gj is different from that of the first embodiment, the variable Gj is not necessary for the data file 501. Except for the aforementioned differences, the data file 501 is the same as the data file 1. In the data analysis according to the present embodiment, the temperature T1 is used as the object variable. The explanatory variable is set to only the time D.

Figure 46:
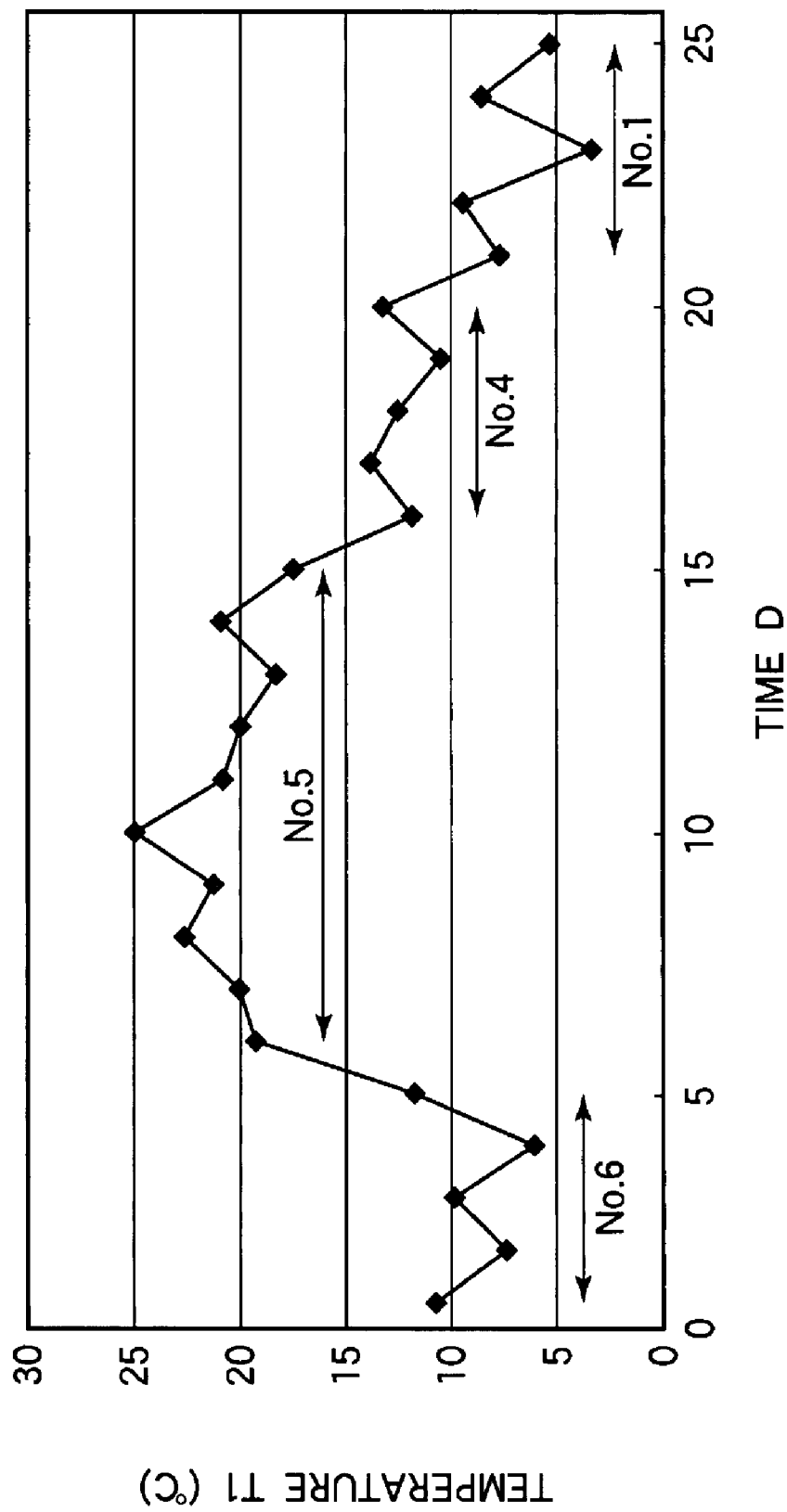
FIG. 46 is a trend graph of temperature T1.

FIG. 46 is a trend graph of the temperature T1. The horizontal axis represents the time D, and the vertical axis represents the temperature T1 (° C.). The trend graph illustrated in FIG. 46 is the same as the trend graph illustrated in FIG. 2, except for the difference in a unit of the time D.

Hereinafter, the data analyzing method according to the present embodiment will be described. The data analyzing method according to the present embodiment is configured to automatically extract an analysis result of determining which area has a large statistical significance difference of the temperature T1 accompanied with a quantitative estimation value.

First, the object variable is set to the temperature T1, the explanatory variable is set to only the time D, and then the regression tree analysis is performed on the 25 records Ri. The regression tree analysis is performed by repeating the partition set into two by using the set including the 25 records Ri as a root node.

The regression tree analysis is performed by processes 1 to 5 as follows. 1. Whether a set D0 not partitioned satisfies a predetermined partition stopping condition is judged. 2. The partition of the set is stopped when the set D0 satisfies the predetermined partition stopping condition. Accordingly, the lower node of the set is not formed. In the present embodiment, there are the three predetermined partition stopping conditions where (a) the number (i.e., the number of elements) of the record Ri belonging to the set D0 is one, (b) values (i.e., a character value) of the explanatory variable of the record Ri belonging to the set D0 is all the same, (c) a standard deviation of the object variables of the records Ri belonging to the set D0 is the predetermined value or less. When the set D0 corresponds to any one of the three conditions (a), (b), and (c), the set is not partitioned into two. Hereinafter, the predetermined value of the condition (c) is referred to as partition stopping value. In the present embodiment, the partition stopping value is set to 0.7 times of the standard deviation of the object variables of all records Ri. Here, a setting value of the partition stopping value is not limited in the 0.7 times of the standard deviation of the object variables, and for example, it is allowed that the setting value is set to k times (0<k<1) of the standard deviation of the object variables.

3. When the set D0 does not satisfy the predetermined partition stopping condition, the character and its character value of the explanatory variable for partitioning the set D0 into two sets D1 and D2 so that $\Delta S'$ represented by the following Expression 3 has the maximum value.

$$\Delta S' = S'0 - (S'1 + S'2) \tag{3}$$

The S'0 is the sum of deviation squares of the object variables (which are the temperature T1 in the present embodiment) of the records Ri belonging to the set D0 not partitioned, S'1 is the sum of deviation squares of the object variables of the records Ri belonging to the one partitioned set D1, and S'2 is the sum of deviation squares of the object variables of the records Ri belonging to the other partitioned set D2. The set partition having the maximum ΔS' becomes a set partition in which the utmost statistical significance difference occurs between the object variables of the partitioned two sets D1 and D2. Setting every value of the numerical data which is the explanatory variable to a threshold value, the partition set into two is performed, and the ΔS' is calculated for every set.

4. By using the explanatory variable and the threshold value having the maximum ΔS', the set D0 is partitioned into the two sets D1 and D2. With such a configuration, the nodes of the two sets D1 and D2 are formed on the lower layer of the node of the set D0. In the regression tree analysis, since the explanatory variable is set to only the time D, the character of the explanatory variable of partitioning the set D0 into the two sets D1 and D2 is the time D. In the two sets D1 and D2, the order of the explanatory variable is continuous, that is, each of the two sets D1 and D2 includes the records Ri arranged in continuous order of the time D. By performing the processes 1 to 4, the partition set into two is executed.

5. By performing the processes 1 to 4 on the partitioned sets D1 and D2, the partition set into two is repeated. In the process 5, the partitioned sets D1 and D2 is reset to the set D0 in the processes 1 to 4. As the result of the processes 1 to 5, the regression tree is formed, and the size of the object variable values is characterized by the size of the explanatory variable values.

Figure 47:
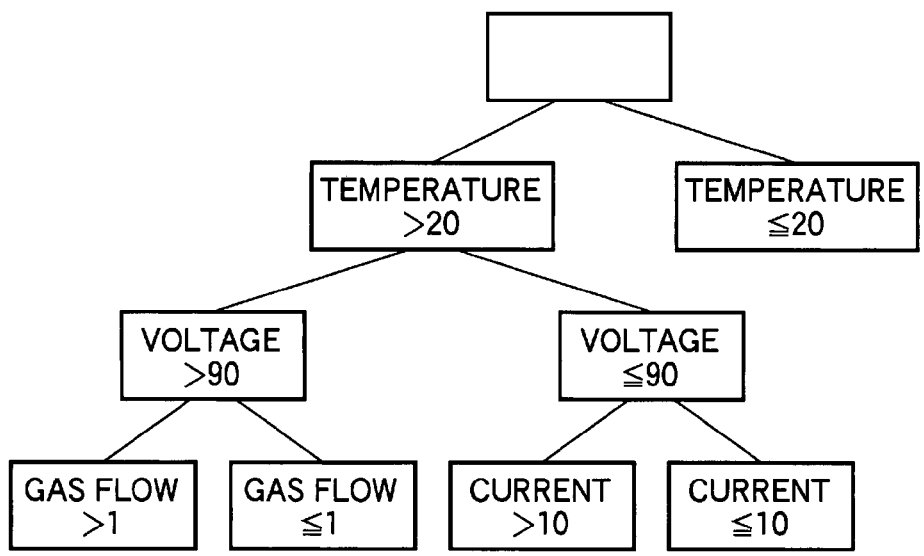
FIG. 47 is an example of a regression tree diagram.

Here, the difference between the regression tree analysis according to the present embodiment and a general regression tree analysis will be described. FIG. 47 is a diagram illustrating the general regression tree analysis, and illustrates an example of a regression tree diagram. The regression tree diagram illustrated in FIG. 47 is formed by the regression tree analysis in which the object variable is set to yield, and the explanatory variable is set to temperature, voltage, gas flow, and current.

In the regression tree analysis, the ΔS' is calculated for every explanatory variable and threshold value whenever the set is partitioned into two. Accordingly, in the general regression tree analysis as shown in FIG. 47, a branch of each layer of the regression tree diagram is generally formed by a different explanatory variable (there is also the case where the branch is formed by the same explanatory variable). This is naturally originated from the function of the regression tree analysis for extracting an analysis result of judging which explanatory variable and range (which also includes combination) including the same is most effective.

Contrary to this, in the present embodiment, the regression tree analysis is executed by setting the explanatory variable to only the time D. Then, the every branch forming each layer structure of the regression tree diagram is performed by the time D which is the same variable to all, and thus the condition of each node represents the range of the time D. Since the branch of the node in the obtained regression tree diagram is performed by the time D which is the same variable to all, it can be automatically detected what kind of characteristic relating to value size of the temperature T1 exists in the time D area (which may be configured as plural areas including starting point and ending point). Since the branch condition of each node constituting the regression tree diagram is defined as each threshold value size of the time D, average values and the like of the object variables of the data belonging to the nodes and the range of the time D which is the explanatory variable is determined.

Figure 48:
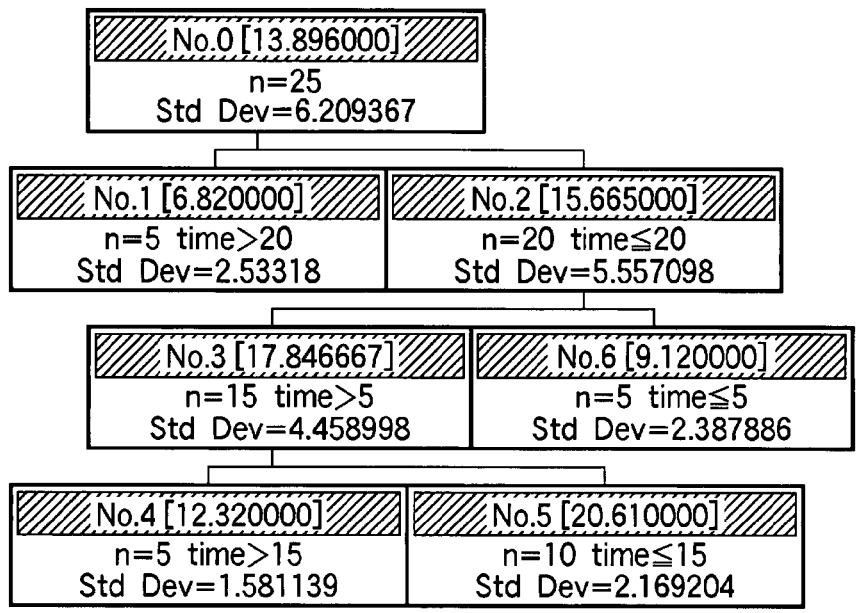
FIG. 48 is a regression tree diagram illustrating a result of a regression tree analysis according to the sixth embodiment of the invention.

FIG. 48 is a regression tree diagram illustrating a result of a regression tree analysis. Here, by referring to FIG. 48, information obtainable from the regression tree diagram will be described. In FIG. 48, an item 'Title' indicates a name of the object variable subjected to the data analysis. In the present embodiment, the 'Title' is set to the temperature T1, the 'Title' may be changed by the setting depending on situations.

The set is represented as each node having a rectangular frame shape in the drawings. Hereinafter, the set itself may be referred to as the node. No. X (X=0, 1 . . . 6) which is written in the node indicates serial number of the node. The node No. 0 disposed on top section in the drawings is a root node. The root node indicates a node positioned on a highest layer in the tree structure of the regression tree diagram. In the present embodiment, the node number of the root node is set to the No. 0, and the node number is given to each node, but the numbering method for node is not limited in this method. The node which positioned on ending section of the partition node is referred to as a leaf node. The node No. 1, No. 4, No. 5, and No. 6 are defined as the leaf node.

A value in [ ] positioned on right side of the node number represents the average value of the object variables (which are the temperature T1 in the present embodiment) of the records Ri belonging to the set. The item 'n' in the node represents the number of the records Ri belonging to the set. The item 'time' represents the range of the time D of the records Ri belonging to the set. The item 'StdDev' represents the standard deviation of the object variables of the records Ri belonging to the set. One who analyzes the data can get rough information of the sets by looking into the item in the node.

The item 'All StdDev' positioned on upper left side in the drawings represents the standard deviation of the object variables of the entire record Ri. In the present embodiment, the standard deviation of the temperature T1 of the entire record Ri is 6.209367. The item 'Stop StdDev' represents the partition stopping value. The partition stopping value is set to 0.7 times of the standard deviation of the temperature T1 of the entire record Ri, and the value in the present embodiment is 4.346557. Accordingly, the standard deviation of the object variables of the node No. 1, No. 4, No. 5, and No. 6 which are the leaf nodes is 4.346557 or less. The regression tree diagrams illustrated in FIG. 48 and the following drawings is constructed in the same manner as the above-described regression tree diagram.

Referring to FIG. 48, results of the regression tree analysis will be described. The set D0 (i.e., the root node No. 0) including the entire record Ri does not correspond to any one of the partition stopping conditions (a) to (c), and thus the set is partitioned into two sets. To partition the set D0 into two, the ΔS' represented by the above-described Expression 3 is calculated for the respective 24 (=25−1) combinations partitioning the twenty-five records Ri into the set D1 including the (25−t) records Ri of which the time D is larger than t (t=1, 2 . . . , 24) and the set D2 including the t records Ri of which the time D is t or less. The result of the calculation, it is calculated that the character of the explanatory variable maximizing the ΔS' is the time D, the threshold value of the explanatory variable is given by t=20.

As the result, the root node No. 0 is partitioned into the node No. 1 including the five records Ri of which the time D satisfies 20<time≦25 and the node No. 2 including the twenty records Ri of which the time D satisfies time≦20. Since the standard deviation of the temperature T1 of the records Ri belonging to the node No. 1 is 2.53318, the standard deviation of the temperature T1 is not more than 0.7 times of that of the entire record Ri, the node No. 1 is not partitioned. The node No. 2 is partitioned into the node No. 3 including the fifteen records Ri of which the time D satisfies 5<time≦20 and the node No. 6 including the five records Ri of which the time D satisfies time≦5. The node No. 3 is partitioned into the node No. 4 including the five records Ri of which the time D satisfies 15<time≦20 and the node No. 5 including the ten records Ri of which the time D satisfies 5<time≦15. Since the standard deviation of the temperature T1 of the records Ri belonging to the nodes No. 4, No. 5, and No. 6 is not more than 0.7 times of that of the entire record Ri, the nodes No. 4, No. 5, and No. 6 are not partitioned.

Since the regression tree analysis is performed by repeatedly partitioning the set including the records Ri subjected to analysis into two sets by the object variable, the entire record Ri belongs to any one of the leaf nodes. In the present embodiment, the entire record Ri belongs to any one of the leaf nodes No. 1, No. 4, No. 5, and No. 6. The leaf node number belongs to each of the 25 records Ri is represented in FIG. 46. As shown in FIG. 46, in the result of the regression tree analysis, the 25 records Ri are grouped into the four leaf nodes No. 1, No. 4, No. 5, and No. 6 including the records Ri having the continuous time D.

Next of the regression tree analysis, the records Ri belongs to the same leaf node is set to one small set, the group ID which is a character of record Ri is added to each record Ri. Form this result, any one of the small set names is added to each record Ri, and each record Ri belongs to any one of the small sets. Here, the node number of each leaf node is defined as a new variable 'LNO'. As shown in FIG. 45, the variables LNO are added to the records Ri, respectively.

TABLE 11

| SMALL SET | THE NUMBER OF RECORDS | RANGE OF TIME D | AVERAGE VALUE (° C.) OF TEMPERATURE T1 |
|---|---|---|---|
| No. 1 | 5 | 21 to 25 | 6.82 |
| No. 4 | 5 | 16 to 20 | 12.32 |
| No. 5 | 10 | 6 to 15 | 20.61 |
| No. 6 | 5 | 1 to 5 | 9.12 |

Table 11 represents the node number, the number of the record Ri, the range of the time D, and the average value (° C.) of the temperature T1 of the small sets for every four small sets. One who analyze the data can read and judge that Table 11 represents, the number of the record Ri, the range of the time D, and the average value of the temperature T1 belonging to the small sets from FIG. 48.

As a result of the regression tree analysis, them records Ri (in the present embodiment, m=25) is grouped into the n small sets (in the present embodiment, n=4) where the area of the time D is continuous, the statistical significance difference of the temperature T1 is large in comparison with the other areas (i.e., the small sets), and the values of the temperature T1 is relatively close to each other in the same small set. Hereinafter, the data analyzing method according to the present embodiment makes the leaf node obtained form the result of the regression tree analysis be the small set, and uses the corresponding small set instead of the small sets Gj and G2j in the first to the fifth embodiments, thereby performing the same data analysis as the data analyzing method according to the first to the fifth embodiments.

Figure 49:
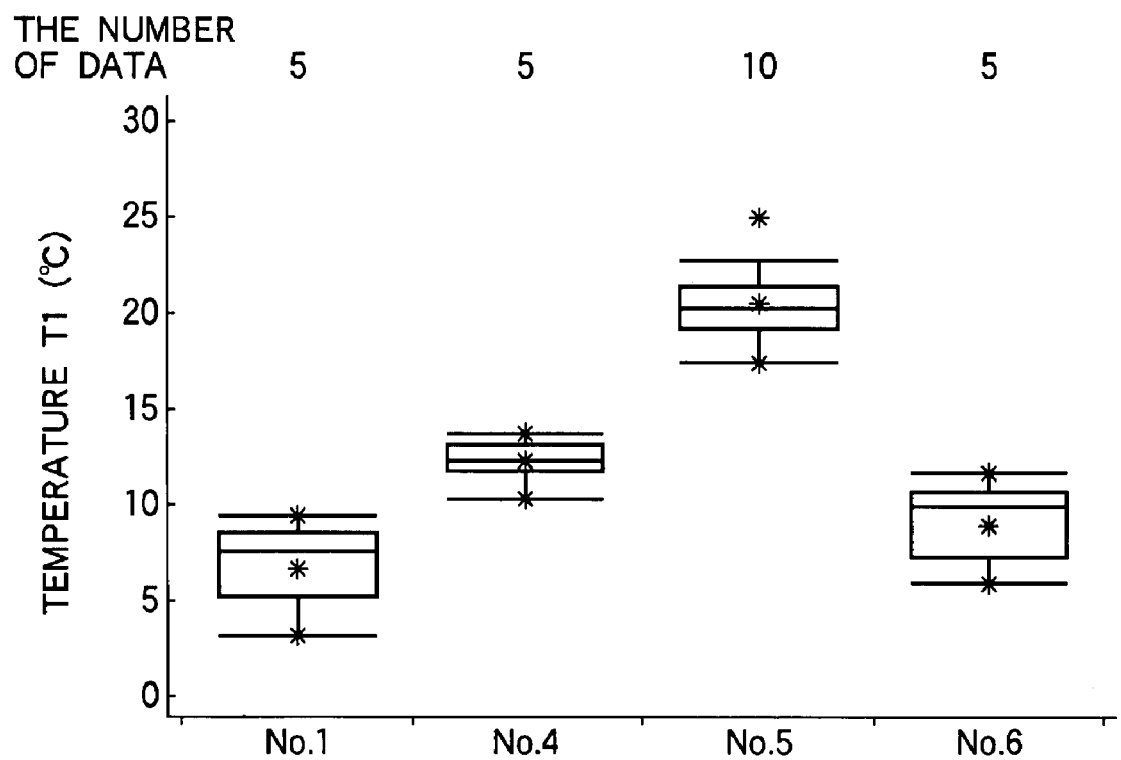
FIG. 49 is a box and whisker plot illustrating distribution of the temperature T1 for every small set.

Here, the distribution of the temperature T1 of each small set is illustrated in FIG. 49. FIG. 49 is the box and whiskers plot illustrating the distribution of the temperature T1 for every small set. In FIG. 49, the horizontal axis represents the small set, and the vertical axis represents the temperature T1 (° C.). The number of records (i.e., the number of data) belonging to each small set is denoted on upper section of the box and whiskers plot of each of the small sets No. 1, No. 4, No. 5, and No. 6.

As shown in Table 11 and FIG. 49, when the small sets are arranged in the order of the large average value of the temperature T1, the small sets are represented as No. 5 (average value=20.61), No. 4 (12.32), No. 6 (9.12), and No. 1 (6.82). Accordingly, when these small sets are grouped into the two large sets G'1$k$ and G'2$k$, it is extracted what kinds of the grouping method maximizes the statistical significance difference of the temperature T1 of the two large sets G'1$k$ and G'2$k$. Consequently, the area is extracted in which the value of the temperature T1 is greatly different from those of the other areas for every area, i.e., for each of the above-described small sets.

After adding the small set names to the records Ri, the four small sets are rearranged in the descending order of the average value of the temperature T1. The rearranged order is represented by No. 5, No. 4, No. 6, and No. 1. Next, three (=4−1) combinations Ak of the small sets Gj are calculated in which the four small sets Gj rearranged in the order of the average value are partitioned into two large sets which are a large set G'1$k$ including k small sets Gj (k=1, 2, 3 (=4−1); and k is a natural number) selected in the descending order of the average value from the small set having the largest average value and a large set G'2$k$ including 4−k remaining small sets Gj. The three combinations Ak is represented by the Table 12.

TABLE 12

| COMBINATION Ak | LARGE SET G'1k | LARGE SET G'2k |
|---|---|---|
| A1 | No. 5 | No. 1, No. 4. No. 6 |
| A2 | No. 5, No. 4 | No. 6, No. 1 |
| A3 | No. 5, No. 4, No. 6 | No. 1 |

Table 12 shows the small sets Gj belonging to the large sets G'1$k$ and G'2$k$ for every three combinations Ak. For example, in the case of combination A1, the large set G'11 includes one small set No. 5 having the largest average value, and the large set G'21 includes three small sets No. 4, No. 6, and No. 1 having the average values smaller than that of No. 5. In the case of combination A2, the large set G'12 includes two small sets No. 5 and No. 4 respectively having the largest and the second largest average values, and the large set G'22 includes two small sets No. 6 and No. 1 having the average values smaller than those of No. 5 and No. 4. In the case of combination A3, the large set G'13 includes three small sets No. 5, No. 4, and No. 6 respectively having the largest to the third largest average values, and the large set G'23 includes one small set No. 1 having the smallest average value.

Next, a grade of unity represented by Expression 1 is calculated for every three combinations Ak.

$$\text{Grade of Unity} = [\{S0 - (S1+S2)\}/S0] \times 100 \qquad (1)$$

In the above expression, S0 is the sum of deviation squares of the object variables (in the present embodiment, the variable is the temperature T1) of m records Ri (in the present embodiment, m=25), S1 is the sum of deviation squares of the temperature T1 of the records Ri belonging to the large set G'1$k$, and S2 is the sum of deviation squares of the temperature T1 of the records Ri belonging to the large set G'2$k$. The average value (13.896) of the temperature T1 of the 25 records Ri is used in calculation of the sum of deviation squares S0. The average value of the temperature T1 of the records Ri belonging to the large set G'1$k$ is used in calculation of the sum of deviation squares S1. The average value of the temperature T1 of the records Ri belonging to the large set G'2$k$ is used in calculation of the sum of deviation squares S2. The grade of unity can take values in the range of from 0% to 100%.

The grade of unity has a mathematical meaning as described below. The grade of unity is an indicator that indicates how much the unity of the values of the temperature T1 of the records Ri belonging to each of the large sets G'1k and G'2k will be improved when partitioning the n small sets (in the present embodiment, n=4) are partitioned into the two large sets G'1k and G'2k. The larger the value of grade of unity, the lesser the dispersion in the values of the temperature T1 of the records Ri belonging to each of the large sets G'1k and G'2k will become prominent by the partition of the small sets into the two large sets G'1k and G'2k. Conversely, the smaller the value of grade of unity, the dispersion in the values of the temperature T1 of the records Ri belonging to each of the large sets G'1k and G'2k is less likely to be variable by the partitioning.

Next, the grade of unity obtained for the same data, that is, the same S0 in Expression 1 will be described. The grade of unity is an indicator for indicating the statistical significance difference of the object variables of the two large sets G'1k and G'2k. As mentioned above, having a great value of grade of unity indicates that the dispersion of the temperature T1 in the two large sets G'1k and G'2k is small. That is, in the case of the same two large sets G'1k and G'2k, a great value of grade of unity indicates that a statistical significance difference of the temperature T1 of the records Ri belonging to the respective set is large. A smaller value of grade of unity means a smaller statistical significance difference.

The grade of unity is a standardized indicator, and is an indicator that is not influenced by the object variables and physical units of the object variables. Since the grade of unity is a standardized indicator, it can be treated as a common indicator even in the analysis of other data (temperature T2, T3, T4, or the like subjected to the data analysis of seventh to ninth embodiments) other than the temperature T1. The calculation result of the grade of unity for every 3 combinations Ak is shown in Table 13.

TABLE 13

| COMBINATION Ak | LARGE SET G'1k | LARGE SET G'2k | GRADE OF UNITY |
|---|---|---|---|
| A1 | No. 5 | No. 1, No. 4, No. 6 | 81.19 |
| A2 | No. 5, No. 4 | No. 6, No. 1 | 63.25 |
| A3 | No. 5, No. 4, No. 6 | No. 1 | 33.81 |

Table 13 shows the small sets belonging to the large sets G'1k and G'2k for every three combinations Ak and the grade of unity for every three combinations Ak. As shown in Table 13, the combinations have a greater grade of unity in the A1, A2, and A3 order.

Next, the three combinations Ak are rearranged in the descending order (in the A1, A2, and A3 order) of the values of the grade of unity. Then, the value and rank of the grade of unity and the starting record number and ending record number (starting time and ending time) of the records Ri belonging to the large sets G'1k and G'2k are outputted in the descending order of the value of the grade of unity of the combination Ak. When the output result is displayed on a screen of a computer, in addition to the aforementioned output data, descriptive statistics (the number of data, the maximum value, the minimum value, the average value, the standard deviation, and the like) of the object variable (i.e., the temperature T1) for each of the large sets G'1k and G'2k are also outputted, and thus it is possible to easily recognize the output result.

FIG. 50 illustrates an example of output results obtained by the data analyzing method according to the present embodiment. In FIG. 50, the combinations Ak, the grade of unity, the small sets and the number of records Ri (large set G'1k (the number of records)) belonging to the large set G'1k, the small sets and the number of records Ri (large set G'2k (the number of records)) belonging to the large set G'2k, an area of the large set G'1k at the time D (large set G'1k area), and an area of the large set G'2k at the time D (large set G'2k area) are shown in the descending order (rank) of the value of the grade of unity of the combination Ak.

When the areas of the large sets G'1k and G'2k illustrated in FIG. 50 are displayed on a screen of a computer, the state where the small sets are continuously arranged is automatically recognized and displayed as continuous areas. For example, as shown in FIG. 50, the large set G'12 of the combination A2 includes a small set No. 5 (the range of the time D is 6 to 15), No. 4 (16 to 20) having continuous time D, and thus the area of the large set G'1k is displayed as '6 to 20'.

As shown in FIG. 50, the combination Ak (rank 1) having the largest grade of unity is the combination A1. In the combination A1, the large set G'11 includes the small set No. 5 (the range of the time D is 6 to 15), and the large set G'21 includes the small sets No. 4, No. 6, and No. 1 (1 to 5 and 16 to 25). The grade of unity of the combination A1 is 81.19 which is a relatively large value. The combination Ak (rank 2) having the second largest grade of unity is the combination A2. In the combination A2, the large set G'12 includes the small sets No. 5 and No. 4 (6 to 20), and the large set G'22 includes the small sets No. 6 and No. 1 (1 to 5 and 21 to 25). The grade of unity of the combination A2 is 63.25. The combination Ak having the smallest grade of unity is the combination A3. The grade of unity of the combination A3 is 33.81.

As shown in FIG. 50, values of the grade of unity which decrease in the order of the ranks 1, 2, and 3 are 81.19, 63.25, and 33.81. It is quantitatively represented by the values of the grade of unity that the statistical significance difference of the temperature T1 of the large set G'1k and the large set G'2k decrease in the order of the ranks 1, 2, and 3.

Figure 51:
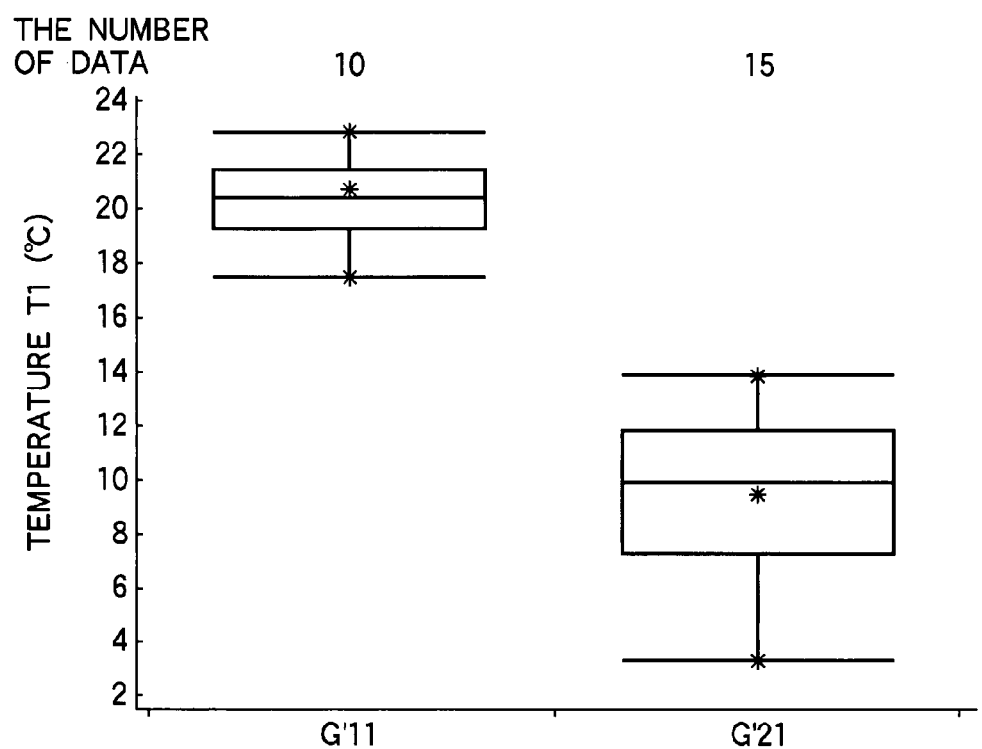
FIG. 51 is a box and whisker plot illustrating the distribution of the temperature T1 corresponding to G'11, G'21 of a combination A1.
Figure 52:
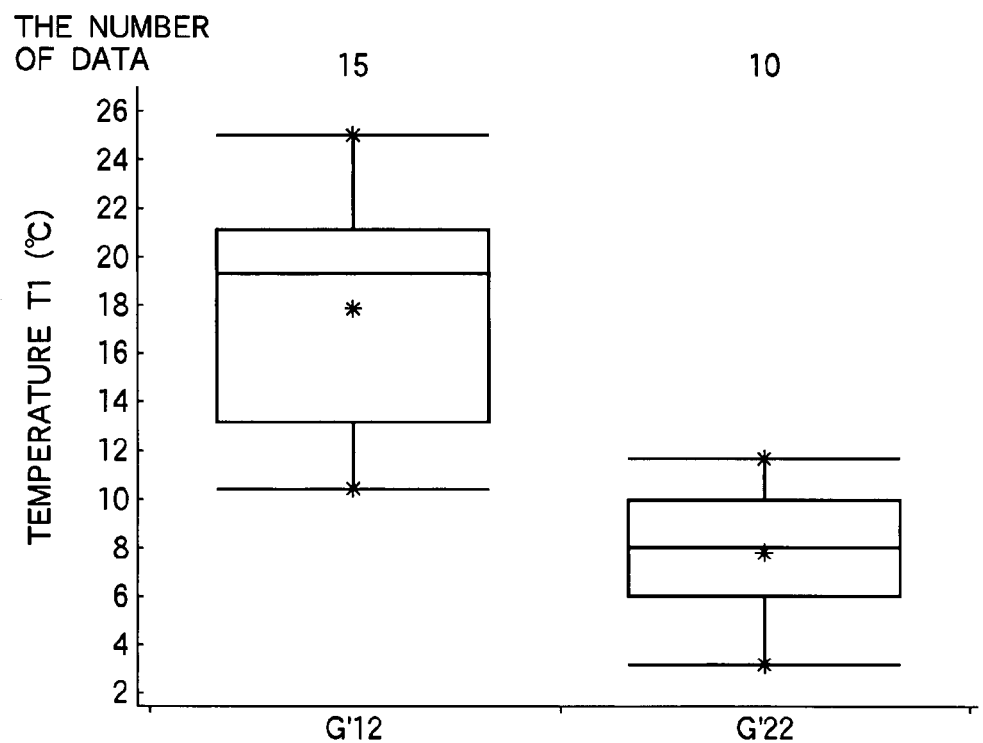
FIG. 52 is a box and whisker plot illustrating the distribution of the temperature T1 corresponding to G'12, G'22 of a combination A2.
Figure 53:
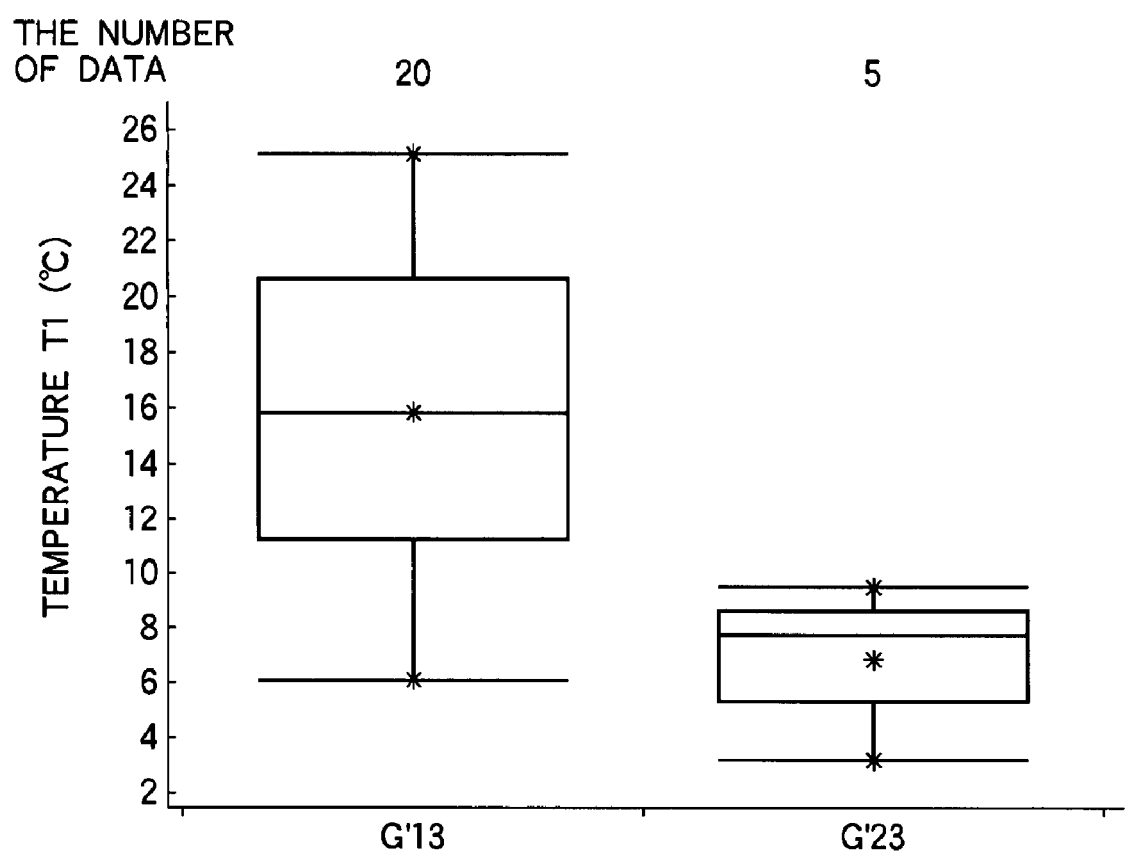
FIG. 53 is a box and whisker plot illustrating the distribution of the temperature T1 corresponding to G'13, G'23 of a combination A3.

FIG. 51 is a box and whisker plot illustrating the distribution of the temperature T1 corresponding to the large sets G'11 and G'21 of the combination A1. Likewise, FIGS. 52 and 53 are box and whisker plots illustrating the distribution of the temperature T1 corresponding to the large sets G'1k and G'2k of the combinations A2 and A3. In FIGS. 51 to 53, the horizontal axis represents the large sets G'1k and G'2k, and the vertical axis represents the temperature T1 (° C.). As shown in FIG. 51, in the combination A1 having the largest grade of unity of 81.19, the statistical significance difference of the temperature T1 between the large sets G'11 and G'21 becomes the maximum. As shown in FIGS. 51 to 53, the statistical significance difference of the temperature T1 between the large sets G'1k and G'2k decreases with the decrease of the grade of unity.

Since the statistical significance difference of the temperature T1 in an area in the range of 6≦time D≦15 becomes a remarkable value as compared to that of the other areas, the result of the data analysis according to the present embodiment shows that it is effective to preferentially investigate whether the conditions in the area of 6≦time D≦15 is different from those of the other areas.

It is effective to secondly investigate the area partition based on the rank 2 and rank 3. In this case, the statistical significance difference can be quantitatively estimated by using the grade of unity. As shown in FIG. 53, in the area partition based on the rank 3, the distribution of the temperature T1 is excessively small. In the area partition based on the rank 3, the grade of unity has a small value of 33.81, and thus the statistical significance difference between the temperature T1 in the area of the large set G'11 and the temperature T1 in the area of the large set G'21 is small. Accordingly, it can be estimated that there is a low possibility to extract the size factor of the temperature T1 from the investigation of the real situation.

In the data analyzing method according to the present embodiment, in a method of partitioning n small sets (in the present embodiment, n=4) into two large sets G'1 and G'2, the partitioning method of making the statistical significance difference of the object variable (which is the temperature T1 in the present embodiment) of the two large sets G'1 and G'2 be at the maximum is extracted. A regression tree data analysis method which is a method of extracting the corresponding the statistical significance difference is applied to the data analyzing method according to the present embodiment.

In the regression tree data analysis, the $\Delta S$ is calculated for the entire $2^{(m-1)}-1$ combinations of the m records Ri in which the m records are partitioned into the two large sets G'1 and G'2. Meanwhile, In the data analyzing method according to the present embodiment, it is possible to find the statistical significance difference of the object variable (i.e., the temperature T1), only for the n−1 combinations for partitioning the n small sets into two sets in the order of the large average value of the object variable. Additionally, in the data analyzing method according to the present embodiment, the explanatory variable regarded as a factor having influence on the object variable is one type of the small set representing a time area.

The data analyzing method according to the present embodiment and the seventh to the ninth embodiments to be described later can be performed by making a computer such as a personal computer or a workstation execute the prepared program. Additionally, the program is recorded on the recording medium such as a hard disk, flexible disk, CD-ROM, MO, or DVD that is readable in the computer, and is executed by the computer reading out from the recording medium. The program can be dispersed through the recording medium and a transfer medium such as network.

Referring to FIG. 40, the data analyzing device for performing the data analyzing method according to the present embodiment and the seventh to ninth embodiments to be described later will be described. FIG. 40 is a block diagram illustrating a personal computer 11 as an example of the data analyzing device. As shown in FIG. 40, the personal computer 11 includes a display unit 15, an input unit 17 such as keyboard or mouse, a central processing unit (CPU) 21, a main memory unit (i.e., a main memory) 23, and a secondary memory unit 25 such as a hard disk drive. The central processing unit 21 is connected to the display unit 15, the input unit 17, the main memory unit 23, and the secondary memory unit 25. The secondary memory unit 25 stores the program of the present embodiment, a data file 501 and the like. The program is read out by the main memory unit 23 depending on a demand, a sequence recorded in the program is performed by the central processing unit 21.

The data analyzing device and method, and the program for making the computer execute the data analyzing method according to the present embodiment have advantages as follows.

According to the present embodiment, when the m records Ri are grouped into the n small sets Gj, a regression tree analysis is performed on the m records Ri, and leaf nodes obtained as the result of the regression tree analysis are used as the n small sets Gj. Additionally, only one explanatory variable is used as the explanatory variables (which is the time D in the present embodiment) of the regression tree analysis. As a result of the regression tree analysis, the m records Ri is grouped into the n small sets where the area of the time D is continuous, the statistical significance difference of the object variables is large in comparison with the other areas, and the values of the object variables is relatively close to each other in the same small set. Accordingly, in the present embodiment, unlike the first to fifth embodiments, the possibility capable of grouping an area having large values and an area having small values of the object variable into the same small set is lowered. Additionally, in the present embodiment, contrary to the first to fifth embodiments, it is not necessary to make the various partition patterns differing in the area partition method or in the number of the records Ri of the small sets from each other. Accordingly, compared with the data analyzing device and method, and the program for making the computer execute the data analyzing method according to the first to fifth embodiments, the data analyzing device and method, and the program for making the computer execute the data analyzing method according to the present embodiment is possible to efficiently extract the data distribution information and the like since efficiency for extracting the statistical significance difference can be improved in view of precision and speed.

Additionally, the data analyzing device and method, and the program for making the computer execute the data analyzing method according to the present embodiment are possible to take the same advantages as the data analyzing device and method, and the program for making the computer execute the data analyzing method according to the first embodiment.

Seventh Embodiment

A data analyzing device and method, and a program for making a computer execute the data analyzing method according to the seventh embodiment will be described by referring to FIGS. 54 to 61. First, referring to FIGS. 54 and 55, data subjected to the data analysis according to the present embodiment will be described. FIG. 54 is a table illustrating a data file 601 subjected to a data analysis according to the present embodiment. As shown in FIGS. 10 and 54, the data file 601 is different from the data file 101 in that the data of the time D in the data file 101 is data of dates which are March 1st, March 2nd, . . . , March 25th, while the data of the time D in the data file 601 is data for calculating the dates which are 1, 2, . . . , and 25, that is, numerical data. In the present embodiment, since the method of grouping the records Ri into the n small sets Gj is different from that of the second embodiment, the variable Gj is not necessary for the data file 601. Except for the aforementioned differences, the data file 601 is the same as the data file 101. In the data analysis according to the present embodiment, the temperature T2 is used as the object variable. The explanatory variable is set to only the time D.

Figure 55:
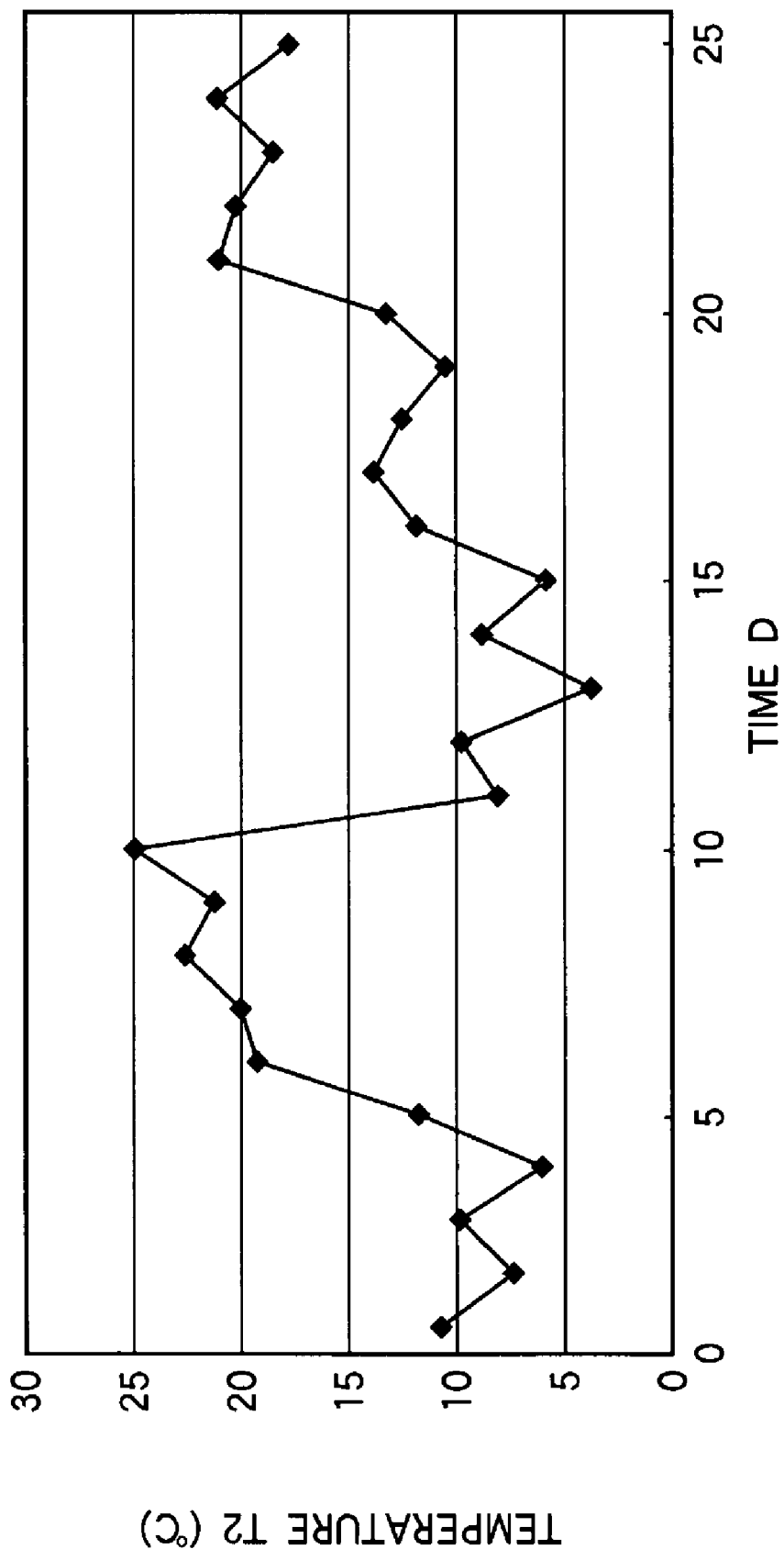
FIG. 55 is a trend graph of temperature T2.

FIG. 55 is a trend graph of the temperature T2. The horizontal axis represents the time D, and the vertical axis represents the temperature T2 (° C.). The trend graph illustrated in FIG. 55 is the same as the trend graph illustrated in FIG. 11, except for the difference in a unit of the time D. As shown in FIG. 55, it looks like the temporal variation of the temperature T2 is greatly different from the temporal variation of the temperature T1 illustrated in FIG. 46. However, as shown in FIGS. 45 and 54, the temporal variation of the temperature T2 is different from the temporal variation of the temperature T1 only in that the temperature in the range of $11 \leq$ time $D \leq 15$ changes with the temperature in the range of $21 \leq$ time $D \leq 25$.

Hereinafter, the data analyzing method according to the present embodiment will be described. In the present embodiment, the data analysis which is the same as the data analyzing method according to the sixth embodiment is performed on the data file 601.

Figure 56:
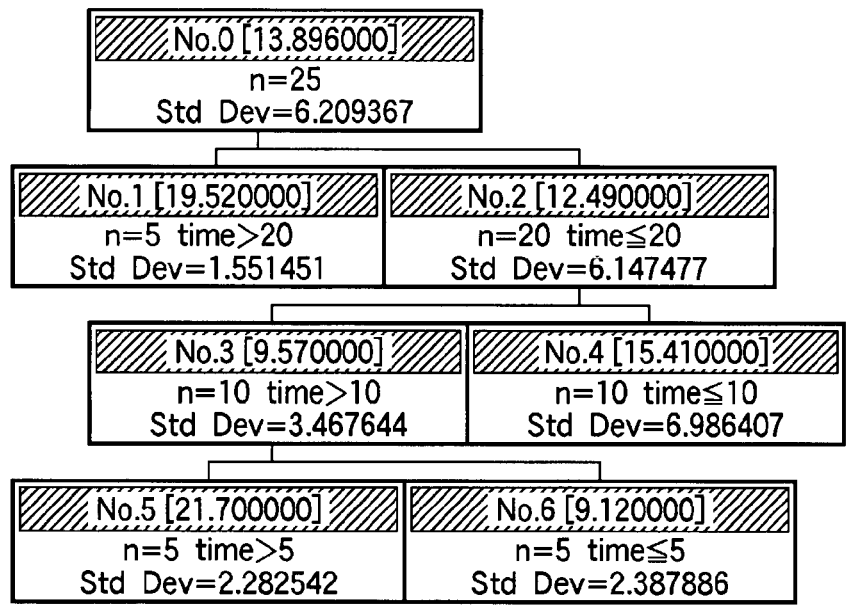
FIG. 56 is a regression tree diagram illustrating a result of a regression tree analysis according to the seventh embodiment of the invention.

First, the object variable is set to the temperature T2, the explanatory variable is set to only the time D, and then the regression tree analysis is performed on the 25 records Ri. FIG. 56 is a regression tree diagram illustrating a result of the regression tree analysis. As shown in FIG. 56, in the present embodiment, the standard deviation of the temperature T2 of the entire record Ri is 6.209367. The partition stopping value is set to 0.7 times of the standard deviation of the temperature T2 of the entire record Ri, and the value in the present embodiment is 4.346557.

Referring to FIG. 56, results of the regression tree analysis will be described. The set D0 (i.e., the root node No. 0) including the entire record Ri does not correspond to any one of the partition stopping conditions (a) to (c), and thus the set is partitioned into two sets. The root node No. 0 is partitioned into the node No. 1 including the five records Ri of which the time D satisfies 20<time≦25 and the node No. 2 including the twenty records Ri of which the time D satisfies time≦20. Since the standard deviation of the temperature T2 of the records Ri belonging to the node No. 1 is 1.551451, and the standard deviation is not more than 0.7 times of that of the entire record Ri, the node No. 1 is not partitioned.

The node No. 2 is partitioned into the node No. 3 including the ten records Ri of which the time D satisfies 10<time≦20 and the node No. 4 including the ten records Ri of which the time D satisfies time≦10. Since the standard deviation of the temperature T2 of the records Ri belonging to the node No. 3 is 3.467644, and the standard deviation is not more than 0.7 times of that of the entire record Ri, the node No. 3 is not partitioned. The node No. 4 is partitioned into the node No. 5 including the five records Ri of which the time D satisfies 5<time≦10 and the node No. 6 including the five records Ri of which the time D satisfies time≦5. Since the standard deviation of the temperature T2 of the records Ri belonging to the nodes No. 5 and No. 6 is not more than 0.7 times of that of the entire record Ri, the nodes No. 5 and No. 6 are not partitioned.

As the result of the regression tree analysis, the leaf nodes No. 1, No. 3, No. 5, and No. 6 can be obtained. The entire record Ri belongs to any one of the leaf nodes No. 1, No. 3, No. 5, and No. 6. In the result of the regression tree analysis, the 25 records Ri are grouped into the four leaf nodes No. 1, No. 3, No. 5, and No. 6 including the records Ri having the continuous time D.

Next of the regression tree analysis, the records Ri belongs to the same leaf node is set to one small set, the group ID which is a character of record Ri is added to each record Ri. Form this result, any one of the small set names is added to each record Ri, and each record Ri belongs to any one of the small sets. Here, the node number of each leaf node is defined as a new variable 'LNO'. As shown in FIG. 54, the variables LNO are added to the records Ri, respectively.

TABLE 14

| SMALL SET | THE NUMBER OF RECORDS | RANGE OF TIME D | AVERAGE VALUE (° C.) OF TEMPERATURE T2 |
|---|---|---|---|
| No. 1 | 5 | 21 to 25 | 19.52 |
| No. 3 | 10 | 11 to 20 | 9.57 |
| No. 5 | 5 | 6 to 10 | 21.7 |
| No. 6 | 5 | 1 to 5 | 9.12 |

Table 14 represents the node number, the number of record Ri, the range of the time D, and the average value (° C.) of the temperature T2 of the small sets for every four small sets. One who analyze the data can read and judge that Table 14 represents, the number of the record Ri, the range of the time D, and the average value (° C.) of the temperature T2 belonging to the small sets from FIG. 56.

Figure 57:
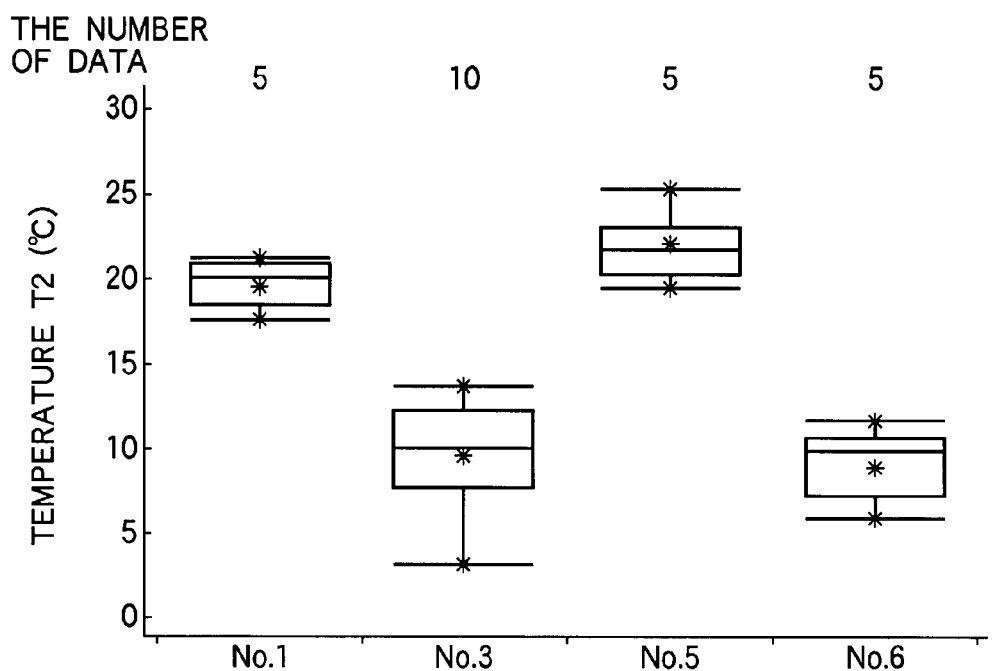
FIG. 57 is a box and whisker plot illustrating distribution of the temperature T2 for every small set.

Here, the distribution of the temperature T2 of each small set is illustrated in FIG. 57. FIG. 57 is the box and whiskers plot illustrating the distribution of the temperature T2 for every small set. In FIG. 57, the horizontal axis represents the small set, and the vertical axis represents the temperature T2 (° C.). The number of records (i.e., the number of data) belonging to each small set is denoted on upper section of the box and whiskers plot of each of the small sets No. 1, No. 3, No. 5, and No. 6.

As shown in Table 14 and FIG. 57, when the small sets are arranged in the order of the large average value of the temperature T2, the small sets are represented as No. 5 (average value=21.7), No. 1 (19.52), No. 3 (9.57), and No. 6 (9.12). In the same manner as the sixth embodiment, the area is extracted in which the value of the temperature T2 is greatly different from those of the other areas for every area, i.e., for each of the above-described small sets.

Next to the addition of the small set names to the records Ri, the four small sets are rearranged in the descending order of the average value of the temperature T2. The rearranged order is represented by No. 5, No. 1, No. 3, and No. 6. Next, three (=4−1) combinations Ak of the small sets are calculated in which the four small sets rearranged in the order of the average value are partitioned into two large sets which are a large set G'1k including k small sets (k=1, 2, 3 (=4−1); and k is a natural number) selected in the descending order of the average value from the small set having the largest average value and a large set G'2k including 4−k remaining small sets. The three combinations Ak is represented by the Table 15.

TABLE 15

| COMBINATION Ak | LARGE SET G'1k | LARGE SET G'2k |
|---|---|---|
| A1 | No. 5 | No. 1, No. 3, No. 6 |
| A2 | No. 5, No. 1 | No. 3, No. 6 |
| A3 | No. 5, No. 1, No. 3 | No. 6 |

Table 15 shows the small sets belonging to the large sets G'1k and G'2k for every three combinations Ak. For example, in the case of combination A1, the large set G'11 includes one small set No. 5 having the largest average value, and the large set G'21 includes three small sets No. 1, No. 3, and No. 6 having the average values smaller than that of No. 5. In the case of combination A2, the large set G'12 includes two small sets No. 5 and No. 1 respectively having the largest and the second largest average values, and the large set G'22 includes two small sets No. 3 and No. 6 having the average values smaller than those of No. 5 and No. 1. In the case of combination A3, the large set G'13 includes three small sets No. 5, No. 1, and No. 3 respectively having the largest to the third largest average values, and the large set G'23 includes one small set No. 6 having the smallest average value.

Next, a grade of unity is calculated for every three combinations Ak. The calculation result of the grade of unity for every three combinations Ak is shown in Table 16.

TABLE 16

| COMBINATION Ak | LARGE SET G'1k | LARGE SET G'2k | GRADE OF UNITY |
|---|---|---|---|
| A1 | No. 5 | No. 1, No. 3, No. 6 | 41.13 |
| A2 | No. 5, No. 1 | No. 3, No. 6 | 81.19 |
| A3 | No. 5, No. 1, No. 3 | No. 6 | 15.41 |

Table 16 shows the small sets belonging to the large sets G'1$k$ and G'2$k$ for every three combinations A$k$ and the grade of unity for every three combinations A$k$. As shown in Table 16, the combinations have a greater grade of unity in the A2, A1, and A3 order.

Next, the three combinations A$k$ are rearranged in the descending order (in the A2, A1, and A3 order) of the values of the grade of unity. Then, the value and rank of the grade of unity and the starting record number and ending record number (starting time and ending time) of the records R$i$ belonging to the large sets G'1$k$ and G'2$k$ are outputted in the descending order of the value of the grade of unity of the combination A$k$.

FIG. 58 illustrates an example of output results obtained by the data analyzing method according to the present embodiment. In FIG. 58, the combinations A$k$, the grade of unity, the small sets and the number of records R$i$ (large set G'1$k$ (the number of records)) belonging to the large set G'1$k$, the small sets and the number of records R$i$ (large set G'2$k$ (the number of records)) belonging to the large set G'2$k$, an area of the large set G'1$k$ at the time D (large set G'1$k$ area), and an area of the large set G'2$k$ at the time D (large set G'2$k$ area) are shown in the descending order (rank) of the value of the grade of unity.

As shown in FIG. 58, the combination A$k$ (rank 1) having the largest grade of unity is the combination A2. In the combination A2, the large set G'11 includes the small set No. 5 and No. 1 (the range of the time D is 6 to 10 and 21 to 25), and the large set G'21 includes the small sets No. 3 and No. 6 (1 to 5 and 11 to 20). The grade of unity of the combination A2 is 81.19 which is a relatively large value. The combination A$k$ (rank 2) having the second largest grade of unity is the combination A1. In the combination A1, the large set G'12 includes the small sets No. 5 (6 to 10), and the large set G'22 includes the small sets No. 3, No. 6, and No. 1 (1 to 5, 11 to 25). The grade of unity of the combination A1 is 41.13. The combination A$k$ having the smallest grade of unity is the combination A3. The grade of unity of the combination A3 is 15.41.

As shown in FIG. 58, values of the grade of unity which decrease in the order of the ranks 1, 2, and 3 are 81.19, 41.13, and 15.41. It is quantitatively represented by the values of the grade of unity that the statistical significance difference of the temperature T2 of the large set G'1$k$ and the large set G'2$k$ decrease in the order of the ranks 1, 2, and 3.

Figure 59:
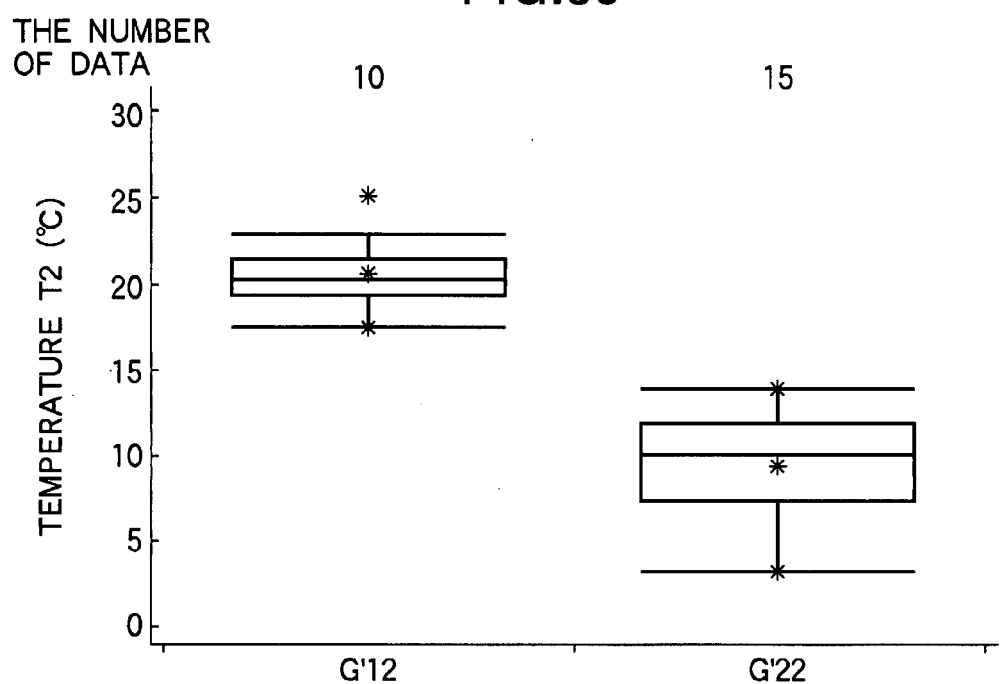
FIG. 59 is a box and whisker plot illustrating the distribution of the temperature T2 corresponding to G'12, G'22 of a combination A2.
Figure 60:
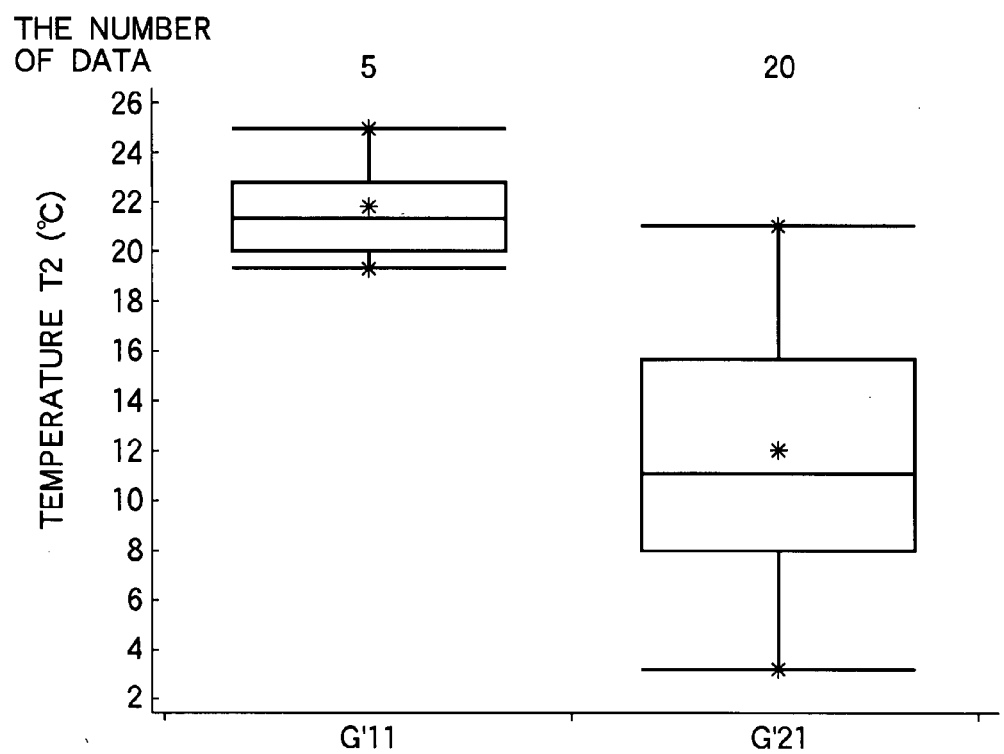
FIG. 60 is a box and whisker plot illustrating the distribution of the temperature T2 corresponding to G'11, G'21 of a combination A1.
Figure 61:
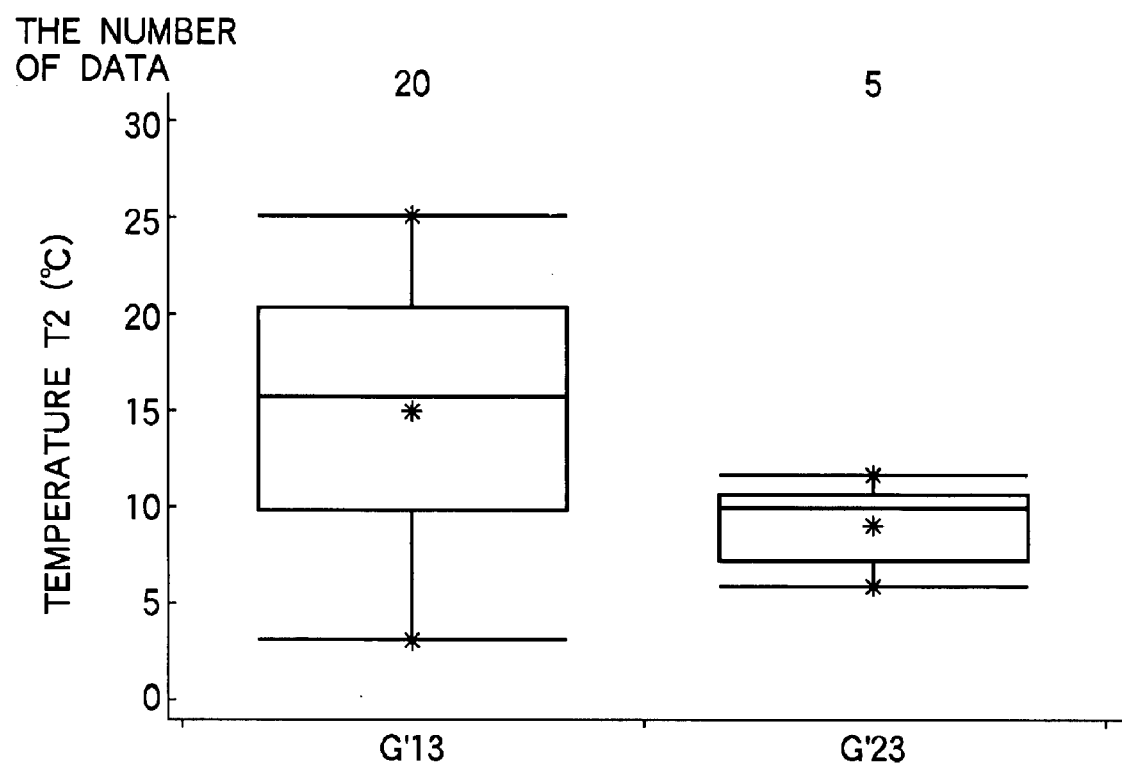
FIG. 61 is a box and whisker plot illustrating the distribution of the temperature T2 corresponding to G'13, G'23 of a combination A3.

FIG. 59 is a box and whisker plot illustrating the distribution of the temperature T2 corresponding to the large sets G'12 and G'22 of the combination A2. Likewise, FIGS. 60 and 61 are box and whisker plots illustrating the distribution of the temperature T2 corresponding to the large sets G'1$k$ and G'2$k$ of the combinations A1 and A3. In FIGS. 59 to 61, the horizontal axis represents the large sets G'1$k$ and G'2$k$, and the vertical axis represents the temperature T2 (° C.).

Since the statistical significance difference of the temperature T2 in areas in the range of 6≦time D≦10 and 21≦time D≦25 becomes much greater than that of the other areas, the result of the data analysis according to the present embodiment shows that it is effective to preferentially investigate whether the conditions in the areas of 6≦time D≦10 and 21≦time D≦25 are different from those of the other areas. It is effective to secondly investigate the area partition based on the rank 2 and rank 3. In this case, the statistical significance difference can be quantitatively estimated by using the grade of unity.

As mentioned above, the temporal variation of the temperature T2 is different from the temporal variation of the temperature T1 only in that the temperature for the time D in the range of 11≦time D≦15 is changed with the temperature for the time D in the range of the 21≦time D≦25. When looking into FIGS. 46 and 55, the trend of the temperature T2 seems to have a great difference from the trend of the temperature T1. However, according to the data analyzing method of the present embodiment, as shown in FIGS. 50 and 58, the result can be obtained that the grade of unity of the combination A2 of the rank 1 in the present embodiment is equal to the grade of unity of the combination A1 of the rank 1 in the sixth embodiment, and that the large set including the area of 11≦time D≦15 and the large set including the area of the 21≦time D≦25 are changed with each other in both combinations A2 and A1. Accordingly, as the result of the data analysis according to the present embodiment, it is quantitatively estimated by means of the grade of unity that the distribution of the temperature T1 and the distribution of the temperature T2 are the same distribution in view of the size relation of the object variables in the areas.

As a result of the data analysis according to the present embodiment, one who analyzes the data can guess that there is a possibility of the same hidden phenomenon and condition existing in the area of 11≦time D≦15 illustrated in FIG. 46 and the area of 21≦time D≦25 illustrated in FIG. 55. Additionally, comparing the grade of unity of the rank 2 in the sixth embodiment with the grade of unity of the rank 2 in the present embodiment, which are respectively 63.25 and 41.13, the grade of unity of the rank 2 in the sixth embodiment is larger than the grade of unity of the rank 2 in the present embodiment. Accordingly, it is desirable for the one who analyzes the data to preferentially investigate the area partition of the rank 2 in the temperature T1 which has the large grade of unity.

Additionally, the data analyzing device and method, and the program for making the computer execute the data analyzing method according to the present embodiment are possible to take the same advantages as the data analyzing device and method, and the program for making the computer execute the data analyzing method according to the sixth embodiment.

Eighth Embodiment

A data analyzing device and method, and a program for making a computer execute the data analyzing method according to the eighth embodiment will be described by referring to FIGS. 62 to 68. First, referring to FIGS. 62 and 63, data subjected to the data analysis according to the present embodiment will be described. FIG. 62 is a table illustrating a data file 701 subjected to a data analysis according to the present embodiment. As shown in FIGS. 18 and 62, the data file 701 is different from the data file 201 in that the data of the time D in the data file 201 is data of dates which are March 1st, March 2nd, . . . , March 25th, while the data of the time D in the data file 701 is data for calculating the dates which are 1, 2, . . . , and 25, that is, numerical data. In the present embodiment, since the method of grouping the records R$i$ into the n small sets G$j$ is different from that of the third embodiment, the variable G$j$ is not necessary for the data file 701. Except for the aforementioned differences, the data file 701 is the same as the data file 201. In the data analysis according to the present embodiment, the temperature T3 is used as the object variable. The explanatory variable is set to only the time D.

Figure 63:
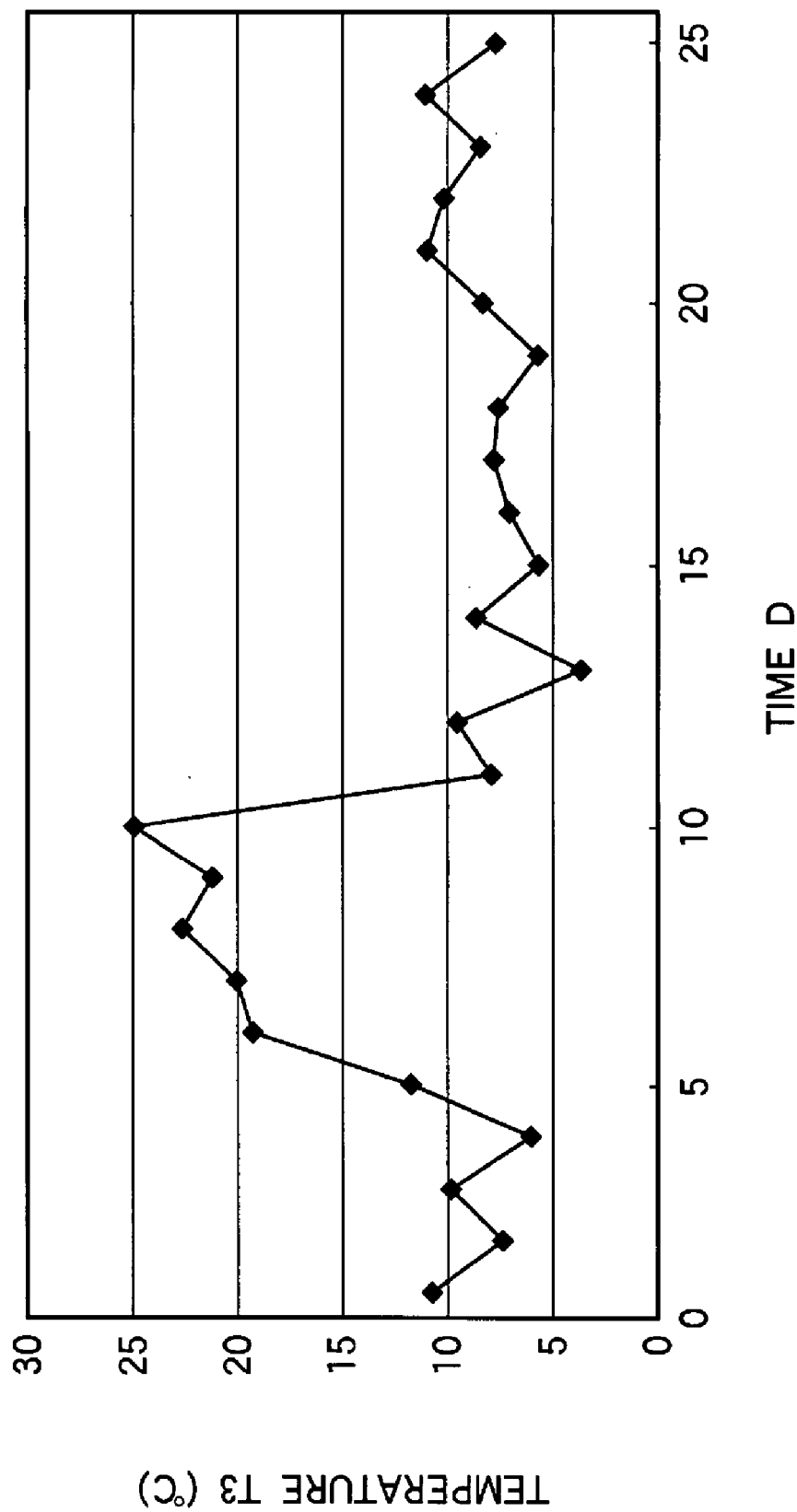
FIG. 63 is a trend graph of temperature T3.

FIG. 63 is a trend graph of the temperature T3. The horizontal axis represents the time D, and the vertical axis represents the temperature T3 (° C.). The trend graph illustrated in FIG. 63 is the same as the trend graph illustrated in FIG. 19, except for the difference in a unit of the time D. As shown in FIG. 63, the temperature T3 is distinctively greatly value in the area of 6≦time D≦10 in comparison with that of the other areas.

Hereinafter, the data analyzing method according to the present embodiment will be described. In the present embodiment, the data analysis which is the same as the data analyzing method according to the sixth embodiment is performed on the data file 701.

Figure 64:
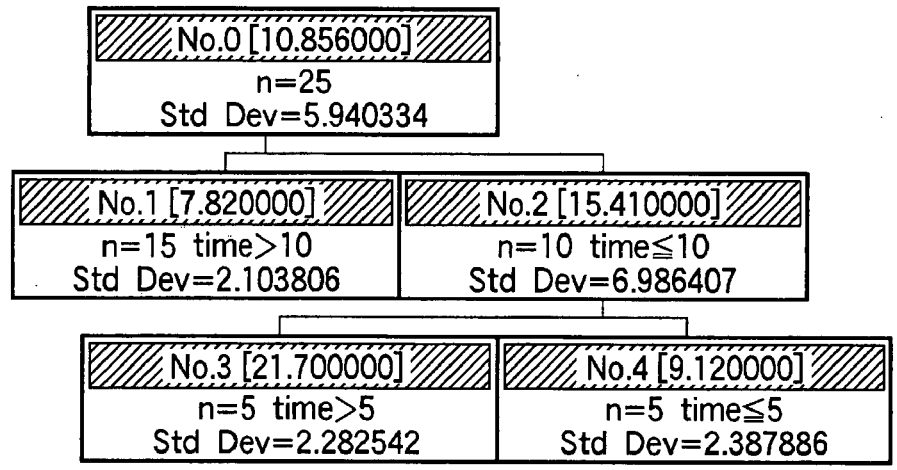
FIG. 64 is a regression tree diagram illustrating a result of a regression tree analysis according to the eighth embodiment of the invention.

First, the object variable is set to the temperature T3, the explanatory variable is set to only the time D, and then the regression tree analysis is performed on the 25 records Ri. FIG. 64 is a regression tree diagram illustrating a result of the regression tree analysis. As shown in FIG. 64, in the present embodiment, the standard deviation of the temperature T3 of the entire record Ri is 5.940334. The partition stopping value is set to 0.7 times of the standard deviation of the temperature T3 of the entire record Ri, and the value in the present embodiment is 4.158234.

Referring to FIG. 64, results of the regression tree analysis will be described. The set D0 (i.e., the root node No. 0) including the entire record Ri does not correspond to any one of the partition stopping conditions (a) to (c), and thus the set is partitioned into two sets. The root node No. 0 is partitioned into the node No. 1 including the fifteen records Ri of which the time D satisfies 10<time≦25 and the node No. 2 including the ten records Ri of which the time D satisfies time≦10. Since the standard deviation of the temperature T3 of the records Ri belonging to the node No. 1 is 2.103806, the standard deviation of the temperature T3 is not more than 0.7 times of that of the entire record Ri, the node No. 1 is not partitioned.

The node No. 2 is partitioned into the node No. 3 including the five records Ri of which the time D satisfies 5<time≦10 and the node No. 4 including the five records Ri of which the time D satisfies time≦5. Since the standard deviation of the temperature T3 of the records Ri belonging to the node No. 3 and No. 4 are not more than 0.7 times of that of the entire record Ri, the node No. 3 and No. 4 are not partitioned.

As the result of the regression tree analysis, the leaf nodes No. 1, No. 3, and No. 4 can be obtained. The entire record Ri belongs to any one of the leaf nodes No. 1, No. 3, and No. 4. In the result of the regression tree analysis, the 25 records Ri are grouped into the three leaf nodes No. 1, No. 3, and No. 4 including the records Ri having the continuous time D.

Next of the regression tree analysis, the records Ri belongs to the same leaf node is set to one small set, the group ID which is a character of record Ri is added to each record Ri. From this result, any one of the small set names is added to each record Ri, and each record Ri belongs to any one of the small sets. Here, the node number of each leaf node is defined as a new variable 'LNO'. As shown in FIG. 62, the variables LNO are added to the records Ri, respectively.

TABLE 17

| SMALL SET | THE NUMBER OF RECORDS | RANGE OF TIME D | AVERAGE VALUE (° C.) OF TEMPERATURE T3 |
| --- | --- | --- | --- |
| No. 1 | 15 | 11 to 25 | 7.82 |
| No. 3 | 5 | 6 to 10 | 21.7 |
| No. 4 | 5 | 1 to 5 | 9.12 |

Table 17 represents the node number, the number of the record Ri, the range of the time D, and the average value (° C.) of the temperature T3 of the small sets for every three small sets. One who analyze the data can read and judge that Table 17 represents the number of the record Ri, the range of the time D, and the average value (° C.) of the temperature T3 belonging to the small sets from FIG. 64.

Figure 65:
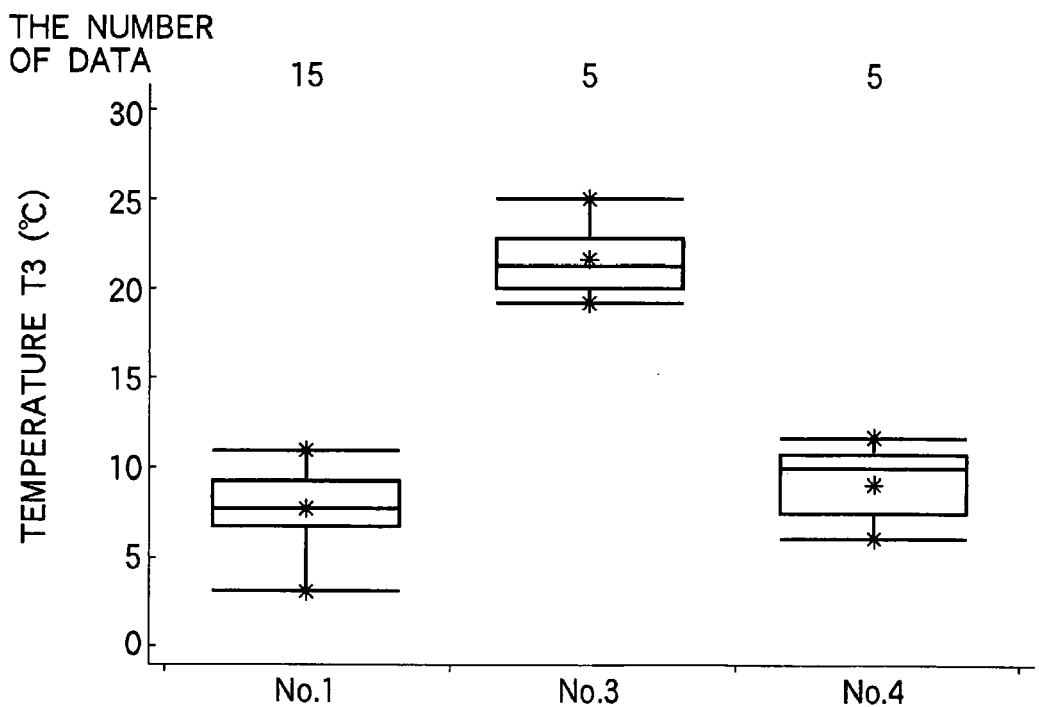
FIG. 65 is a box and whisker plot illustrating distribution of the temperature T3 for every small set.

Here, the distribution of the temperature T3 of each small set is illustrated in FIG. 65. FIG. 65 is the box and whiskers plot illustrating the distribution of the temperature T3 for every small set. In FIG. 65, the horizontal axis represents the small set, and the vertical axis represents the temperature T3 (° C.). The number of records (i.e., the number of data) belonging to each small set is denoted on upper section of the box and whiskers plot of each of the small sets No. 1, No. 3, and No. 4.

As shown in Table 17 and FIG. 65, when the small sets are arranged in the order of the large average value of the temperature T3, the small sets are represented as No. 3 (average value=21.7), No. 4 (9.12), and No. 1 (7.82). Accordingly, when theses small sets are grouped into the two large sets G'1k and G'2k, it is extracted what kinds of the grouping method maximizes the statistical significance difference of the temperature T3 of the two large sets G'1k and G'2k. Consequently, the area is extracted in which the value of the temperature T3 is greatly different from those of the other areas for every area, i.e., for each of the above-described small sets.

Next to the addition of the small set names to the records Ri, the three small sets are rearranged in the descending order of the average value of the temperature T3. The rearranged order is represented by No. 3, No. 4, and No. 1. Next, two (=3−1) combinations Ak of the small sets are calculated in which the three small sets rearranged in the order of the average value are partitioned into two large sets which are a large set G'1k including k small sets Gj (k=1, 2 (=3−1); and k is a natural number) selected in the descending order of the average value and a large set G'2k including 3−k remaining small sets. The two combinations Ak is represented by the Table 18.

TABLE 18

| COMBINATION Ak | LARGE SET G'1k | LARGE SET G'2k |
| --- | --- | --- |
| A1 | No. 3 | No. 4, No. 1 |
| A2 | No. 3, No. 4 | No. 1 |

Table 18 shows the small sets belonging to the large sets G'1k and G'2k for every two combinations Ak. For example, in the case of combination A1, the large set G'11 includes one small set No. 3 having the largest average value, and the large set G'21 includes two small sets No. 4, and No. 1 having the average values smaller than that of No. 3. In the case of combination A2, the large set G'12 includes two small sets No. 3 and No. 4 respectively having the largest and the second largest average values, and the large set G'22 includes one small set No. 1 having the average values smaller than those of No. 3 and No. 4.

Next, a grade of unity is calculated for every two combinations Ak. The calculation result of the grade of unity for every two combinations Ak is shown in Table 19.

TABLE 19

| COMBINATION Ak | LARGE SET G'1k | LARGE SET G'2k | GRADE OF UNITY |
| --- | --- | --- | --- |
| A1 | No. 3 | No. 4, No. 1 | 86.78 |
| A2 | No. 3, No. 4 | No. 1 | 40.81 |

Table 19 shows the small sets Gj belonging to the large sets G'1k and G'2k for every two combinations Ak and the grade of unity for every two combinations Ak. As shown in Table 19, the combinations have a greater grade of unity in the A1 and A2 order.

Next, the two combinations Ak are rearranged in the descending order (in the A1 and A2 order) of the values of the grade of unity. Then, the value and rank of the grade of unity and the starting record number and ending record number (starting time and ending time) of the records Ri belonging to the large sets G'1k and G'2k are outputted in the descending order of the value of the grade of unity of the combination Ak.

FIG. 66 illustrates an example of output results obtained by the data analyzing method according to the present embodiment. In FIG. 66, the combinations Ak, the grade of unity, the small sets and the number of records Ri (large set G'1k (the number of records)) belonging to the large set G'1k, the small sets and the number of records Ri (large set G'2k (the number of records)) belonging to the large set G'2k, an area of the large set G'1k at the time D (large set G'1k area), and an area of the large set G'2k at the time D (large set G'2k area) are shown in the descending order (rank) of the value of the grade of unity.

As shown in FIG. 66, the combination Ak (rank 1) having the largest grade of unity is the combination A1. In the combination A1, the large set G'11 includes the small set No. 3 (the range of the time D is 6 to 10), and the large set G'21 includes the small sets No. 4 and No. 1 (1 to 5 and 11 to 25). The grade of unity of the combination A1 is 86.78 which is a relatively large value. The combination Ak having the smallest grade of unity is the combination A2. The grade of unity of the combination A2 is 40.81.

As shown in FIG. 66, values of the grade of unity which decrease in the order of the ranks 1 and 2 are 86.78 and 40.81. It is quantitatively represented by the values of the grade of unity that the statistical significance difference of the temperature T3 of the large set G'1k and the large set G'2k decrease in the order of the ranks 1 and 2.

Figure 67:
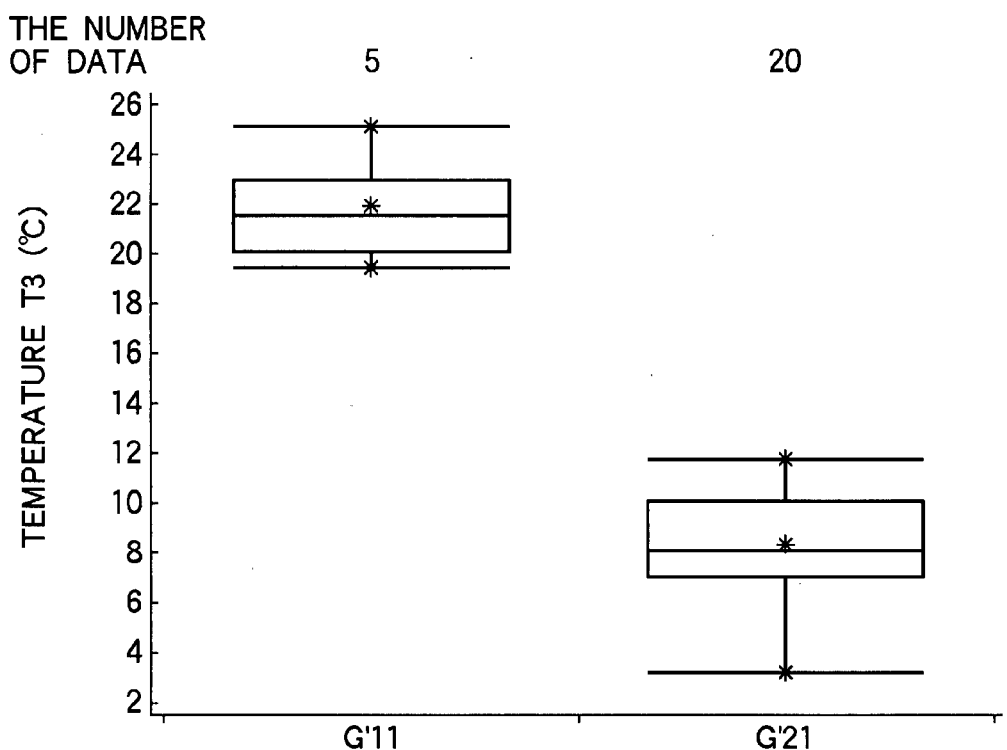
FIG. 67 is a box and whisker plot illustrating the distribution of the temperature T3 corresponding to G'11, G'21 of a combination A1.
Figure 68:
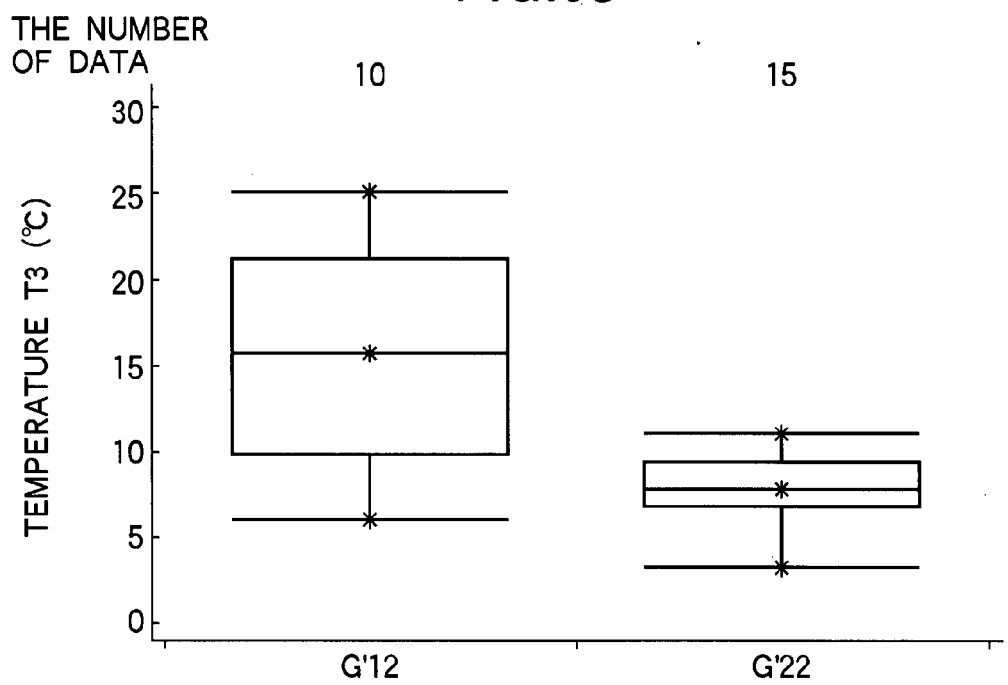
FIG. 68 is a box and whisker plot illustrating the distribution of the temperature T3 corresponding to G'12, G'22 of a combination A2.

FIGS. 67 and 68 are a box and whisker plot illustrating the distribution of the temperature T3 corresponding to the large sets G'1k and G'2k of the combinations A1 and A2. In FIGS. 67 and 68, the horizontal axis represents the large sets G'1k and G'2k, and the vertical axis represents the temperature T3 (° C.).

Since the statistical significance difference of the temperature T3 in an area in the range of $6 \leq time\ D \leq 10$ becomes much greater than that of the other areas, the result of the data analysis according to the present embodiment shows that it is effective to preferentially investigate whether the conditions in the area of $6 \leq time\ D \leq 10$ are different from those of the other areas.

In the present embodiment, the grade of unity is 86.78 in the area partition (i.e., the partition areas: $6 \leq time\ D \leq 10$; $1 \leq time\ D \leq 5$; and $11 \leq time\ D \leq 25$) of the combination A1 of the rank 1, which is the largest of the respective values of the grade of unity obtained from the results of the data analysis in the sixth and seventh embodiment, the present embodiment, and the ninth embodiment to be described later. That is, of the temperatures T1, T2, T3, and T4, when performing the area partition of the combination A1 in the temperature T3, it was quantitatively evaluated by means of the grade of unity that the statistical significance difference of the object variable (i.e., the temperature T3) between the large set G'1k and the large set G'2k became the greatest. From this data analysis result, the estimation can be made that it is effective to preferentially investigate whether the area of $6 \leq time\ D \leq 10$ in the temperature T3 of the temperatures T1, T2, T3, and T4 is different from the other areas.

Subsequently, It is effective to secondly investigate the partition of the areas of the rank 2. However, the grade of unity in the rank 2 is 40.81 which is much smaller than that of the rank 1, and the statistical significance difference for the case of the area partition of the rank 2 is not greatly different from that of the area partition of the rank 1. That is, the abrupt change in the values of the grade of unity from 86.78 to 40.81 indicates an excessively large difference in the values of the grade of unity between the rank 1 and the rank 2, and also indicates that the value of the temperature T3 has a great statistical significance difference only in the area of $6 \leq time\ D \leq 10$ from the other values of the temperature T3 of the other areas. As a result, it can be analyzed that there are some kinds of factors in the area of $6 \leq time\ D \leq 10$ for the extremely great value of the temperature T3 in that area.

Ninth Embodiment

A data analyzing device and method, and a program for making a computer execute the data analyzing method according to the ninth embodiment will be described by referring to FIGS. 69 to 81. First, referring to FIGS. 69 and 70, data subjected to the data analysis according to the present embodiment will be described. FIG. 69 is a table illustrating a data file 801 subjected to a data analysis according to the present embodiment. As shown in FIGS. 26 and 69, the data file 801 is different from the data file 301 in that the data of the time D in the data file 301 is data of dates which are March 1st, March 2nd, . . . , March 25th, while the data of the time D in the data file 801 is data for calculating the dates which are 1, 2, . . . , and 25, that is, numerical data. In the present embodiment, since the method of grouping the records Ri into the n small sets Gj is different from that of the fourth embodiment, the variable Gj is not necessary for the data file 801. Except for the aforementioned differences, the data file 801 is the same as the data file 301. In the data analysis according to the present embodiment, the temperature T4 is used as the object variable. The explanatory variable is set to only the time D.

Figure 70:
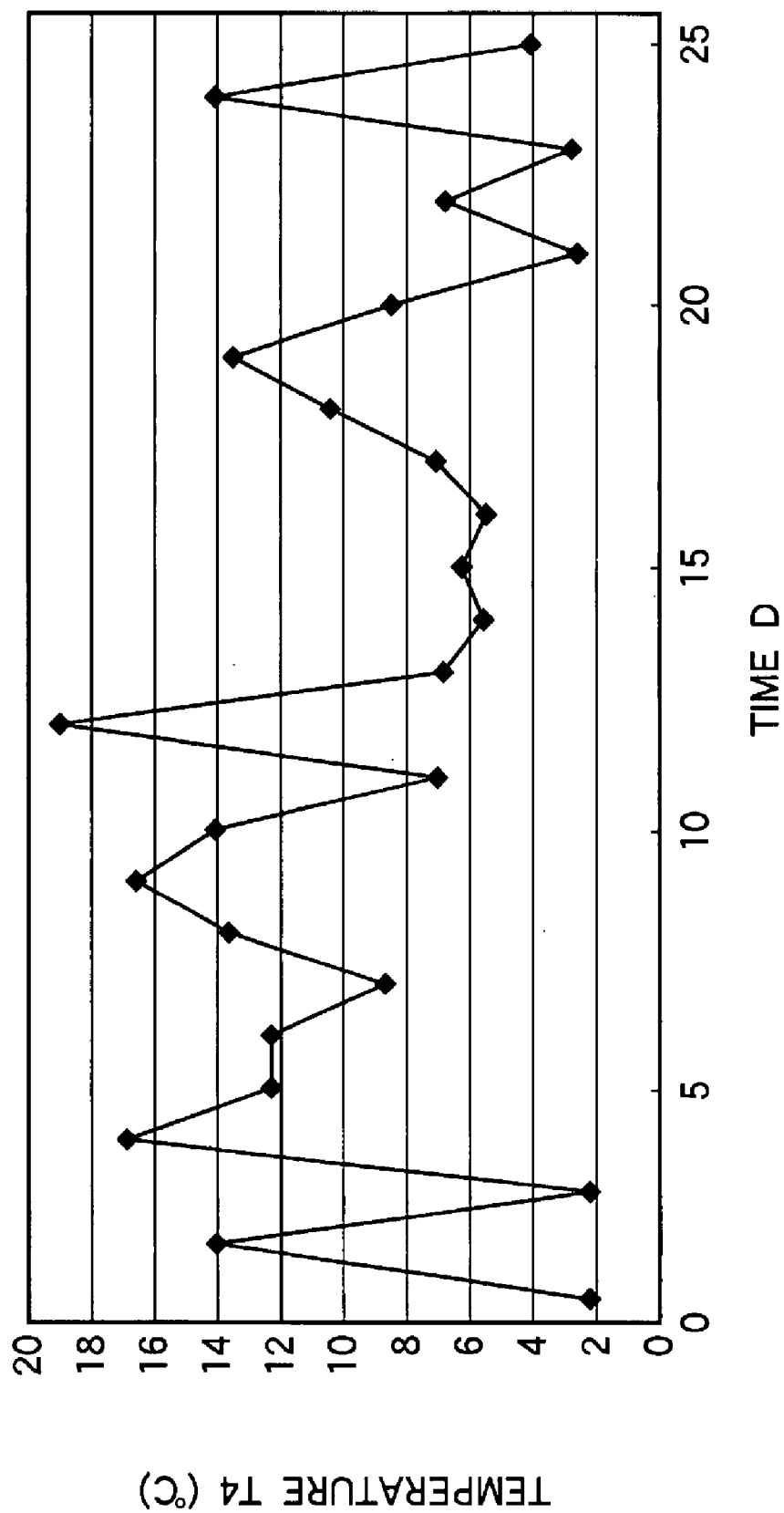
FIG. 70 is a trend graph of temperature T4.

FIG. 70 is a trend graph of the temperature T4. The horizontal axis represents the time D, and the vertical axis represents the temperature T4 (° C.). The trend graph illustrated in FIG. 70 is the same as the trend graph illustrated in FIG. 27, except for the difference in a unit of the time D. Contrary to the temporal variation of the temperature T3 illustrated in FIG. 63, in the temporal variation of the temperature T4 illustrated in FIG. 70, there is no basis to judge that the area have characteristic values in comparison with the other areas.

Hereinafter, the data analyzing method according to the present embodiment will be described. In the present embodiment, the data analysis which is the same as the data analyzing method according to the sixth embodiment is performed on the data file 801.

Figure 71:
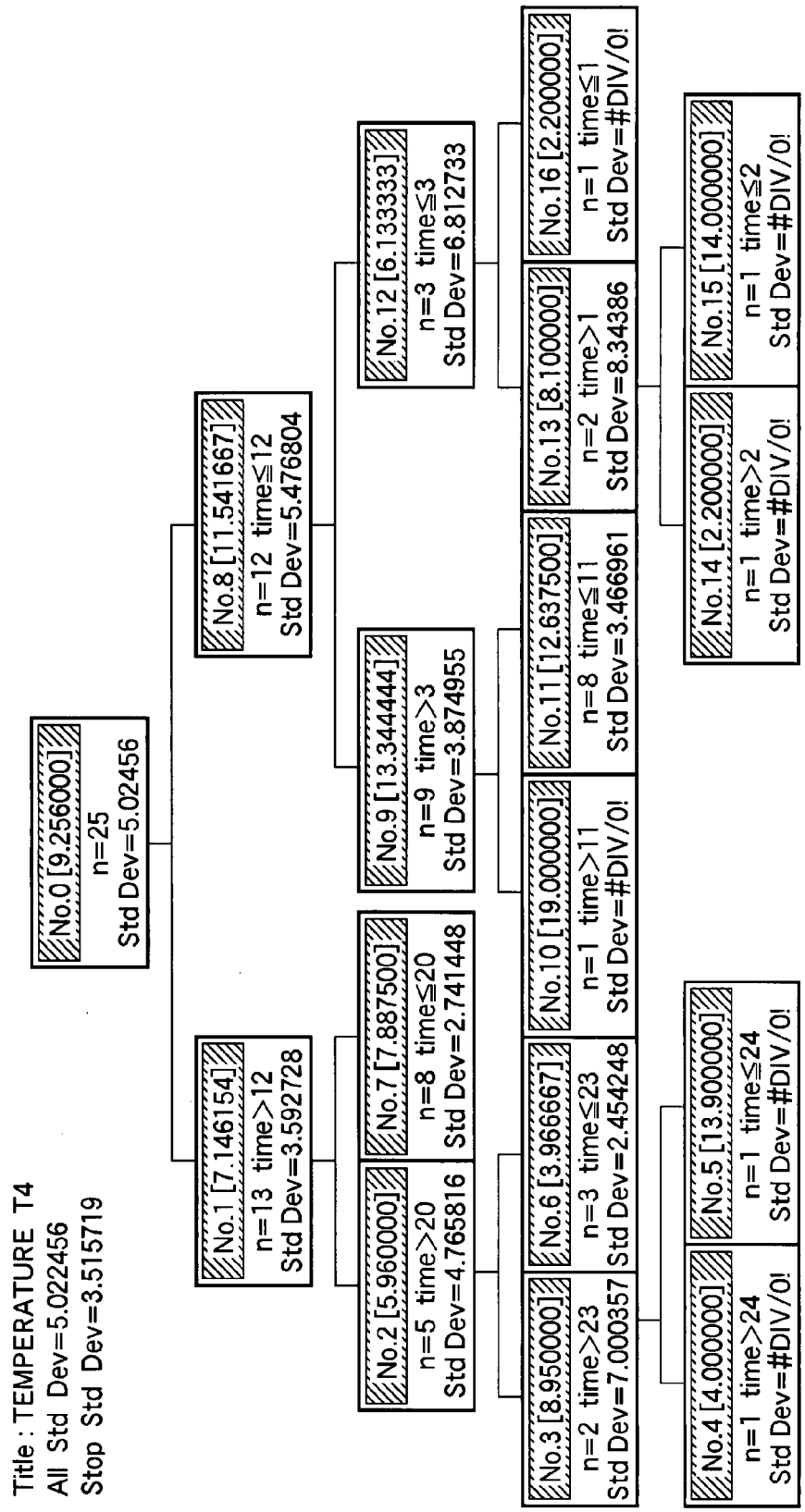
FIG. 71 is a regression tree diagram illustrating a result of a regression tree analysis according to the ninth embodiment of the invention.

First, the object variable is set to the temperature T4, the explanatory variable is set to only the time D, and then the regression tree analysis is performed on the 25 records Ri. FIG. 71 is a regression tree diagram illustrating a result of the regression tree analysis. As shown in FIG. 71, in the present embodiment, the standard deviation of the temperature T4 of the entire record Ri is 5.022456. The partition stopping value is set to 0.7 times of the standard deviation of the temperature T4 of the entire record Ri, and the value in the present embodiment is 3.515719.

Referring to FIG. 71, results of the regression tree analysis will be described. The set D0 (i.e., the root node No. 0)

including the entire record Ri does not correspond to any one of the partition stopping conditions (a) to (c), and thus the set is partitioned into two sets. The root node No. 0 is partitioned into the node No. 1 including the 13 records Ri of which the time D satisfies 12<time≦25 and the node No. 8 including the 12 records Ri of which the time D satisfies time≦12.

The node No. 1 is partitioned into the node No. 2 including the five records Ri of which the time D satisfies 20<time≦25 and the node No. 7 including the eight records Ri of which the time D satisfies 12<time≦20. The node No. 2 is partitioned into the node No. 3 including the two records Ri of which the time D satisfies 23<time≦25 and the node No. 6 including the three records Ri of which the time D satisfies 20<time≦23. The node No. 3 is partitioned into the node No. 4 including the one record Ri of which the time D satisfies 24<time≦25 and the node No. 5 including the one record Ri of which the time D satisfies 23<time≦24.

The node No. 8 is partitioned into the node No. 9 including the nine records Ri of which the time D satisfies 3<time≦12 and the node No. 12 including the three records Ri of which the time D satisfies time≦3. The node No. 9 is partitioned into the node No. 10 including the one record Ri of which the time D satisfies 11<time≦12 and the node No. 11 including the eleven records Ri of which the time D satisfies time≦11.

The node No. 12 is partitioned into the node No. 13 including the two records Ri of which the time D satisfies 1<time≦3 and the node No. 16 including the one record Ri of which the time D satisfies time≦1. The node No. 13 is partitioned into the node No. 14 including the one record Ri of which the time D satisfies 2<time≦3 and the node No. 15 including the one record Ri of which the time D satisfies 1<time≦2.

Since the number of the records Ri belonging to the nodes No. 4, No. 5, No. 10, No. 14, No. 15, and No. 16 is one, the nodes are not partitioned. In FIG. 71, the standard deviation of the nodes No. 4, No. 5, No. 10, No. 14, No. 15, and No. 16 are denoted by '#DIV/0!' since the number of records Ri belonging to the node is only one. Since the standard deviation of the temperature T4 of the records Ri belonging to the nodes No. 6, No. 7, and No. 11 are not more than 0.7 times of that of the entire record Ri, the nodes No. 6, No. 7, and No. 11 are not partitioned.

As the result of the regression tree analysis, the leaf nodes No. 4, No. 5, No. 6, No. 7, No. 10, No. 11, No. 14, No. 15, and No. 16 can be obtained. The entire record Ri belongs to any one of the leaf nodes No. 4, No. 5, No. 6, No. 7, No. 10, No. 11, No. 14, No. 15, and No. 16. In the result of the regression tree analysis, the 25 records Ri are grouped into the nine leaf nodes No. 4, No. 5, No. 6, No. 7, No. 10, No. 11, No. 14, No. 15, and No. 16 including the records Ri having the continuous time D.

Next of the regression tree analysis, the records Ri belongs to the same leaf node is set to one small set, the group ID which is a character of record Ri is added to each record Ri. From this result, any one of the small set names is added to each record Ri, and each record Ri belongs to any one of the small sets. Here, the node number of each leaf node is defined as a new variable 'LNO'. As shown in FIG. 69, the variables LNO are added to the records Ri, respectively.

TABLE 20

| SMALL SET | THE NUMBER OF RECORDS | RANGE OF TIME D | AVERAGE VALUE (° C.) OF TEMPERATURE T4 |
|---|---|---|---|
| No. 4 | 1 | 25 | 4 |
| No. 5 | 1 | 24 | 13.9 |
| No. 6 | 3 | 21 to 23 | 3.97 |

TABLE 20-continued

| SMALL SET | THE NUMBER OF RECORDS | RANGE OF TIME D | AVERAGE VALUE (° C.) OF TEMPERATURE T4 |
|---|---|---|---|
| No. 7 | 8 | 13 to 20 | 7.89 |
| No. 10 | 1 | 12 | 19 |
| No. 11 | 8 | 4 to 11 | 12.64 |
| No. 14 | 1 | 3 | 2.2 |
| No. 15 | 1 | 2 | 14 |
| No. 16 | 1 | 1 | 2.2 |

Table 20 represents the node number, the number of the record Ri, the range of the time D, and the average value (° C.) of the temperature T4 of the small sets for every nine small sets. One who analyze the data can read and judge that Table 20 represents the number of the record Ri, the range of the time D, and the average value (° C.) of the temperature T4 belonging to the small sets from FIG. 71.

Figure 72:
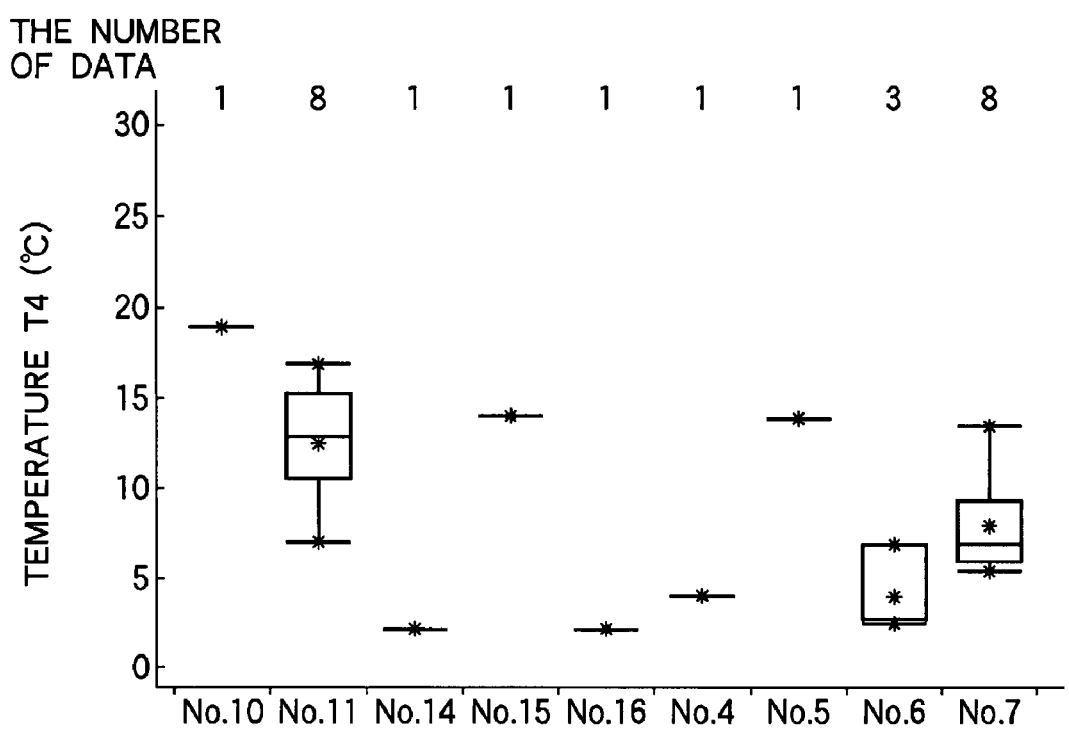
FIG. 72 is a box and whisker plot illustrating distribution of the temperature T4 for every small set.
Figure 74:
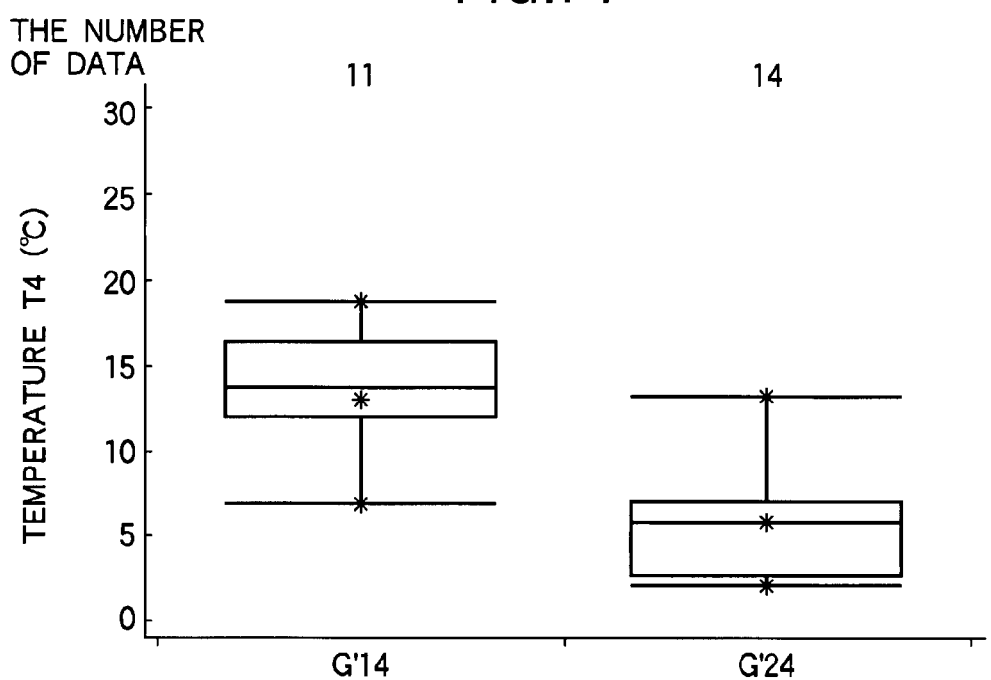
FIG. 74 is a box and whisker plot illustrating the distribution of the temperature T4 corresponding to G'14, G'24 of a combination A4.
Figure 75:
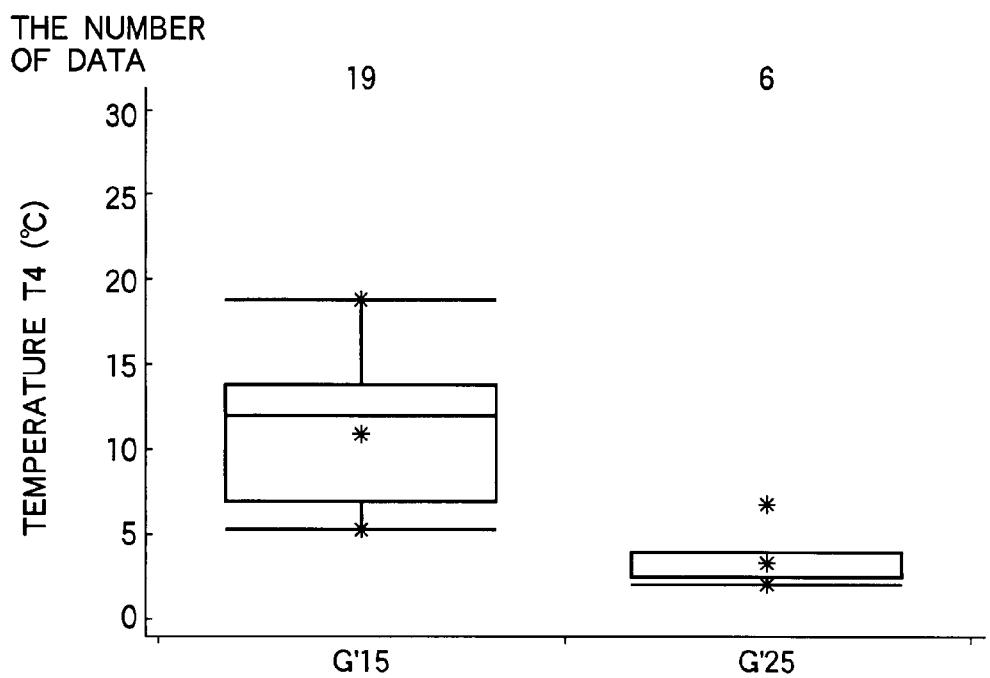
FIG. 75 is a box and whisker plot illustrating the distribution of the temperature T4 corresponding to G'15, G'25 of a combination A5.
Figure 76:
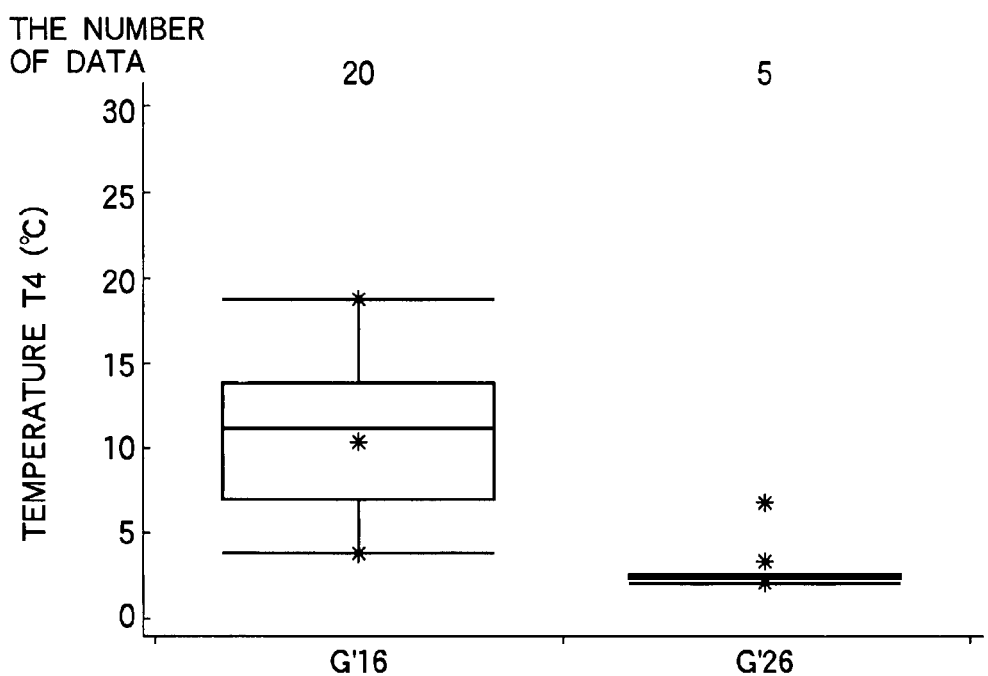
FIG. 76 is a box and whisker plot illustrating the distribution of the temperature T4 corresponding to G'16, G'26 of a combination A6.
Figure 77:
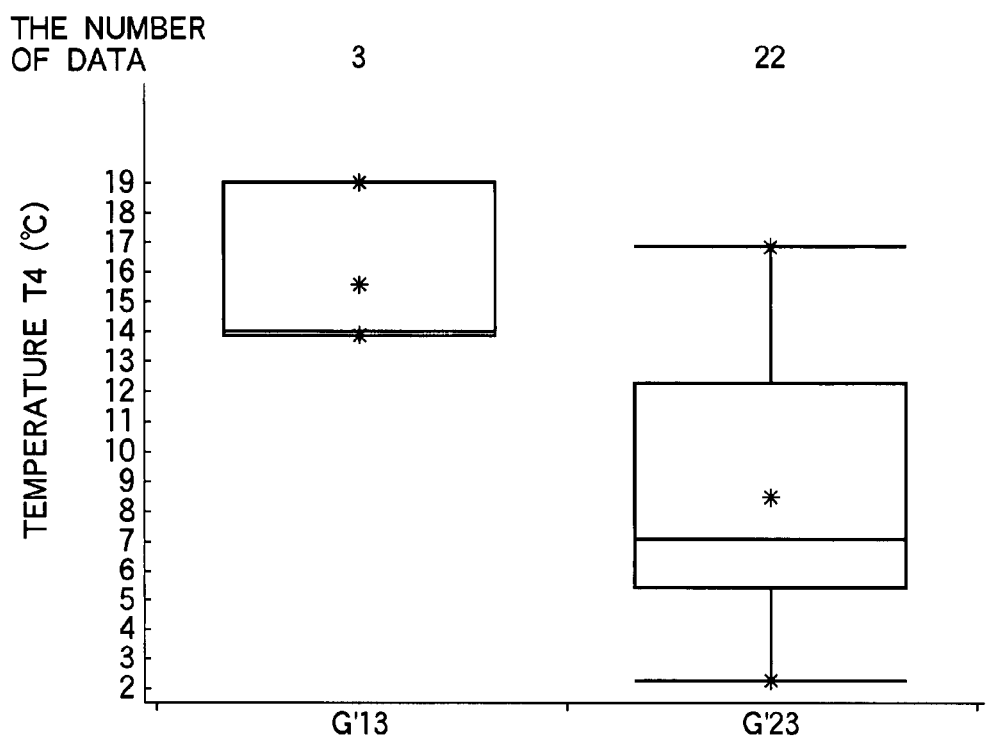
FIG. 77 is a box and whisker plot illustrating the distribution of the temperature T4 corresponding to G'13, G'23 of a combination A3.
Figure 78:
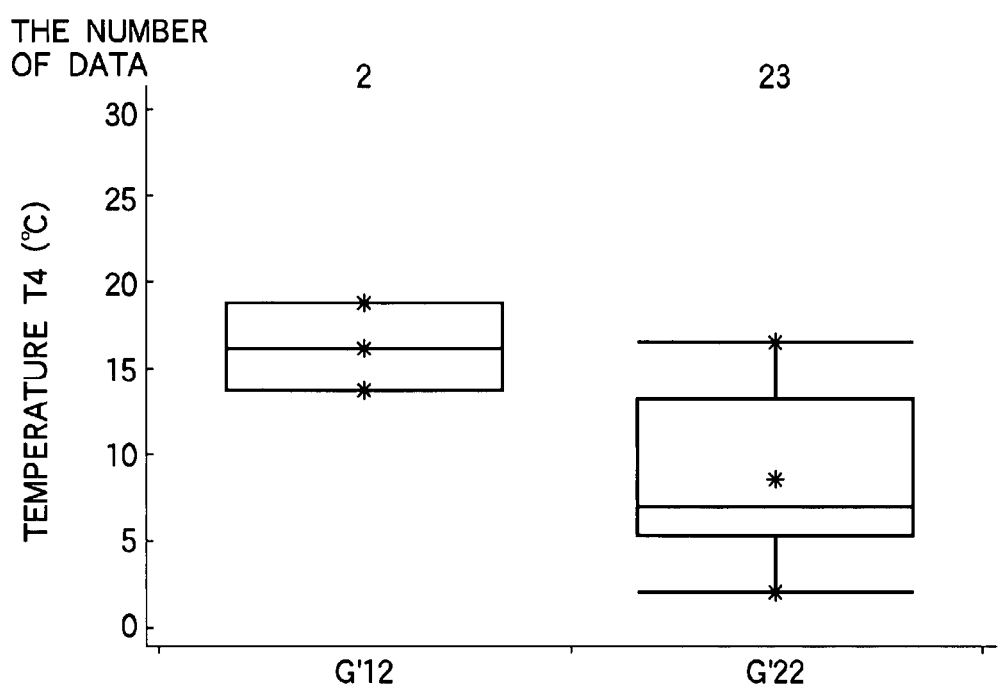
FIG. 78 is a box and whisker plot illustrating the distribution of the temperature T4 corresponding to G'12, G'22 of a combination A2.
Figure 79:
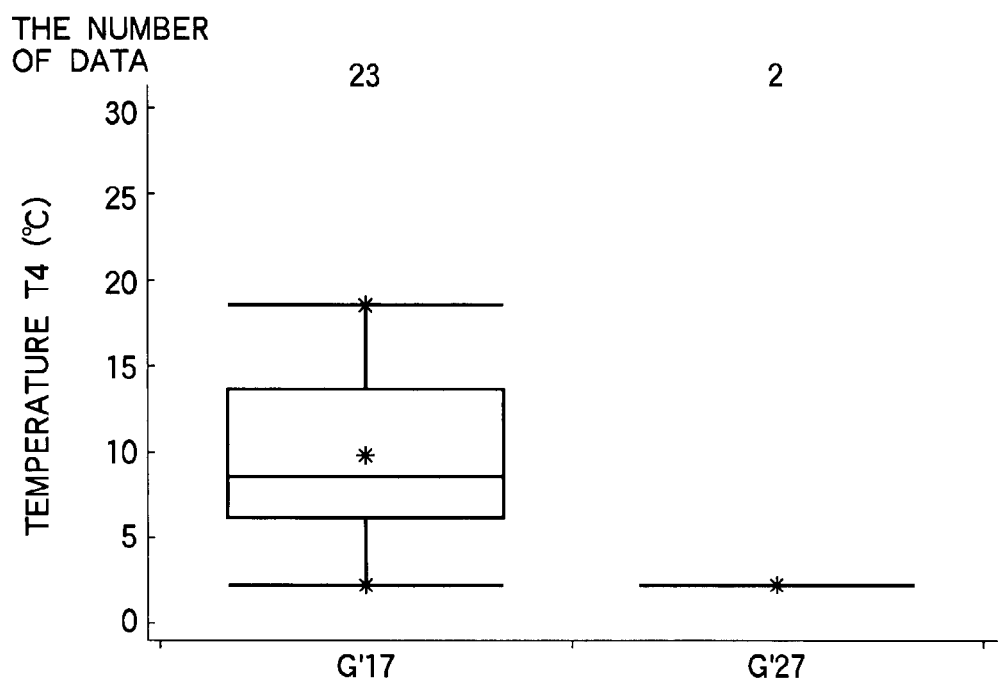
FIG. 79 is a box and whisker plot illustrating the distribution of the temperature T4 corresponding to G'17, G'27 of a combination A7.
Figure 80:
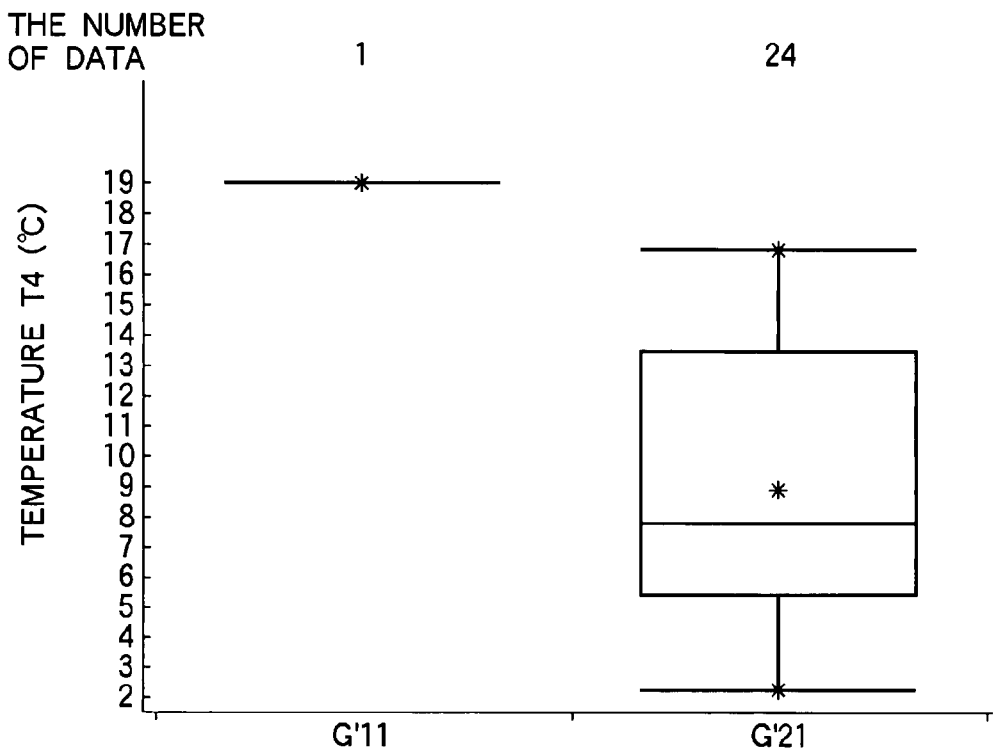
FIG. 80 is a box and whisker plot illustrating the distribution of the temperature T4 corresponding to G'11, G'21 of a combination A1.
Figure 81:
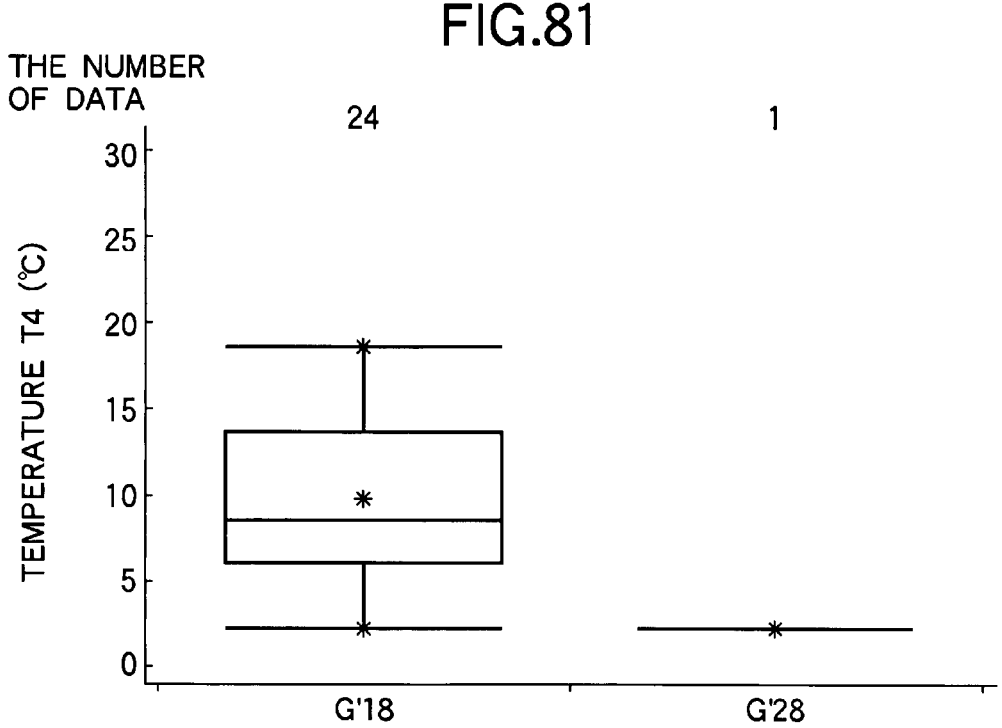
FIG. 81 is a box and whisker plot illustrating the distribution of the temperature T4 corresponding to G'18, G'28 of a combination A8.

Here, the distribution of the temperature T4 of each small set is illustrated in FIG. 72. FIG. 72 is the box and whiskers plot illustrating the distribution of the temperature T4 for every small set. In FIG. 72, the horizontal axis represents the small set, and the vertical axis represents the temperature T4 (° C.). The number of records (i.e., the number of data) belonging to each small set is denoted on upper section of the box and whiskers plot of each of the small sets No. 4, No. 5, No. 6, No. 7, No. 10, No. 11, No. 14, No. 15, and No. 16.

As shown in Table 20 and FIG. 72, when the small sets are arranged in the order of the large average value of the temperature T4, the small sets are represented as No. 10 (average value=19), No. 15 (14), No. 5 (13.9), No. 11 (12.64), No. 7 (7.89), No. 4 (4), No. 6 (3.97), and No. 14=No. 16 (2.2). Accordingly, when these small sets are grouped into the two large sets G'1$k$ and G'2$k$, it is extracted what kinds of the grouping method maximizes the statistical significance difference of the temperature T4 of the two large sets G'1$k$ and G'2$k$. Consequently, the area is extracted in which the value of the temperature T4 is greatly different from those of the other areas for every area, i.e., for each of the above-described small sets.

Next to the addition of the small set names to the records Ri, the nine small sets are rearranged in the descending order of the average value of the temperature T4. The rearranged order is represented by No. 10, No. 15, No. 5, No. 11, No. 7, No. 4, No. 6, No. 16, and No. 14. Since the nodes No. 16 and No. 14 have the same average value, the order can be changed. Next, eight (=9−1) combinations Ak of the small sets are calculated in which the nine small sets rearranged in the order of the average value are partitioned into two large sets which are a large set G'1$k$ including k small sets (k=1, 2, . . . , 8 (=9−1); and k is a natural number) selected in the descending order of the average value from the small set having the largest average value and a large set G'2$k$ including 9−k remaining small sets. The eight combinations Ak is represented by the Table 21.

TABLE 21

| COMBINATION Ak | LARGE SET G'1k | LARGE SET G'2k |
|---|---|---|
| A1 | No. 10 | No. 15, No. 5, No. 11, No. 7, No. 4, No. 6, No. 14, No. 16 |
| A2 | No. 10, No. 15 | No. 5, No. 11, No. 7, No. 4, No. 6, No. 14, No. 16 |

TABLE 21-continued

| COMBINATION Ak | LARGE SET G'1k | LARGE SET G'2k |
|---|---|---|
| A3 | No. 10, No. 15, No. 5 | No. 11, No. 7, No. 4, No. 6, No. 14, No. 16 |
| A4 | No. 10, No. 15, No. 5, No. 11 | No. 7, No. 4, No. 6, No. 14, No. 16 |
| A5 | No. 10, No. 15, No. 5, No. 11, No. 7 | No. 4, No. 6, No. 14, No. 16 |
| A6 | No. 10, No. 15, No. 5, No. 11, No. 7, No. 4 | No. 6, No. 14, No. 16 |
| A7 | No. 10, No. 15, No. 5, No. 11, No. 7, No. 4, No. 6 | No. 14, No. 16 |
| A8 | No. 10, No. 15, No. 5, No. 11, No. 7, No. 4, No. 6, No. 16 | No. 14 |

Table 21 shows the small sets Gj belonging to the large sets G'1k and G'2k for every eight combinations Ak. For example, in the case of combination A1, the large set G'11 includes one small set No. 10 having the largest average value, and the large set G'21 includes eight small sets No. 15, No. 5, No. 11, No. 7, No. 4, No. 6, No. 14, and No. 16 having the average values smaller than that of No. 10. In the case of combination A2, the large set G'12 includes two small sets No. 10 and No. 15 respectively having the largest and the second largest average values, and the large set G'22 includes seven small sets No. 5, No. 11, No. 7, No. 4, No. 6, No. 14, No. 16 having the average values smaller than those of No. 10 and No. 15.

Next, a grade of unity is calculated for every eight combinations Ak. The calculation result of the grade of unity for every eight combinations Ak is shown in Table 22.

TABLE 22

| COMBINATION Ak | LARGE SET G'1k | LARGE SET G'2k | GRADE OF UNITY |
|---|---|---|---|
| A1 | No. 10 | No. 15, No. 5, No. 11, No. 7, No. 4, No. 6, No. 14, No. 16 | 16.34 |
| A2 | No. 10, No. 15 | No. 5, No. 11, No. 7, No. 4, No. 6, No. 14, No. 16 | 18.84 |
| A3 | No. 10, No. 15, No. 5 | No. 11, No. 7, No. 4, No. 6, No. 14, No. 16 | 22.9 |
| A4 | No. 10, No. 15, No. 5, No. 11 | No. 7, No. 4, No. 6, No. 14, No. 16 | 57.2 |
| A5 | No. 10, No. 15, No. 5, No. 11, No. 7 | No. 4, No. 6, No. 14, No. 16 | 44.37 |
| A6 | No. 10, No. 15, No. 5, No. 11, No. 7, No. 4 | No. 6, No. 14, No. 16 | 37.12 |
| A7 | No. 10, No. 15, No. 5, No. 11, No. 7, No. 4, No. 6 | No. 14, No. 16 | 17.88 |
| A8 | No. 10, No. 15, No. 5, No. 11, No. 7, No. 4, No. 6, No. 16 | No. 14 | 8.57 |

Table 22 shows the small sets Gj belonging to the large sets G'1k and G'2k for every eight combinations Ak and the grade of unity for every eight combinations Ak. As shown in Table 22, the combinations have a greater grade of unity in the order of A4, A5, A6, A3, A2, A7, A1, and A8.

Next, the eight combinations Ak are rearranged in the descending order (in the order of A4, A5, A6, A3, A2, A7, A1, and A8) of the values of the grade of unity. Then, the value and rank of the grade of unity and the starting record number and ending record number (starting time and ending time) of the records Ri belonging to the large sets G'1k and G'2k are outputted in the descending order of the value of the grade of unity of the combination Ak.

FIG. 73 illustrates an example of output results obtained by the data analyzing method according to the present embodiment. In FIG. 73, the combinations Ak, the grade of unity, the small sets and the number of records Ri (large set G'1k (the number of records)) belonging to the large set G'1k, the small sets and the number of records Ri (large set G'2k (the number of records)) belonging to the large set G'2k, an area of the large set G'1k at the time D (large set G'1k area), and an area of the large set G'2k at the time D (large set G'2k area) are shown in the descending order (rank) of the value of the grade of unity.

As shown in FIG. 73, the combination Ak (rank 1) having the largest grade of unity is the combination A4. In the combination A4, the large set G'11 includes the small sets No. 10, No. 15, No. 5, and No. 11 (the range of the time D is 2, 4 to 12, and 24), and the large set G'21 includes the small sets No. 4, No. 6, No. 16, No. 14, and No. 7 (1, 3, 13 to 23, and 25). The grade of unity of the combination A4 is 57.2. In the present embodiment, the grade of unity of the rank 1 is set to relatively small value in comparison with those of the sixth to eight embodiments.

As shown in FIG. 73, values of the grade of unity decrease 57.2, 44.37 ... 8.57 in the order of the ranks 1, 2 ... and 8. It is quantitatively represented by the values of the grade of unity that the statistical significance difference of the temperature T4 of the large set G'1k and the large set G'2k decrease in the order of the ranks 1, 2 ... 8.

FIGS. 74 to 81 are a box and whisker plot illustrating the distribution of the temperature T4 corresponding to the large sets G'1k and G'2k of the combinations A4, A5, A6, A3, A2, A7, A1, and A8. In FIGS. 74 to 81, the horizontal axis represents the large sets G'1k and G'2k, and the vertical axis represents the temperature T4 (° C.).

In the present embodiment, all of the calculated values of grade of unity are relatively small and similar to each other. That is, values of the statistical significance difference depending on the area partition (i.e., the set partition) are small and similar to each other. Practically, there is no excessive difference in the temperature T4. Accordingly, it may be hardly expected that the investigation of the temperature T4 brings a useful result.

The data analyzing device and method, and the program for making the computer execute the data analyzing method according to the present embodiment relates to automatically extracting the difference between the object variable of the continuous area and that of the other areas. However, the area of the time D of the large set G'1k and the area of the time D of the large set G'2k illustrated in FIG. 73 sometimes are discrete and not always are continuous. For this reason, the result of the data analysis according to the present embodiment represents that the temporal variation of the temperature T4 randomly occurs.

The data analyzing device and method, and the program for making the computer execute the data analyzing method according to the present embodiment are possible to take the same advantages as the data analyzing device and method, and the program for making the computer execute the data analyzing method according to the sixth embodiment.

In the data analyzing device and method, and the program for making the computer execute the data analyzing method according to the embodiments, the patterns grouping the small set which is the results of the regression tree analysis into the large sets G'$1k$ and G'$2k$ are different from each other depending on the target of the data analysis, but it is possible to estimate the statistical significance difference in the case of partitioning into the two large sets G'$1k$ and G'$2k$ by using a common parameter which is the grade of unity. For this reason, though the ranges including the values of the temperature T$1$, T$2$, T$3$, and T$4$ are remarkably different, it is possible to estimate the statistical significance difference by using only one grade of unity.

The invention is not limited to the embodiments mentioned above, and may be modified to various forms of the present embodiment.

For example, in the first to the fifth embodiments, each of the small sets G$j$ or small sets G$2j$ includes the same number (5) of records R$i$, but the number of records R$i$ for forming a small set is not limited to five. For example, as shown in FIG. 34 it is allowed that the plurality of records R$i$ are partitioned into each small set G$3j$ including six records R$i$. As shown in FIG. 34, the small set G$31$ may include the records R$1$ to R$6$ (March 1st to 6th). The small set G$32$ may include the record R$7$ to R$12$ (March 7th to 12th). The small set G$33$ may include the record R$13$ to R$18$ (March 13th to 18th). The small set G$34$ may include the records R$19$ to R$24$ (March 19th to 24th). Each small set may include four or less records R$i$. However, the data analyzing method according to the present embodiment, it is an object of an aspect of the invention to extract the area distinctively different from the other areas in the values of the object variable. To achieve the corresponding object, it is desirable that the number of records R$i$ forming the respective small sets should be larger than a predetermined value (generally not less than five).

Additionally in the first to the fifth embodiments, each of the small sets G$j$ (or G$2j$) includes the same number of records R$i$, but the invention is not limited to this, and the number of records R$i$ may be set differently. In such a configuration, in view of precision in the data analysis, it is desirable that each of the small sets includes the same number of records R$i$.

In addition, in the embodiments, the time D is used as the explanatory variable, but the invention is not limited to this, and the other variables may be used as the explanatory variable. For example, a lot number which is a unit of objects transferred in one period in the semiconductor manufacturing process and the like may be used as the explanatory variable. When the lot number is used as the explanatory variable, the plurality of records R$i$ may be rearranged in the order of the lot number.

Additionally, a wafer number in the lot, a process sequence, and the like are usable as the explanatory variable.

In addition, in the embodiments, the twenty five records R$i$ are rearranged in the ascending order of the values of the explanatory variables, that is, the order of the time D, but the invention is not limited to this, the records R$i$ may be rearranged in the descending order of the time D. Likewise, when the explanatory variable is other than the time D, it is also possible to rearrange in the ascending order or the descending order of the corresponding explanatory variable.

In addition, in the embodiments, the temperatures T$1$, T$2$, T$3$, and T$4$ are used as the object variables, the invention is not limited to this. If some variables are quantitative variables, they can be used as the object variable of the data analyzing method according to the invention. For example, yield in the semiconductor manufacturing process and the like may be used as the object variable.

Additionally, as for the object variable, performance or several conditions in manufacturing process such as the semiconductor manufacturing process, for example, voltage, current, gas flow, and the like may be used.

Additionally, in the present embodiment, the number of records R$i$ is 25, but the number of records R$i$ is not limited to 25. Accordingly, the number of records R$i$ may be two or more.

Additionally, in the first to the fifth embodiments, the small set G$j$ (or the small set G$2j$) is rearranged in the descending order of the average value of the object variable, but it is also possible to rearrange in the ascending order.

What is claimed is:

1. A data analyzing method comprising the steps of:
   storing in a memory unit to store m records R$i$ (i=1, 2, ..., m and m is a natural number of 2 or more) having an explanatory variable x$i$ and an object variable y$i$ which is a quantitative variable; and
   reading in a computing unit
   to read out the m records R$i$ from the memory unit,
   to partition the m records R$i$ into n small sets G$j$ (j=1, 2, ..., n and n is a natural number satisfying 2.ltoreq.n.ltoreq.m),
   to calculate an average value of the object variables y$i$ for every small set G$j$,
   to rearrange the n small sets G$j$ in an ascending order or a descending order of the average value,
   to calculate n−1 combinations A$k$ in which the n rearranged small sets G$j$ are partitioned into two large sets which are a large set G'$1k$ including the k small sets G$j$ (k=1, 2, ..., n−1 and k is a natural number) selected in a descending order from the small set having the largest average value and a large set G'$2k$ including the number n−k remaining small sets G$j$,
   to calculate a grade of unity which is represented as the following expression for each of the n−1 combinations A$k$, and
   to perform a predetermined data analyzing operation on the basis of the grade of unity:
   Grade of Unity=[[S0−(S1+S2)]/S0].times.100, where S0 is the sum of deviation squares of the object variables y$i$ of the m records R$i$,
   S1 is the sum of deviation squares of the object variables y$i$ of the records R$i$ belonging to the large set G'$1k$, and
   S2 is the sum of deviation squares of the object variables y$i$ of the records R$i$ belonging to the large set G'$2k$.

2. The data analyzing method according to claim 1, wherein each of the n small sets G$j$ include the same number of records R$i$.

3. The data analyzing method according to claim 1, wherein the records R$i$ are rearranged on the basis of values of the explanatory variable x$i$, and
   wherein each of the small sets G$j$ include the records R$i$ rearranged in continuous order on the basis of the values of the explanatory variable x$i$.

4. The data analyzing method according to claim 3, wherein the records R$i$ are rearranged in an ascending order or a descending order of the values of the explanatory variables x$i$.

5. The data analyzing method according to claim 1, wherein, a regression tree analysis is performed on the m records R$i$, and leaf nodes obtained as the result of the regression tree analysis are used as the n small sets G$j$ when the m records R$i$ are partitioned into the n small sets G$j$.

6. The data analyzing method according to claim 5, wherein only the explanatory variables xi are used as the explanatory variables of the regression tree analysis.

7. The data analyzing method according to claim 5, wherein the regression tree analysis is performed by repeating a partition set into two by using a set including the m records Ri as a root node and, wherein the partition set into two is performed by judging whether a set D0 not partitioned satisfies a predetermined partition stopping condition, stopping the partition when the set D0 satisfies the predetermined partition stopping condition, and partitioning the set D0 into two sets D1 and D2 so that ΔS' represented by the following expression has the maximum value when the set D0 does not satisfy the predetermined partition stopping condition:

$$\Delta S' = S'0 - (S'1 + S'2)$$

where the S'0 is the sum of deviation squares of the object variables yi of the records Ri belonging to the set D0 not partitioned, S'1 is the sum of deviation squares of the object variable yi of the records Ri belonging to the one partitioned set D1, and S'2 is the sum of deviation squares of the object variables yi of the records Ri belonging to the other partitioned set D2.

8. The data analyzing method according to claim 7, wherein each of the two sets D1 and D2 includes the records Ri in continuous order of the explanatory variable xi.

9. The data analyzing method according to claim 7, wherein the predetermined partition stopping condition is that the number of the records Ri belonging to the set D0 is one.

10. The data analyzing method according to claim 7, wherein the predetermined partition stopping condition is that the explanatory variables xi of the records Ri belonging to the set D0 have the same value.

11. The data analyzing method according to claim 7, wherein the predetermined partition stopping condition is that a standard deviation of the object variables yi of the records Ri belonging to the set D0 is a predetermined value or less.

12. The data analyzing method according to claim 1, wherein the explanatory variables xi denote a time.

13. The data analyzing method according to claim 1, wherein the m records Ri are partitioned into q small sets Gp (p=1, 2, ..., q and q is a natural number satisfying $2 \leq q \leq m$) different from the n small sets Gj, and wherein the grade of unity of the q small sets Gp is calculated by the same method as the n small sets Gj.

14. A data analyzing program for executing a computer to perform the data analyzing method according to claim 1.

15. A data analyzing device comprising:

a memory unit for storing m records Ri (i=1, 2, ..., m and m is a natural number of 2 or more) having an explanatory variable xi and an object variable yi which is a quantitative variable; and a computing unit for reading out the m records Ri from the memory unit, partitioning the m records Ri into n small sets Gj (j=1, 2, ..., n and n is a natural number satisfying $2 \leq n \leq m$), calculating an average value of the object variables yi for every small set Gj, rearranging the n small sets Gj in an ascending order or a descending order of the average value, calculating n−1 combinations Ak in which the n rearranged small sets Gj are partitioned into two large sets which are a large set G'1$k$ including the k small sets Gj (k=1, 2, ..., n−1 and k is a natural number) selected in a descending order from the small set having the largest average value and a large set G'2$k$ including the number n−k remaining small sets Gj, where, calculating a grade of unity which is represented as the following expression for each of the n−1 combinations Ak, and performing a predetermined data analyzing operation on the basis of the grade of unity:

Grade of Unity=[{S0−(S1+S2)}/S0]×100, where S0 is the sum of deviation squares of the object variables yi of the m records Ri, S1 is the sum of deviation squares of the object variables yi of the records Ri belonging to the large set G'1$k$, and S2 is the sum of deviation squares of the object variables yi of the records Ri belonging to the large set G'2$k$.

* * * * *

UNITED STATES PATENT AND TRADEMARK OFFICE
CERTIFICATE OF CORRECTION

| | | |
|---|---|---|
| PATENT NO. | : 7,613,697 B2 | Page 1 of 1 |
| APPLICATION NO. | : 11/808243 | |
| DATED | : November 3, 2009 | |
| INVENTOR(S) | : Hidetaka Tsuda | |

It is certified that error appears in the above-identified patent and that said Letters Patent is hereby corrected as shown below:

Column 52, Line 41, change "[[S0-(S1+S2)]/S0].times.100," to --[{S0 - (S1 + S2)}/S0] x 100,--.

Column 52, Lines 41-43, move "where S0 is the sum of deviation squares of the object variables yi of the m records Ri," to Column 52, Line 42 as a new paragraph.

Signed and Sealed this

Nineteenth Day of January, 2010

David J. Kappos
*Director of the United States Patent and Trademark Office*